(12) United States Patent
Bandy

(10) Patent No.: US 10,072,722 B2
(45) Date of Patent: Sep. 11, 2018

(54) SHOCK ABSORBER WITH GAS PERMEABLE INTERNAL FLOATING PISTON

(71) Applicant: Ronald Scott Bandy, Visalia, CA (US)

(72) Inventor: Ronald Scott Bandy, Visalia, CA (US)

( * ) Notice: Subject to any disclaimer, the term of this patent is extended or adjusted under 35 U.S.C. 154(b) by 0 days.

(21) Appl. No.: 15/672,397

(22) Filed: Aug. 9, 2017

(65) Prior Publication Data

US 2017/0335917 A1 Nov. 23, 2017

Related U.S. Application Data

(63) Continuation-in-part of application No. 14/940,124, filed on Nov. 12, 2015, now Pat. No. 9,784,332.

(51) Int. Cl.
*F16F 9/06* (2006.01)

(52) U.S. Cl.
CPC ............. *F16F 9/067* (2013.01); *F16F 9/061* (2013.01)

(58) Field of Classification Search
CPC .... F16F 9/06; F16F 9/061; F16F 9/066; F16F 9/067; F16J 1/01
See application file for complete search history.

(56) References Cited

U.S. PATENT DOCUMENTS

| | | | |
|---|---|---|---|
| 3,101,131 A | 8/1963 | de Carbon et al. | |
| 3,587,789 A * | 6/1971 | Keilholz | F16F 9/088 188/269 |
| 4,274,515 A | 6/1981 | Bourcier de Carbon | |
| 4,368,878 A | 1/1983 | Meller et al. | |
| 5,224,689 A | 7/1993 | Georgiev | |
| 5,749,942 A | 5/1998 | Mattis et al. | |
| 5,914,154 A | 6/1999 | Nemser | |
| 6,818,133 B1 | 11/2004 | Wolter et al. | |
| 7,021,434 B2 | 4/2006 | Beck | |
| 7,308,976 B2 * | 12/2007 | Turner | B60G 17/0424 188/282.8 |
| 8,197,578 B2 | 6/2012 | Hruby et al. | |
| 8,419,961 B2 | 4/2013 | Qin | |

(Continued)

OTHER PUBLICATIONS

Benny D. Freeman et al.; Gas Separation Using Polymers; Membranes in Chemical Engineering Education; Winter 2003.

(Continued)

*Primary Examiner* — Vishal R Sahni
(74) *Attorney, Agent, or Firm* — Kenny Nguyen; Eastman & McCartney LLP

(57) ABSTRACT

Disclosed herein is a single shock body equipped with the gas permeable internal floating piston. The gas permeable internal floating piston was specifically designed for installation in the multiple stage air shock, the gas permeable internal floating piston being disclosed in the parent application. The gas permeable internal floating piston automatically separates the oil from the gas within the shock body thereby significantly reducing the complexity and cost of manufacturing a shock absorber with the gas permeable internal floating piston. Also, separation is maintained during the operation of the shock throughout the shock's lifetime. The gas permeable internal floating piston can operate with oils derived from either petroleum or synthetic base stocks, additives, and various gases including dry air, nitrogen, oxygen, carbon monoxide, carbon dioxide, helium, neon, and argon.

20 Claims, 46 Drawing Sheets

(56) References Cited

U.S. PATENT DOCUMENTS 8,807,299 B2 8/2014 Gagnon et al.
2014/0291085 A1 10/2014 Bandy
2015/0192187 A1 7/2015 Smith et al.

OTHER PUBLICATIONS

J. Patrick Montoya; Membrane Gas Exchange; MedArray, Inc; 2010.
Anton A. Kossov et al.; Novel fluorine-functionalized 1,2-disubstitutedpolyacetylene-Poly(1-(3,3,3-trifluoropropyldimethylsilyl)-1-propyne). Synthesis, microstructure, and gas transport properties; Polymers, 55, pp. 989-994, (2014).
Reza Abedini et al.; Application of Membrane in Gas Separation Processes: Its Suitability and Mechanisms; Petroleum & Coal, 52(2), pp. 69-80, (2010).
Fred Williams; Air Shock Technical-Air Shocks 4 Rocks; 4wheeloffroad.com; Feb. 2009.
Andrzej B. Koltuniewicz; The History and State of Art in Membrane Technologies; Tarragonia, Erasmus, 2005.
Hydraulic Fluids; Chemical and Physical Information; atsdr.cdc.gov/toxprofiles/tp99; Sep. 1997; pp. 233-263.
Article Archives; Conventional vs Synthetic Oil; machinerylubrication.com/articles/23715; Mar. 30, 2010.
Safety Data Sheet; Shock Therapy Suspension Fluid; amsoil.com; Sep. 15, 2016.
Safety Data Sheet; Synthetic Suspension Fluid; redlineoil.com; Aug. 25, 2016.
SSP-M823; Polydimethyl Silicone Membrane; sspinc.com; Nov. 24, 2014.
DISCS; Porous Metal Discs; chandeisenmann.com/products; 2005-2008.
Filtration Catalogue; Porvair Plastic Battery Vents; porvairfiltration.com; pp. 144-145, 2017.

* cited by examiner

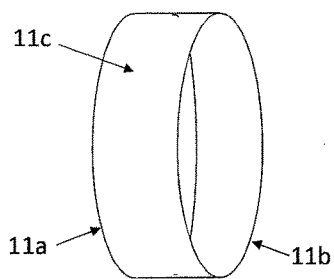
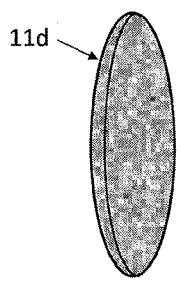
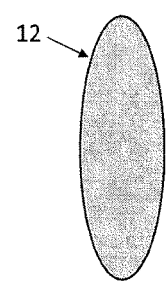
Fig. 1    Fig. 2    Fig. 3
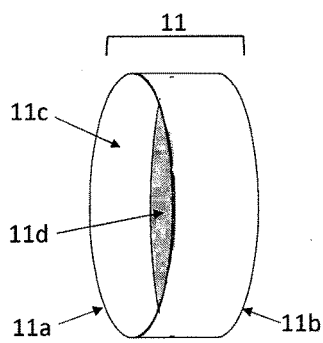
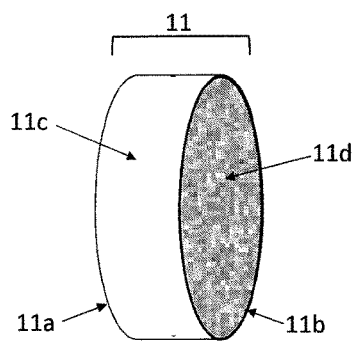
Fig. 4    Fig. 5
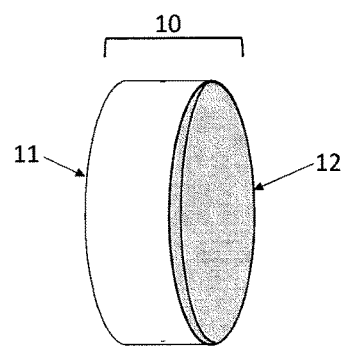
Fig. 6

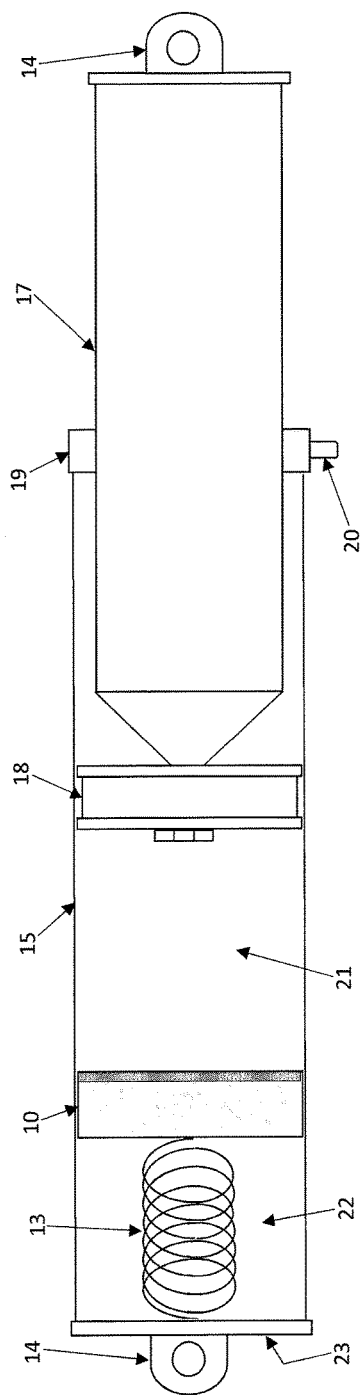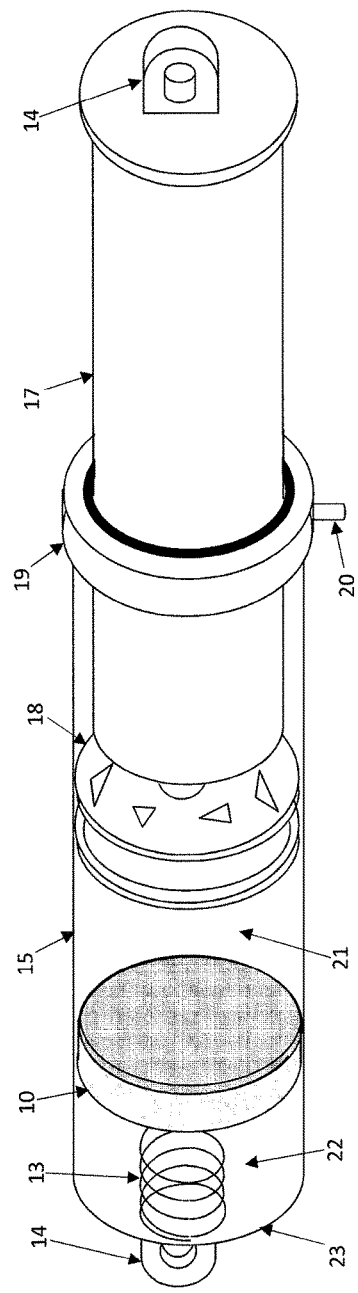

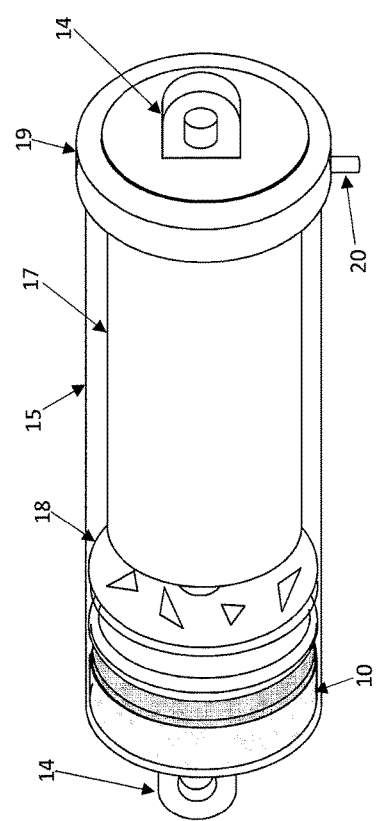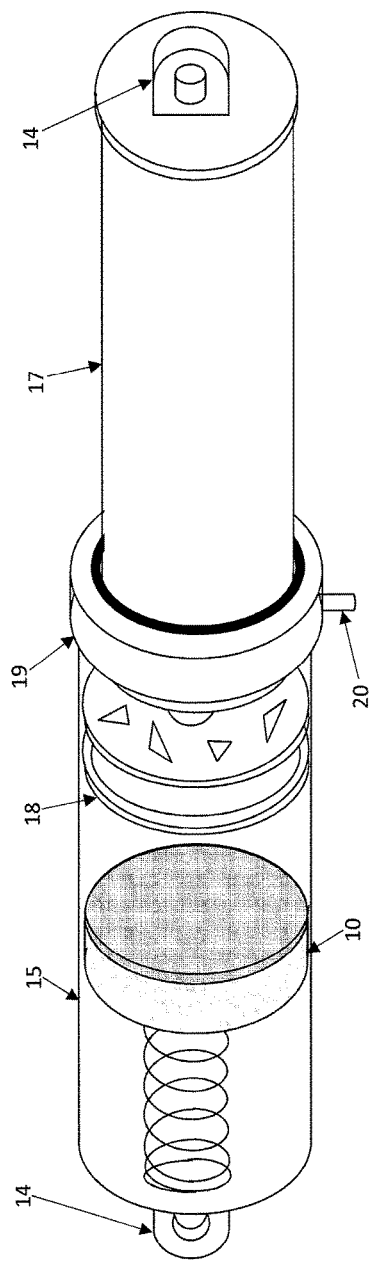

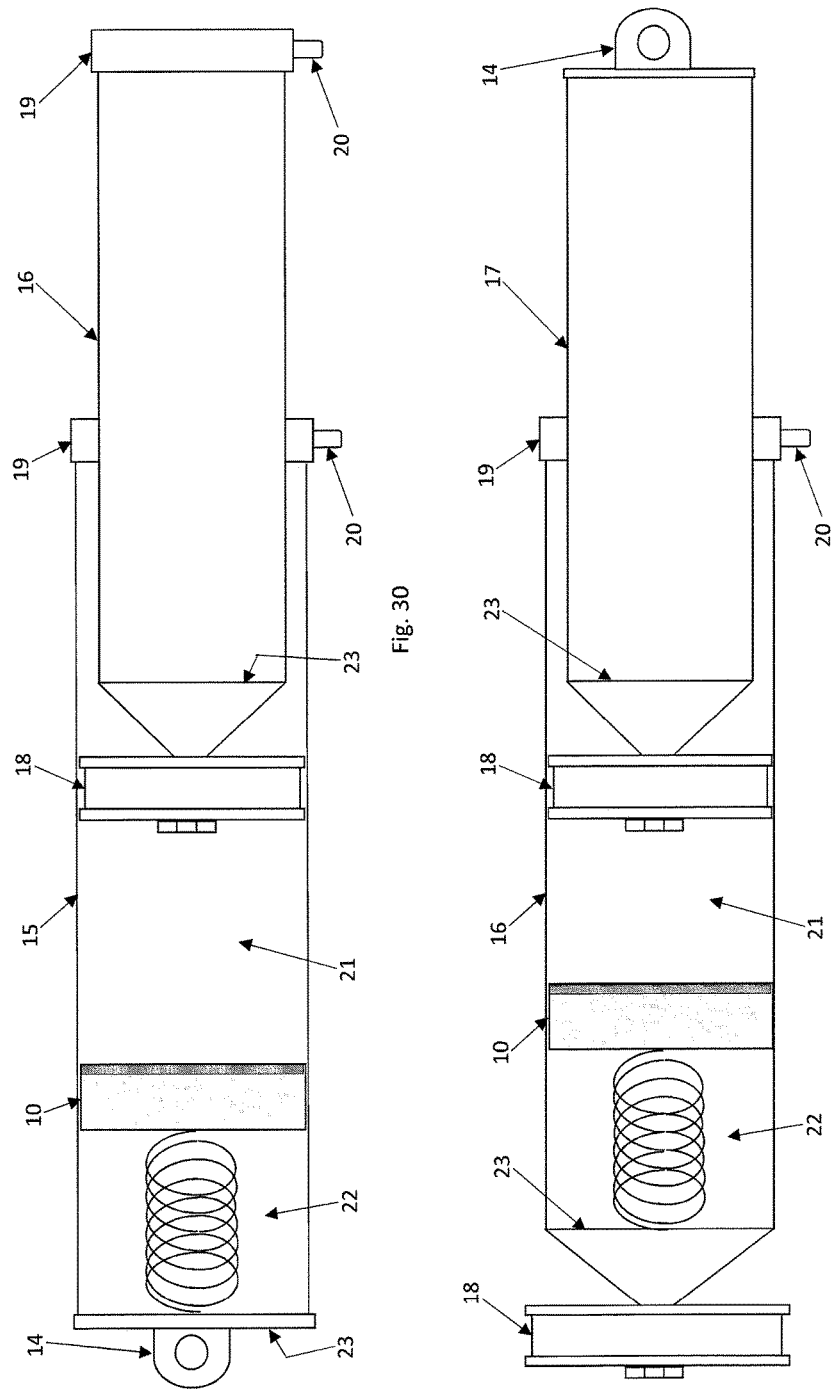

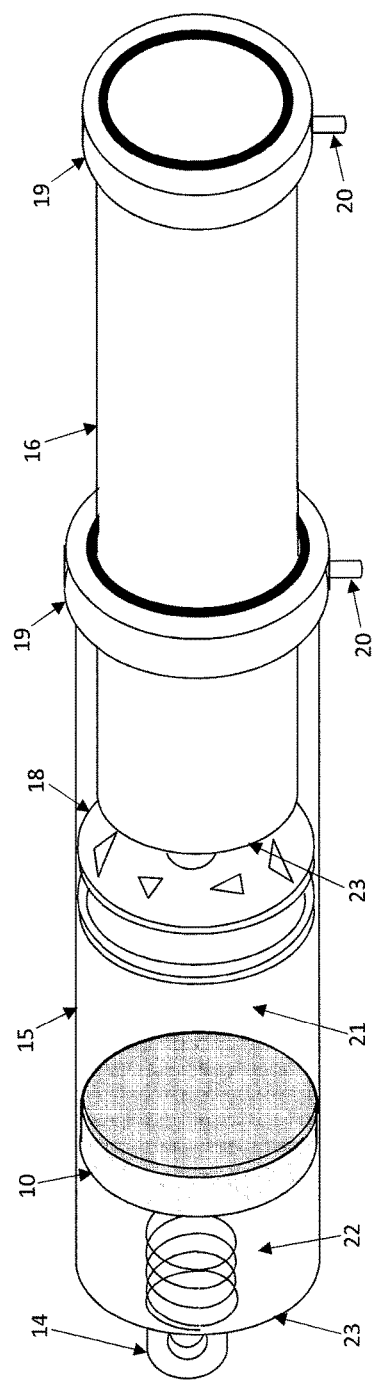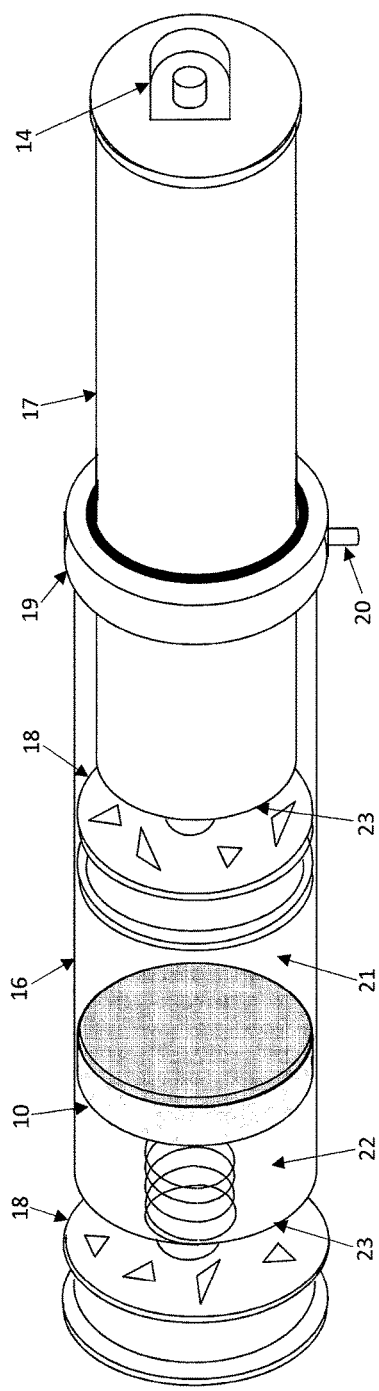

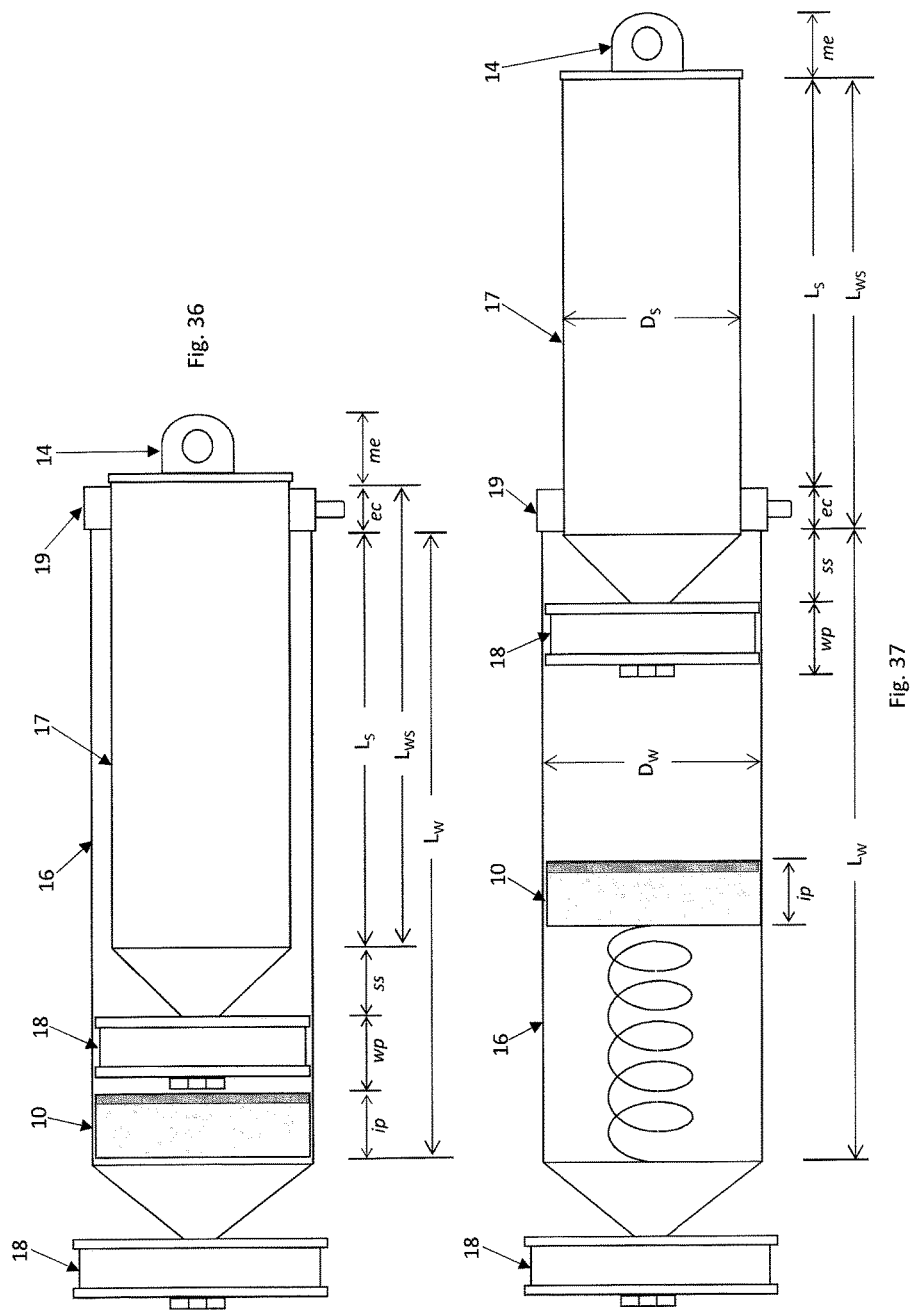

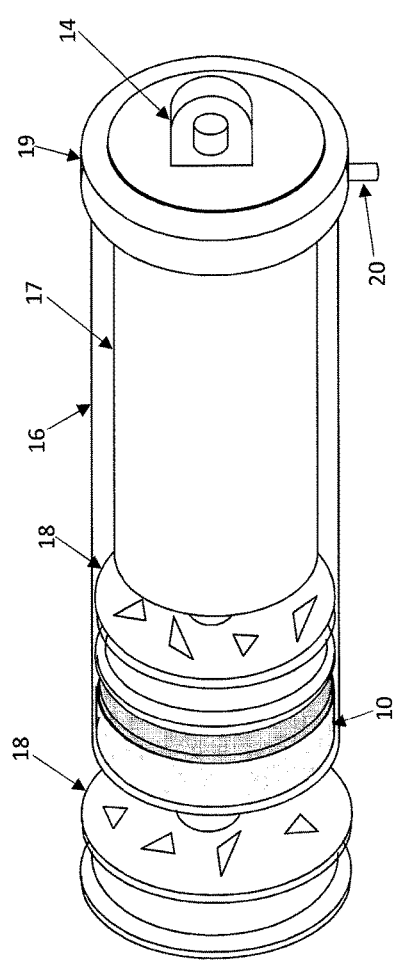
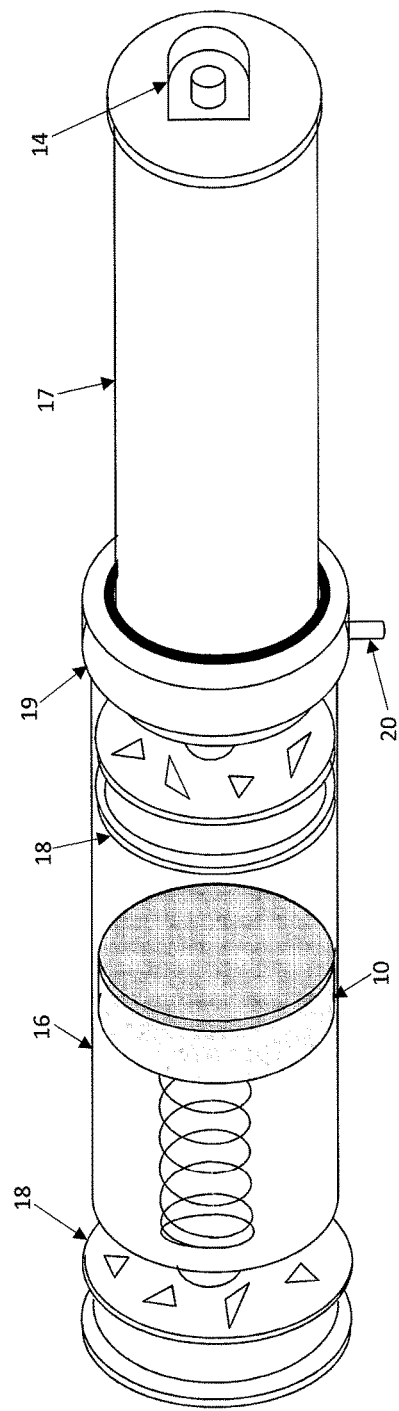

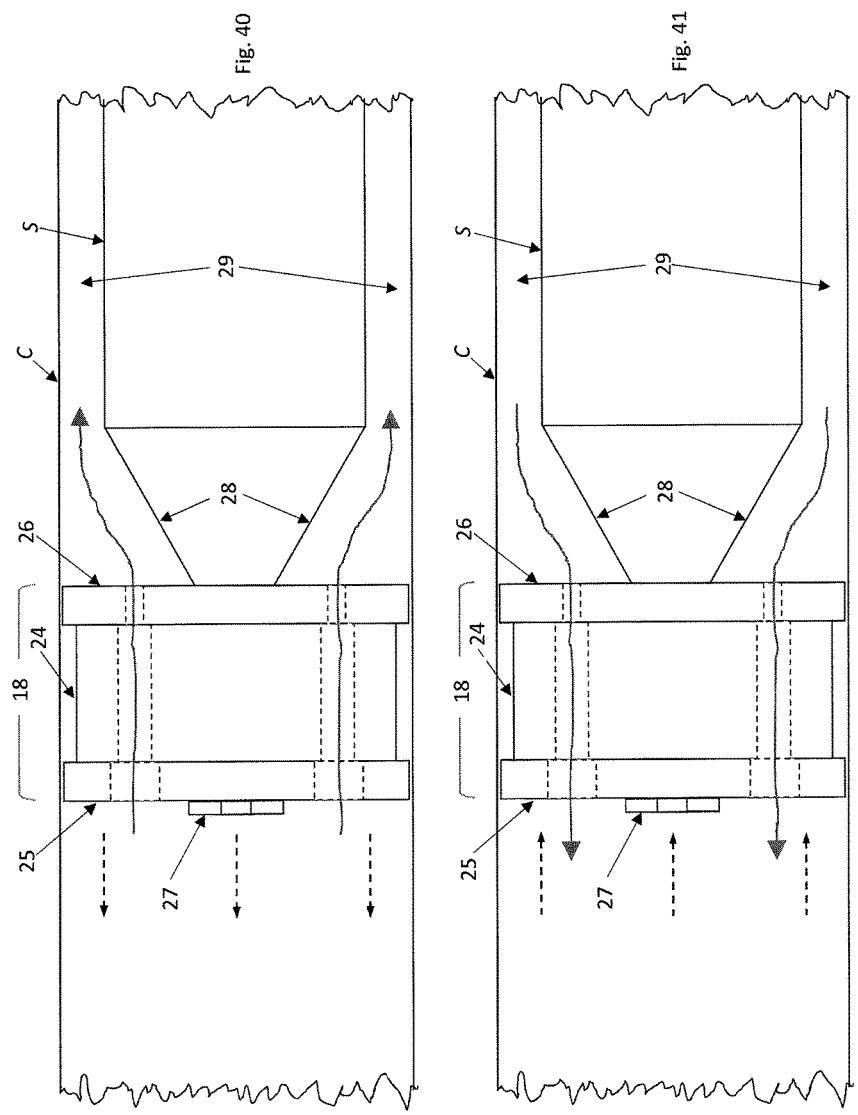

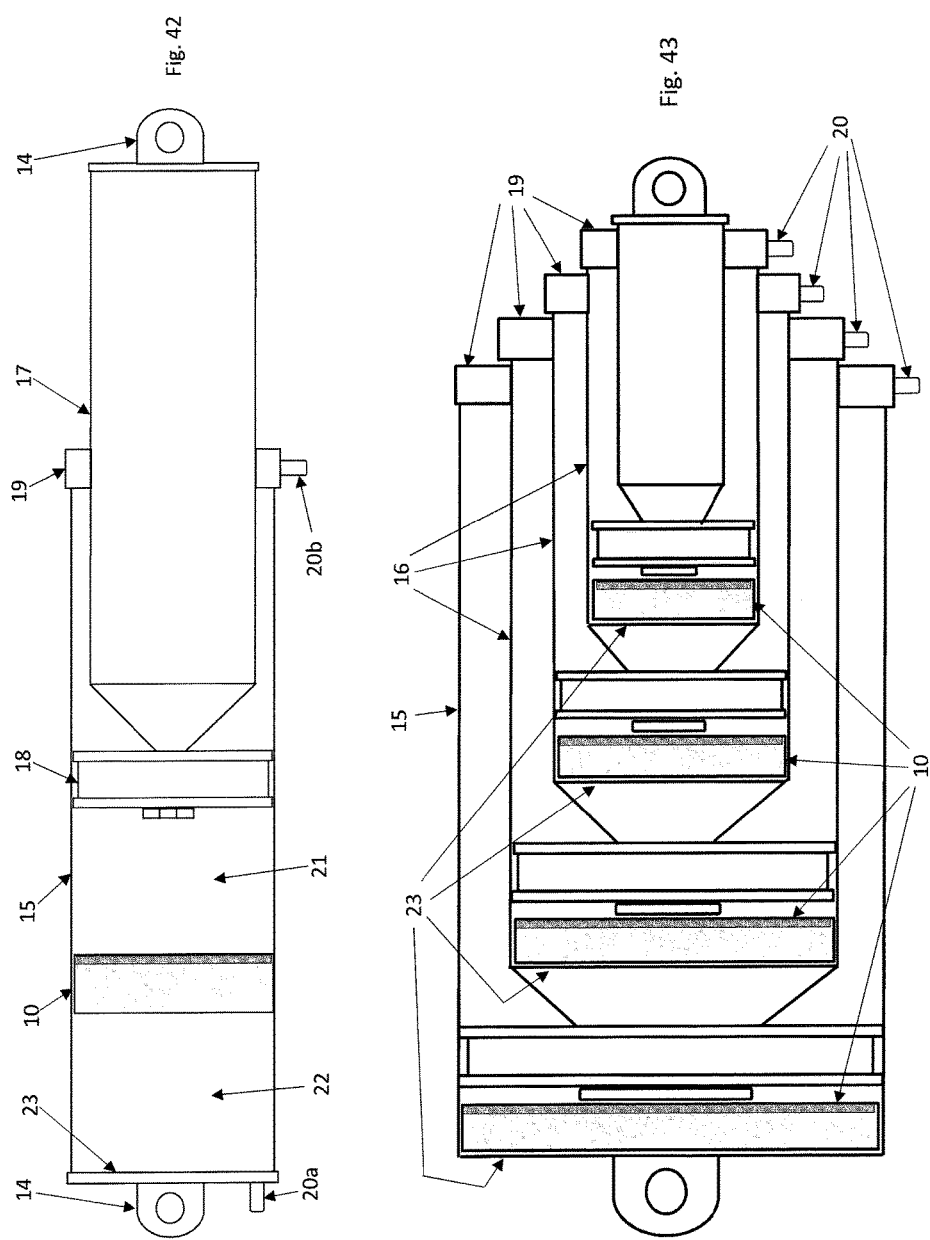

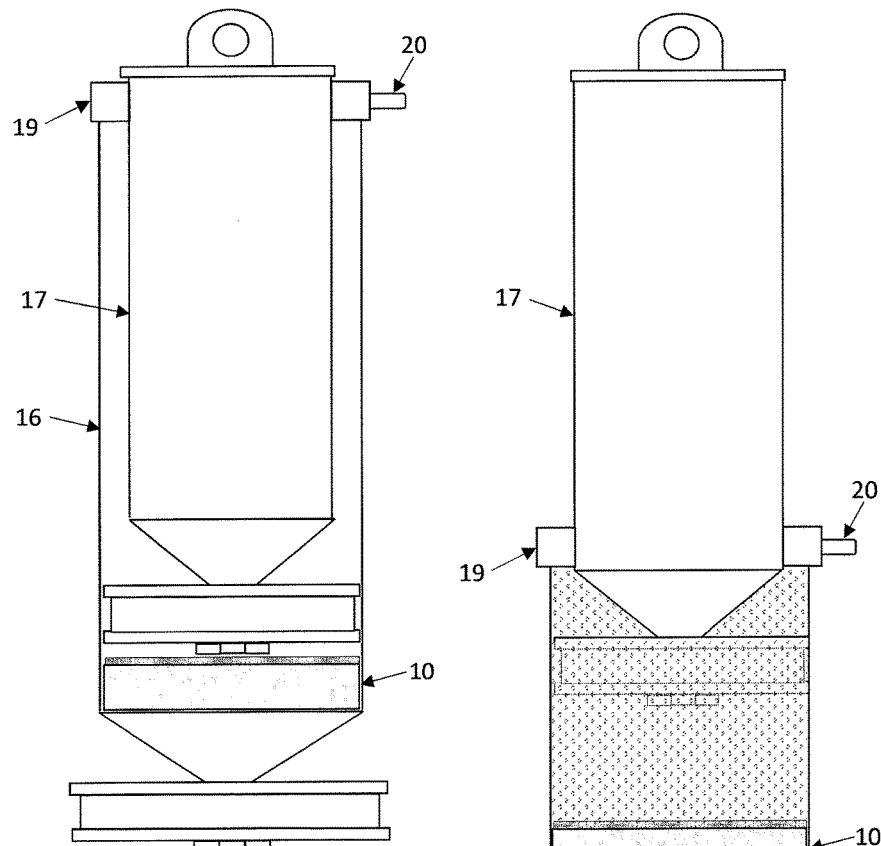
gas
Fig. 51
Fig. 52

Fig. 66    $A_m = \pi(\frac{1}{2}D_n)^2$, where $m = C, S$

Fig. 67    $\Delta V_n = A_m \cdot \Delta L_n$, where $n = IFP, S; m = C, S;$ and $\Delta L_{IFP} \equiv d_{IFP}$ Fig. 68    $\Delta V_{IFP} \equiv \Delta V_G \equiv \Delta V_S$ Fig. 69    $d_{WP} = \Delta L_S$ $$\pi(\tfrac{1}{2}D_C)^2 \cdot d_{IFP} = \pi(\tfrac{1}{2}D_S)^2 \cdot L_S$$

$$d_{IFP} = \frac{\pi(\tfrac{1}{2}D_S)^2}{\pi(\tfrac{1}{2}D_C)^2} \cdot L_S$$

$$= \frac{\pi(\tfrac{1}{2})^2 D_S^2}{\pi(\tfrac{1}{2})^2 D_C^2} \cdot L_S$$

$$= \frac{\pi(\tfrac{1}{2})^2 D_S^2}{\pi(\tfrac{1}{2})^2 D_C^2} \cdot L_S$$

$$= \frac{D_S^2}{D_C^2} \cdot L_S$$

$$= \left(\frac{D_S}{D_C}\right)^2 \cdot L_S$$

$$= \left(\frac{D_S}{D_C}\right)^2 \cdot d_{WP}$$

Since   $D_S < D_C$

Then   $\dfrac{D_S}{D_C} < 1$

And   $d_{IFP} < d_{WP}$

Fig. 70

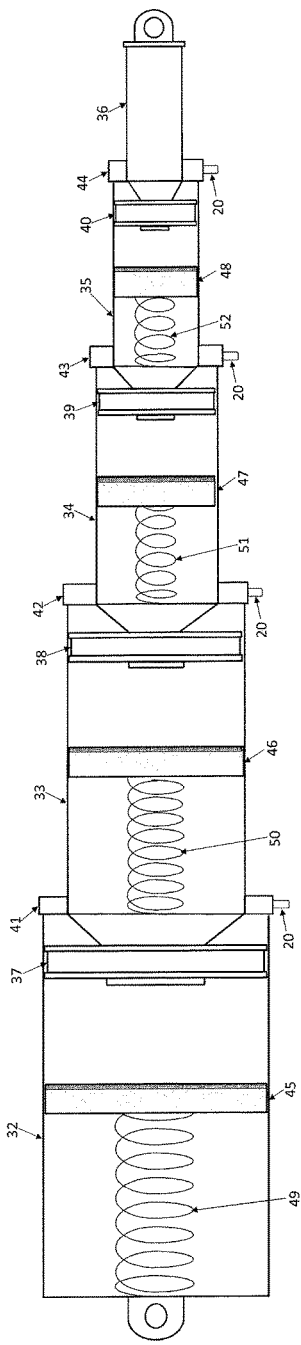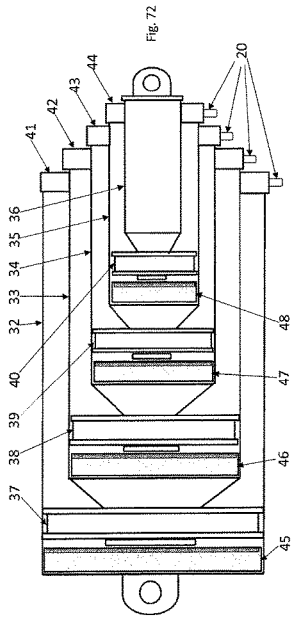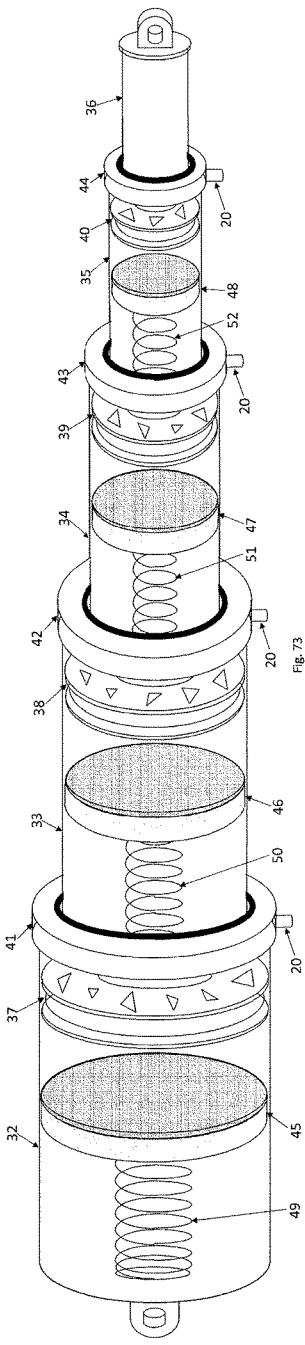

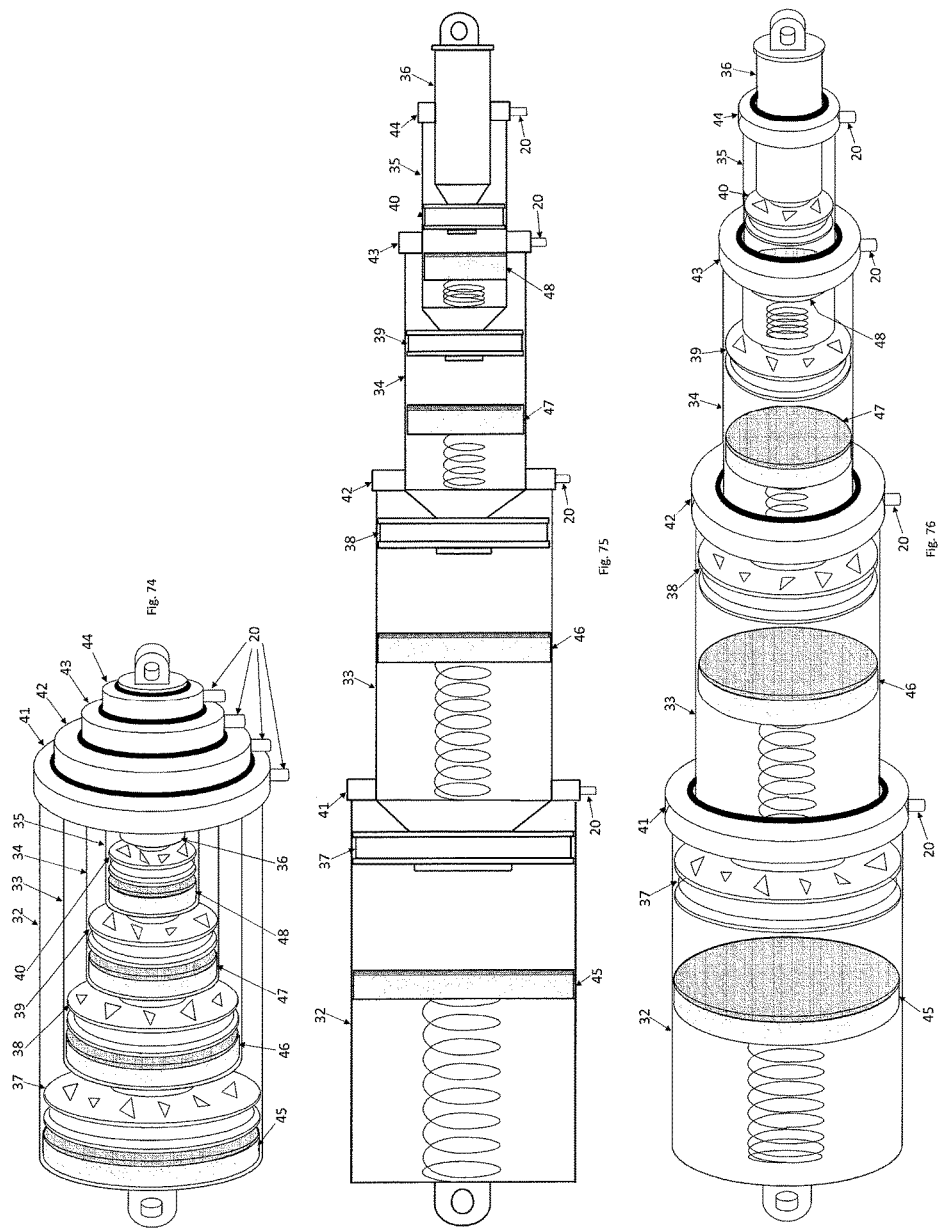

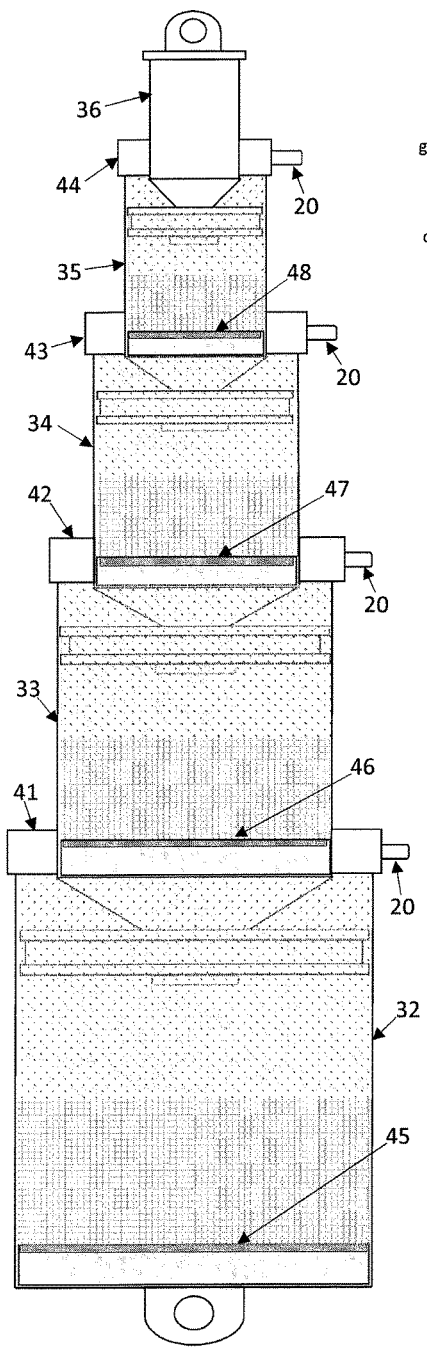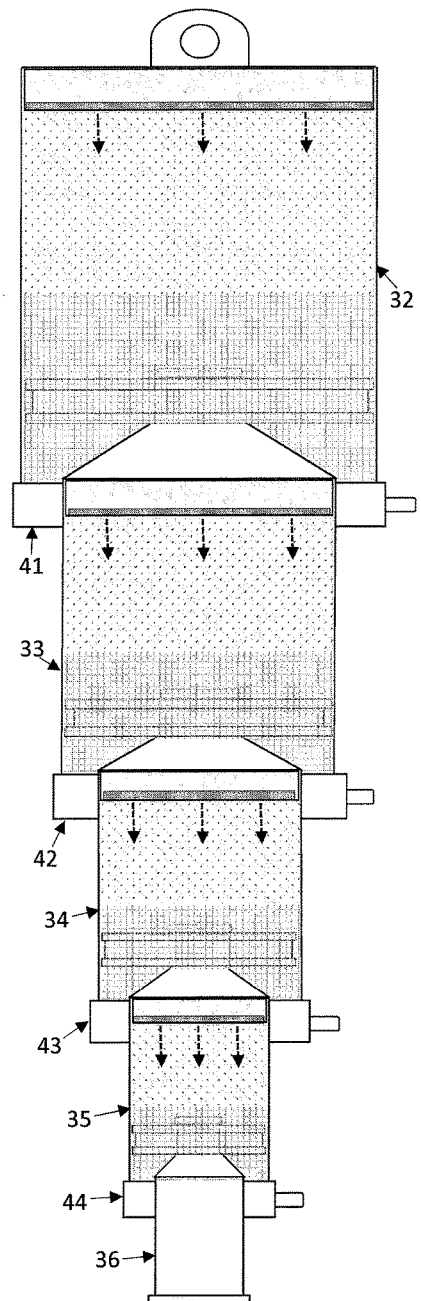
Fig. 83
Fig. 84

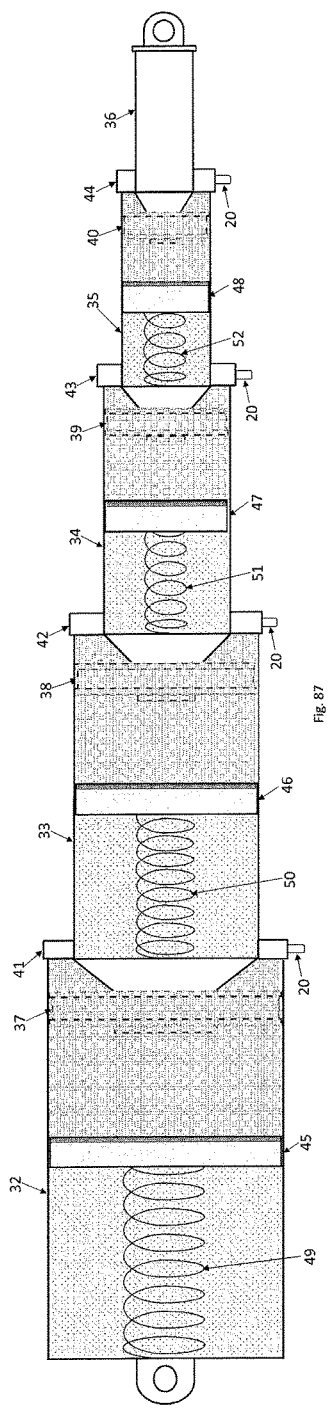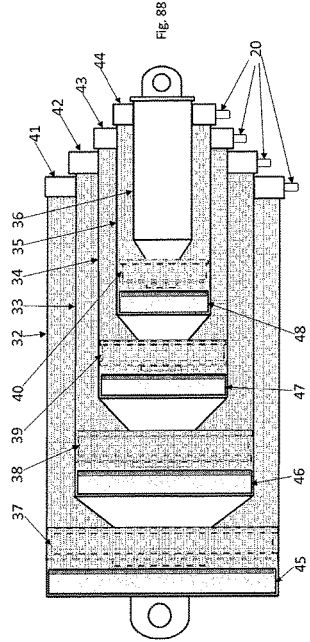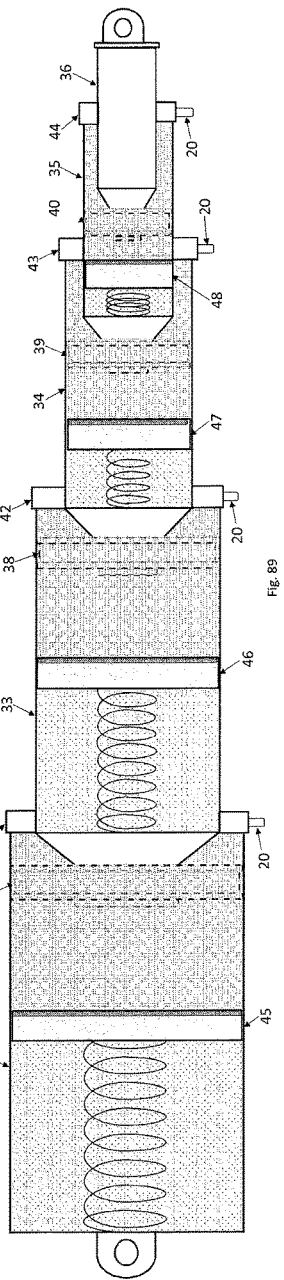
Fig. 87
Fig. 88
Fig. 89

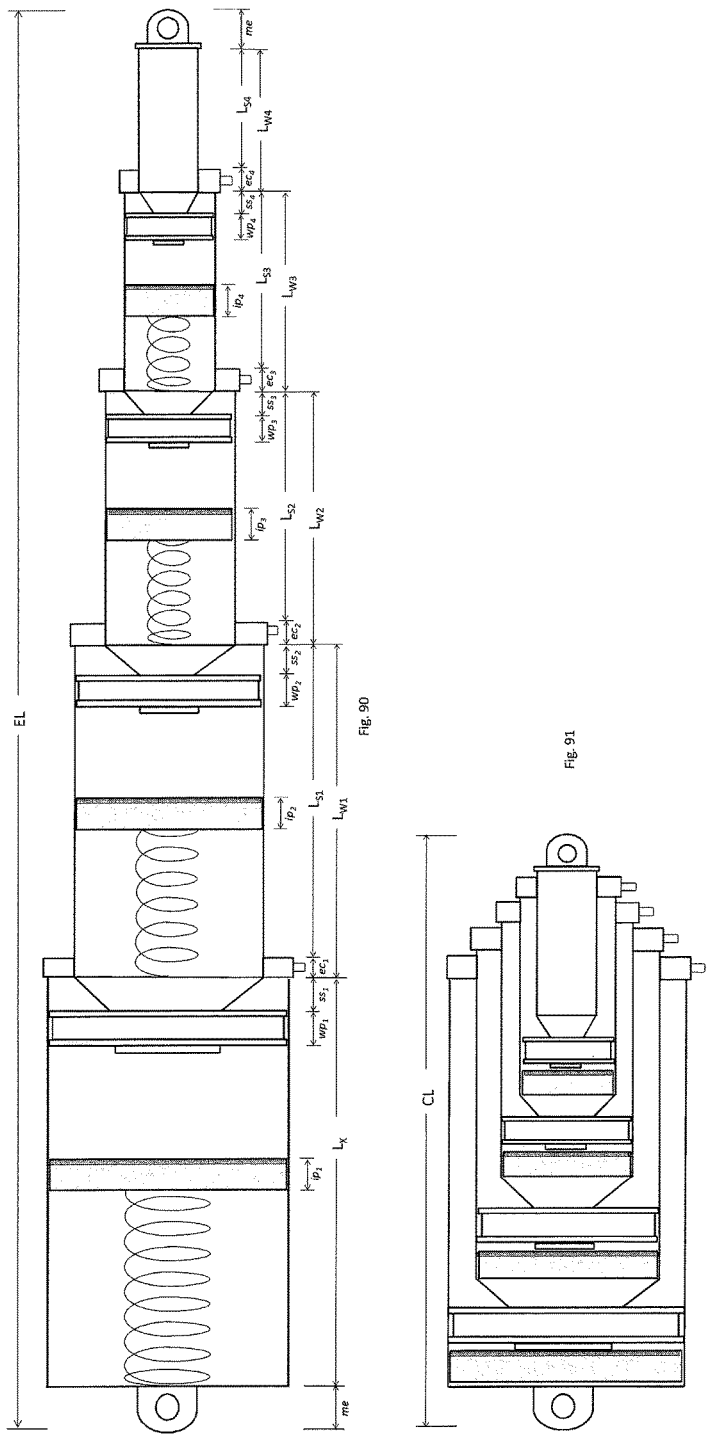
Fig. 92  $L_{X+1} = L_X - ec_1$   where: $X = 1-7$
Fig. 93  $L_{Wn} = L_{Wn-1} - wp_n - ss_n - ip_n + ec_n$   where $n = 1, 2, \cdots, 7$ and $L_{W0} = L_1$
Fig. 94  $L_{S1} = L_X - wp_1 - ss_1 - ip_1$   where: $X = 1-8$
Fig. 95  $L_{Sn} = L_{Wn-1} - wp_n - ss_n - ip_n$   where $X = 2-8$ and $n = 2, 3, \cdots, X$
Fig. 96  $CL_X = L_X + (2 \times me) + \Sigma ec_n$   where $X = 1-8$ and $n = 1, 2, \cdots, X$
Fig. 97  $EL_X = CL_X + \Sigma L_{Sn}$   where $X = 1-8$ and $n = 1, 2, \cdots, X$ Fig. 98  $me$ (in) = 1.5

Fig. 99  $ip_n = wp_n$    where n = 1-8

Fig. 100: Table 1

| n | $wp_n$ (in) | $ss_n$ (in) | $ec_n$ (in) |
|---|---|---|---|
| 1 | 0.500 | 0.5 | 0.5 |

Fig. 101: Table 2

| n | $wp_n$ (in) | $ss_n$ (in) | $ec_n$ (in) |
|---|---|---|---|
| 1 | 0.625 | 0.5 | 0.5 |
| 2 | 0.500 | 0.5 | 0.5 |

Fig. 102: Table 3

| n | $wp_n$ (in) | $ss_n$ (in) | $ec_n$ (in) |
|---|---|---|---|
| 1 | 0.750 | 0.5 | 0.5 |
| 2 | 0.625 | 0.5 | 0.5 |
| 3 | 0.500 | 0.5 | 0.5 |

Fig. 103: Table 4

| n | $wp_n$ (in) | $ss_n$ (in) | $ec_n$ (in) |
|---|---|---|---|
| 1 | 0.875 | 0.5 | 0.5 |
| 2 | 0.750 | 0.5 | 0.5 |
| 3 | 0.625 | 0.5 | 0.5 |
| 4 | 0.500 | 0.5 | 0.5 |

Fig. 104: Table 5

| n | $wp_n$ (in) | $ss_n$ (in) | $ec_n$ (in) |
|---|---|---|---|
| 1 | 1.000 | 0.5 | 0.5 |
| 2 | 0.875 | 0.5 | 0.5 |
| 3 | 0.750 | 0.5 | 0.5 |
| 4 | 0.625 | 0.5 | 0.5 |
| 5 | 0.500 | 0.5 | 0.5 |

Fig. 105: Table 6

| n | $wp_n$ (in) | $ss_n$ (in) | $ec_n$ (in) |
|---|---|---|---|
| 1 | 1.000 | 0.5 | 0.5 |
| 2 | 1.000 | 0.5 | 0.5 |
| 3 | 0.875 | 0.5 | 0.5 |
| 4 | 0.750 | 0.5 | 0.5 |
| 5 | 0.625 | 0.5 | 0.5 |
| 6 | 0.500 | 0.5 | 0.5 |

Fig. 106: Table 7

| n | $wp_n$ (in) | $ss_n$ (in) | $ec_n$ (in) |
|---|---|---|---|
| 1 | 1.000 | 0.5 | 0.5 |
| 2 | 1.000 | 0.5 | 0.5 |
| 3 | 1.000 | 0.5 | 0.5 |
| 4 | 0.875 | 0.5 | 0.5 |
| 5 | 0.750 | 0.5 | 0.5 |
| 6 | 0.625 | 0.5 | 0.5 |
| 7 | 0.500 | 0.5 | 0.5 |

Fig. 107: Table 8

| n | $wp_n$ (in) | $ss_n$ (in) | $ec_n$ (in) |
|---|---|---|---|
| 1 | 1.000 | 0.5 | 0.5 |
| 2 | 1.000 | 0.5 | 0.5 |
| 3 | 1.000 | 0.5 | 0.5 |
| 4 | 1.000 | 0.5 | 0.5 |
| 5 | 0.875 | 0.5 | 0.5 |
| 6 | 0.750 | 0.5 | 0.5 |
| 7 | 0.625 | 0.5 | 0.5 |
| 8 | 0.500 | 0.5 | 0.5 |

Fig. 108: Extended Length Data Table 1

| X | $L_X$ | $L_{W1}$ | $L_{W2}$ | $L_{W3}$ | $L_{W4}$ | $L_{W5}$ | $L_{W6}$ | $L_{W7}$ | $L_{S1}$ | $L_{S2}$ | $L_{S3}$ | $L_{S4}$ | $L_{S5}$ | $L_{S6}$ | $L_{S7}$ | $L_{S8}$ | $CL_X$ | $EL_X$ | $EL_X/CL_X$ |
|---|---|---|---|---|---|---|---|---|---|---|---|---|---|---|---|---|---|---|---|
| 1 | 10.00 | — | — | — | — | — | — | — | 8.50 | — | — | — | — | — | — | — | 13.50 | 22.00 | 1.63 |
| 2 | 9.50 | 8.25 | — | — | — | — | — | — | 7.75 | 6.75 | — | — | — | — | — | — | 13.50 | 28.00 | 2.07 |
| 3 | 9.00 | 7.50 | 6.25 | — | — | — | — | — | 7.00 | 5.75 | 4.75 | — | — | — | — | — | 13.50 | 31.00 | 2.30 |
| 4 | 8.50 | 6.75 | 5.25 | 4.00 | — | — | — | — | 6.25 | 4.75 | 3.50 | 2.50 | — | — | — | — | 13.50 | 30.50 | 2.26 |
| 5 | 8.00 | 6.00 | 4.25 | 2.75 | 1.50 | — | — | — | 5.50 | 3.75 | 2.25 | 1.00 | 0.00 | — | — | — | 13.50 | 26.00 | 1.93 |
| 6 | 7.50 | 5.50 | 3.50 | 1.75 | 0.25 | -1.00 | — | — | 5.00 | 3.00 | 1.25 | -0.25 | -1.50 | -2.50 | — | — | 13.50 | 18.50 | 1.37 |
| 7 | 7.00 | 5.00 | 3.00 | 1.00 | -0.75 | -2.25 | -3.50 | — | 4.50 | 2.50 | 0.50 | -1.25 | -2.75 | -4.00 | -5.00 | — | 13.50 | 8.00 | 0.59 |
| 8 | 6.50 | 4.50 | 2.50 | 0.50 | -1.50 | -3.25 | -4.75 | -6.00 | 4.00 | 2.00 | 0.00 | -2.00 | -3.75 | -5.25 | -6.50 | -7.50 | 13.50 | -5.50 | -0.41 |

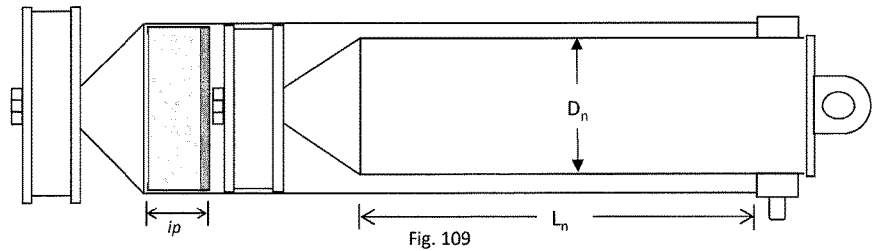

Fig. 109

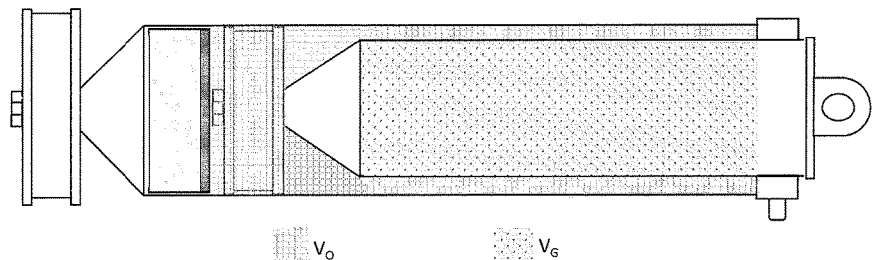

Fig. 110

Fig. 111    $A_n = \pi(\frac{1}{2}D_n)^2$, where n = D1, D2, D3, or S1

Fig. 112    $V_n = A_n \cdot L_n$, where n = D1, D2, D3, or S1

Fig. 113    $V_{Gt} = V_n$, where t = 1, 2, 3, or 4 and n = D1, D2, D3, or S1, respectively Fig. 114    $c_t = P_{Gt} \cdot V_{Gt}$, where t = 1, 2, 3, or 4

Fig. 115    $L_t = L_n \cdot (\%L_t/100)$, where t = 1, 2, 3, or 4 and n = D1, D2, D3, or S1, respectively Fig. 116    $V_t = A_n \cdot L_t$, where t = 1, 2, 3, or 4 and n = D1, D2, D3, or S1, respectively Fig. 117    $P_{Gt} = (F_t/A_n)(V_t/V_{Gt})$, where t = 1, 2, 3, or 4 and n = D1, D2, D3, or S1, respectively Fig. 118    $V_z = A_n \cdot L_z$, where z = 1e, 2f, 3g, or 4h and n = D1, D2, D3, or S1, respectively Fig. 119    $P_z = c_t/V_z$, where z = 1e, 2f, 3g, or 4h and t = 1, 2, 3, or 4, respectively Fig. 120    $F_z = P_z \cdot A_n$, where z = 1e, 2f, 3g, or 4h and n = D1, D2, D3, or S1, respectively Fig. 121    $SR_z = F_z/L_z$, where z = 1e, 2f, 3g, or 4h Fig. 122    $\%\Delta L_z = ((L_X - L_Y)/L_X) \cdot 100$,    where X = a1, Y = a(b+1), and Z = ab at a = 1, 2, 3, or 4 and b = e, f, g, or h, respectively; e = 1-9, f = 1-10, g = 1-9, and h = 1-10

Fig. 123: Selected Values

| n | stage t | $D_n$ (in) | $L_n$ (in) | %$L_t$ | $F_t$ (lbs) |
|---|---|---|---|---|---|
| D1 | 1 | 3.5 | 6.3 | 100.0 | 2000 |
| D2 | 2 | 3.0 | 4.8 | 100.0 | 1500 |
| D3 | 3 | 2.5 | 3.5 | 70.0 | 1500 |
| S1 | 4 | 2.0 | 2.5 | 40.0 | 1500 |

Fig. 124: First Stage Spring Rate Table

| e | $L_{1e}$ (in) | %$\Delta L_{1e}$ | $F_{1e}$ (lbs) | $\Delta L_{1e}$ | $SR_{1e}$ (lbs/in) |
|---|---|---|---|---|---|
| 1 | 6.30 | — | 2000 | — | 317 |
| 2 | 5.67 | 10 | 2222 | 0.63 | 392 |
| 3 | 5.04 | 20 | 2500 | 0.63 | 496 |
| 4 | 4.41 | 30 | 2857 | 0.63 | 648 |
| 5 | 3.78 | 40 | 3333 | 0.63 | 882 |
| 6 | 3.15 | 50 | 4000 | 0.63 | 1270 |
| 7 | 2.52 | 60 | 5000 | 0.63 | 1984 |
| 8 | 1.89 | 70 | 6667 | 0.63 | 3527 |
| 9 | 1.26 | 80 | 10000 | 0.63 | 7937 |
| 10 | 0.63 | 90 | 20000 | 0.63 | 31746 |

Fig. 125: Second Stage Spring Rate Table

| f | $L_{2f}$ (in) | %$\Delta L_{2f}$ | $F_{2f}$ (lbs) | $\Delta L_{2f}$ | $SR_{2f}$ (lbs/in) |
|---|---|---|---|---|---|
| 1 | 4.80 | — | 1500 | — | 313 |
| 2 | 4.32 | 10 | 1667 | 0.48 | 386 |
| 3 | 3.84 | 20 | 1875 | 0.48 | 488 |
| 4 | 3.60 | 25 | 2000 | 0.24 | 556 |
| 5 | 3.36 | 30 | 2143 | 0.48 | 638 |
| 6 | 2.88 | 40 | 2500 | 0.48 | 868 |
| 7 | 2.40 | 50 | 3000 | 0.48 | 1250 |
| 8 | 1.92 | 60 | 3750 | 0.48 | 1953 |
| 9 | 1.44 | 70 | 5000 | 0.48 | 3472 |
| 10 | 0.96 | 80 | 7500 | 0.48 | 7813 |
| 11 | 0.48 | 90 | 15000 | 0.48 | 31250 |

Fig. 126: Third Stage Spring Rate Table

| g | $L_{3g}$ (in) | %$\Delta L_{3g}$ | $F_{3g}$ (lbs) | $\Delta L_{3g}$ | $SR_{3g}$ (lbs/in) |
|---|---|---|---|---|---|
| 1 | 3.50 | — | 1050 | — | 300 |
| 2 | 3.15 | 10 | 1167 | 0.35 | 370 |
| 3 | 2.80 | 20 | 1313 | 0.35 | 469 |
| 4 | 2.45 | 30 | 1500 | 0.35 | 612 |
| 5 | 2.10 | 40 | 1750 | 0.35 | 833 |
| 6 | 1.75 | 50 | 2100 | 0.35 | 1200 |
| 7 | 1.40 | 60 | 2625 | 0.35 | 1875 |
| 8 | 1.05 | 70 | 3500 | 0.35 | 3333 |
| 9 | 0.70 | 80 | 5250 | 0.35 | 7500 |
| 10 | 0.35 | 90 | 10500 | 0.35 | 30000 |

Fig. 127: Fourth Stage Spring Rate Table

| h | $L_{4h}$ (in) | %$\Delta L_{4h}$ | $F_{4h}$ (lbs) | $\Delta L_{4h}$ | $SR_{4h}$ (lbs/in) |
|---|---|---|---|---|---|
| 1 | 2.50 | — | 600 | — | 240 |
| 2 | 2.25 | 10 | 667 | 0.25 | 296 |
| 3 | 2.00 | 20 | 750 | 0.25 | 375 |
| 4 | 1.75 | 30 | 857 | 0.25 | 490 |
| 5 | 1.50 | 40 | 1000 | 0.25 | 667 |
| 6 | 1.43 | 43 | 1050 | 0.07 | 735 |
| 7 | 1.25 | 50 | 1200 | 0.25 | 960 |
| 8 | 1.00 | 60 | 1500 | 0.25 | 1500 |
| 9 | 0.75 | 70 | 2000 | 0.25 | 2667 |
| 10 | 0.50 | 80 | 3000 | 0.25 | 6000 |
| 11 | 0.25 | 90 | 6000 | 0.25 | 24000 |

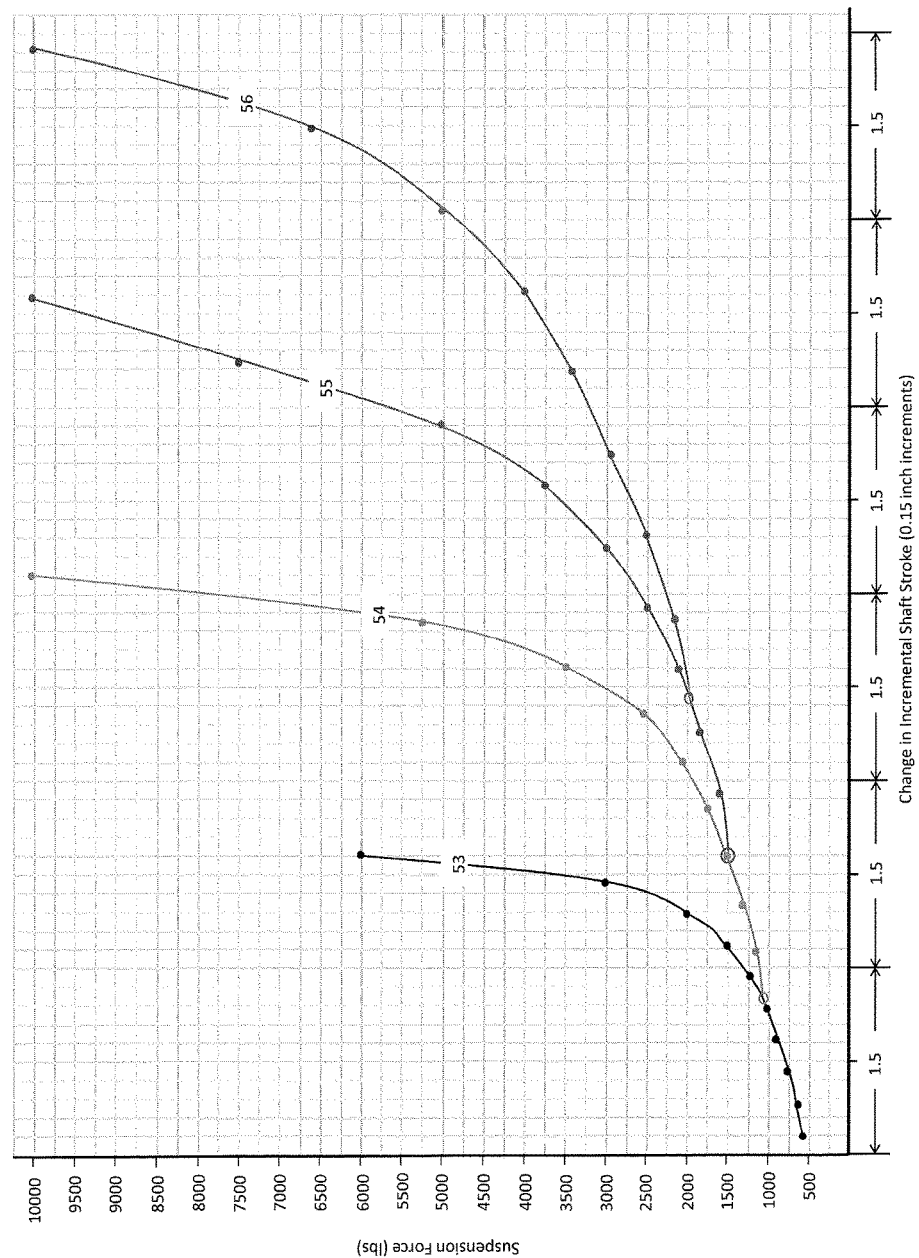
Fig. 128: Graph of IFP Equipped Four Stage Air Shock

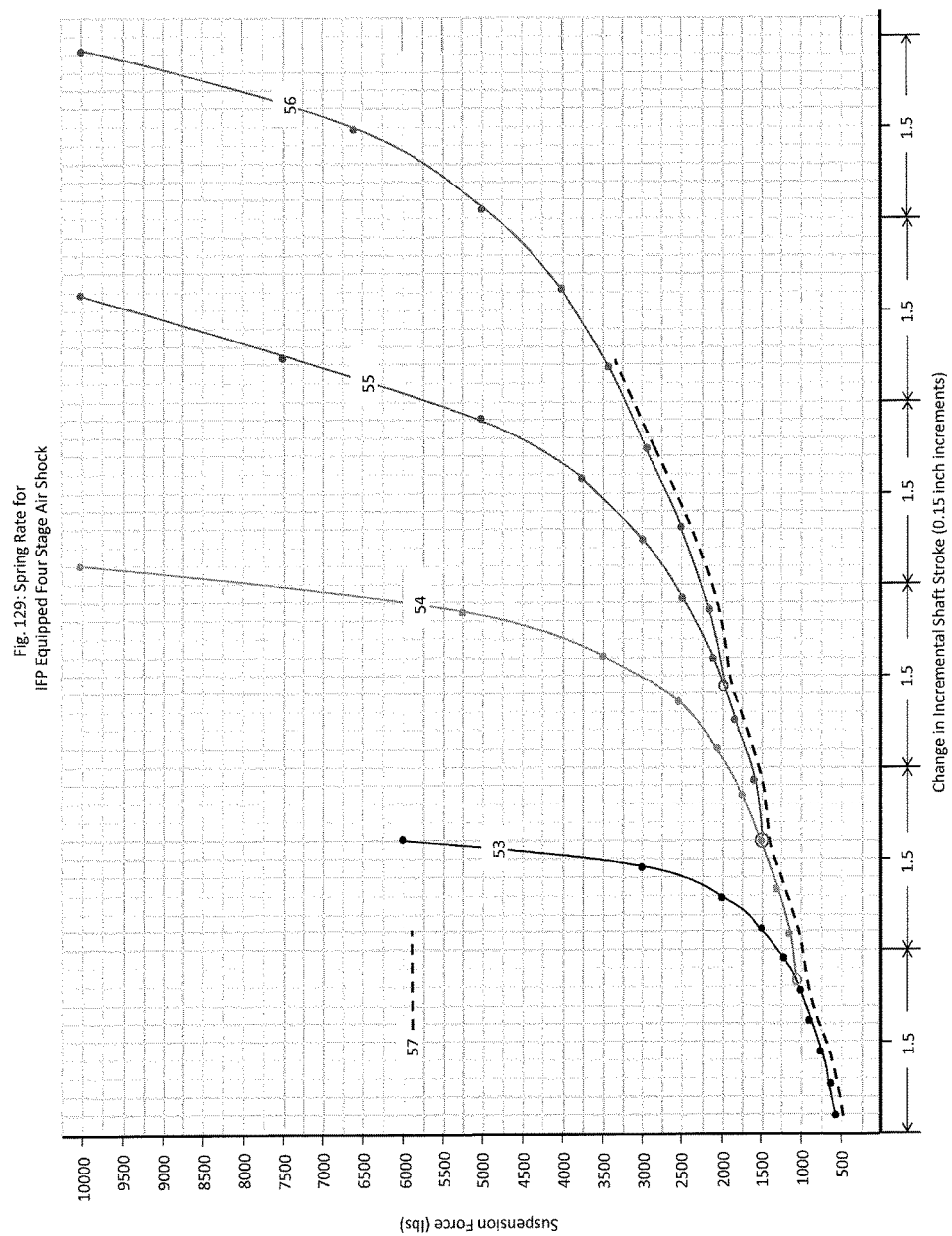

SHOCK ABSORBER WITH GAS PERMEABLE INTERNAL FLOATING PISTON

CROSS-REFERENCE TO RELATED APPLICATIONS

This application is a continuation-in-part of, and claims the benefit of priority to U.S. patent application Ser. No. 14/940,124, entitled "Gas Permeable Internal Floating Piston" filed on Nov. 12, 2015.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The Internal floating piston (IFP) is commonly used to maintain separation of the oil from the gas during the operation of the shock absorber. The separation prevents the oil from mixing with the gas thereby significantly improving the dampening characteristics of the shock. Accordingly, the internal floating piston is a highly desirable component in a shock. In order for the internal floating piston to be effective, the internal floating piston must act as a permanent barrier and the oil and gas must be located on opposite sides of the Internal floating piston. This requires physically locating the oil and gas on opposite sides of the internal floating piston while charging the shock with oil and gas. The charging process can be realized either during or after the construction of the shock. Charging of the shock during construction complicates the construction and increases the manufacturing costs. Charging of the shock after construction necessitates two valves (e.g., two Schrader valves); one for oil and another for gas. This also complicates the construction and increases the manufacturing costs and requires an additional step to charge the shock with oil and gas.

In the case of air shocks, the increased work and costs prohibit internal floating pistons from being used. To date, all commercially available air shocks operate with emulsion based dampening characteristics because no shock absorber manufacturer installs internal floating pistons in air shocks (see Fred Williams, Air Shock Technical-Air Shocks 4 Rocks, non-patent references).

Since the gas permeable internal floating piston is able to separate the oil from the gas and maintain that separation during the operation of the shock, then utilization of the gas permeable internal floating piston in place of an ordinary internal floating piston promises simpler construction, reduced manufacturing costs, and easier set-up methods for the shock. These benefits and other related benefits are disclosed herein.

Disclosed in patent application Ser. No. 13/854,055 is the multiple stage air shock; and, disclosed in patent application Ser. No. 14/935,423 is a process for constructing the multiple stage air shock whereby the process introduces several features including the determination of various lengths and spring rates that are absent in the art. The multiple stage air shock possesses both dampening and suspension spring capabilities whereby the dampening capability is based on an emulsion comprised of a mixture of oil and gas.

The emulsion is well known in the art and is considered to provide unpredictable dampening properties in a shock absorber, which in turn, lead to unpredictable handling characteristics for the vehicle. The deficiency of the emulsion lies in the mixing of the oil with the gas. The mixing permits the gas to alter the movement of the oil through the working piston whereby the movement of the oil through the working piston defines the dampening properties. One of the techniques used to improve the dampening properties of an emulsion based shock absorber is to prevent the oil from mixing with the gas, in effect eliminate the emulsion, which is achieved by simply separating the oil from the gas.

A common method of separating the oil from the gas is by installing an internal floating piston into the working tube of the shock absorber. The oil and gas are placed on opposing sides of the internal floating piston thereby effectively separating the oil from the gas. Such a method represents the basis for a shock absorber known as the monotube shock absorber whereby the monotube shock absorber is revered for its dampening properties. In a monotube shock absorber, the oil can be separated from the gas by attaching check valves to each end of the working tube whereby the check valve serves to add the oil and gas to the working tube. Then the oil is added via one check valve while the gas is added via the other check valve. This addition process serves to place the oil and gas on opposing sides of the internal floating piston.

Such an addition process is not realistic for the multiple stage air shock. The multiple stage air shock involves interconnecting components that serve in a manner like a working tube. However, one of the ends of one interconnecting component travels into another interconnecting component during the operation of the air shock, and therefore, is not available for receiving a check valve. A more realistic method would involve the addition of the oil and gas into the interconnecting component via a single check valve and then separating the oil from the gas in an autonomous fashion. In this case, the autonomous fashion refers to the selection of materials used in the construction of the internal floating piston. In principle, an internal floating piston that allows the gas but not the oil to pass through its structure would represent a viable means to separate the oil from the gas. This means serves as the basis for the present invention.

BRIEF SUMMARY OF THE INVENTION

The present invention extends the gas permeable internal floating piston to the single shock body, or shock absorber. The gas permeable internal floating piston defines an effective means of achieving and maintaining separation of the oil from the gas without the additional manufacturing costs for a shock absorber of comparable performance.

The present invention offers a novel internal floating piston intended for use with the multiple stage air shock. The dampening properties of the multiple stage air shock are based on an emulsion comprised of a mixture of an oil and gas. The internal floating piston is uniquely capable of separating the oil from the gas, and in turn, changing the dampening properties of the multiple stage air shock.

The present invention also offers an internal floating piston that:

improves the dampening characteristics of the shock by maintaining the separation of the oil and gas over the life of the shock;

can operate with various oils. The oils are derived from either petroleum or synthetic base stocks and can include additives that provide the oil with specific properties;

can operate with various gases, including nitrogen, oxygen, carbon monoxide, carbon dioxide, helium, neon, and argon;

is constructed with a gas permeable membrane whereby the membrane permits the gas but not the oil to pass through the structure of the internal floating piston. This passage serves to separate the oil from the gas;

operates autonomously with the use of a spring, the spring serves to create a pressure differential across the structure of the internal floating piston whereby the pressure differential serves to induce passage of the gas through the structure thereby separating the oil from the gas;

moves in conjunction with the shaft during both compression and extension of the shaft the movement, particularly during extension, is a consequence of restricting permeation of the gas throughout the operation of the shaft, the restriction achieved by utilizing a membrane with a slow rate of permeation;

improves the dampening properties of each stage in the air shock by maintaining the separation of the oil and gas throughout the operation of each stage in the air shock;

serves to shorten the extended length, but has no effect on the spring rate, of the air shock.

BRIEF DESCRIPTION OF THE SEVERAL VIEWS OF THE DRAWING

Brief Description of the Drawings

Figure 9:
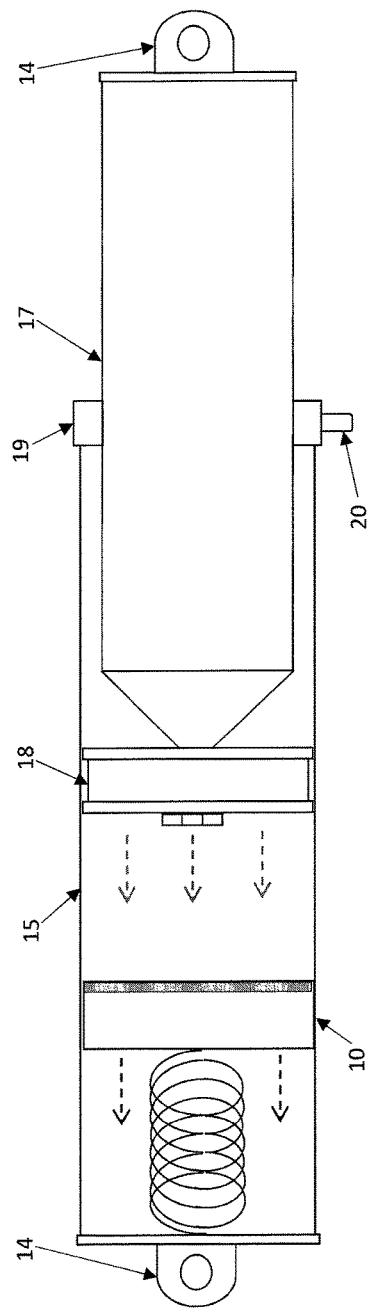
Figure 10:
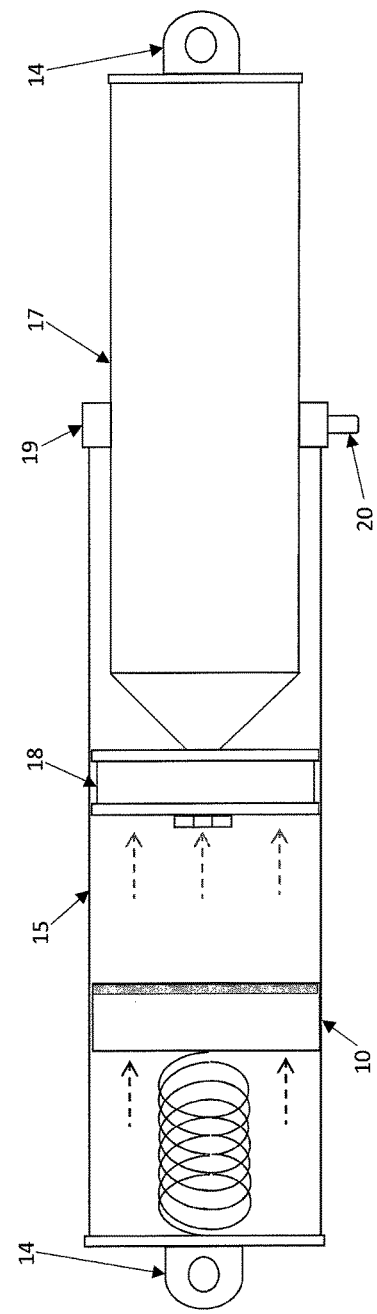
Figure 11:
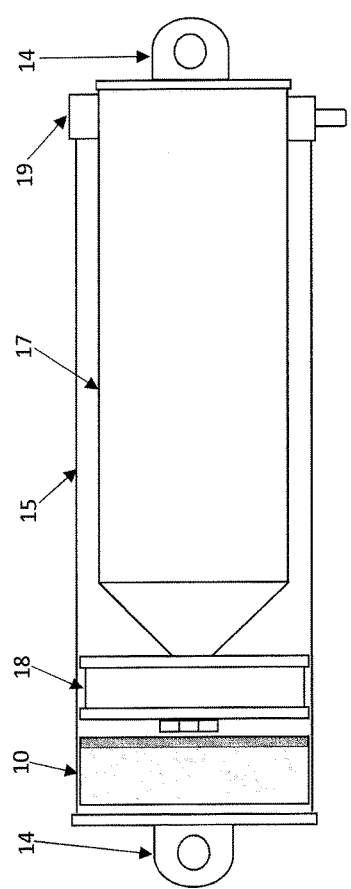
Figure 12:
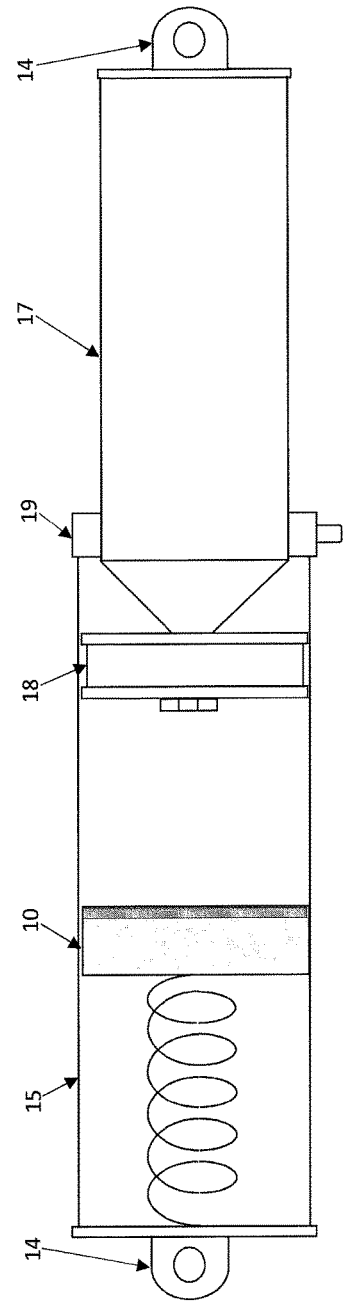
Figures 15, 16:
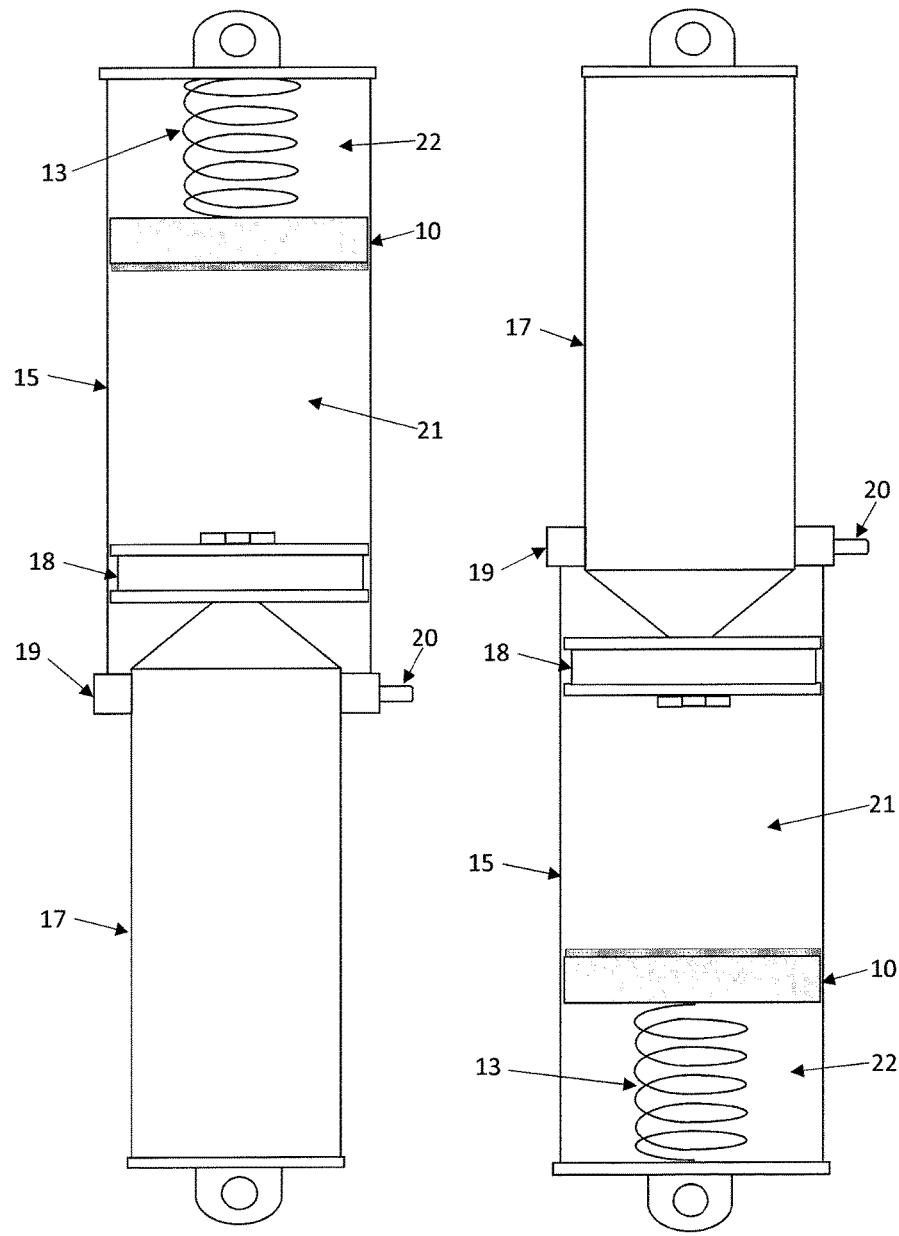
Figure 17:
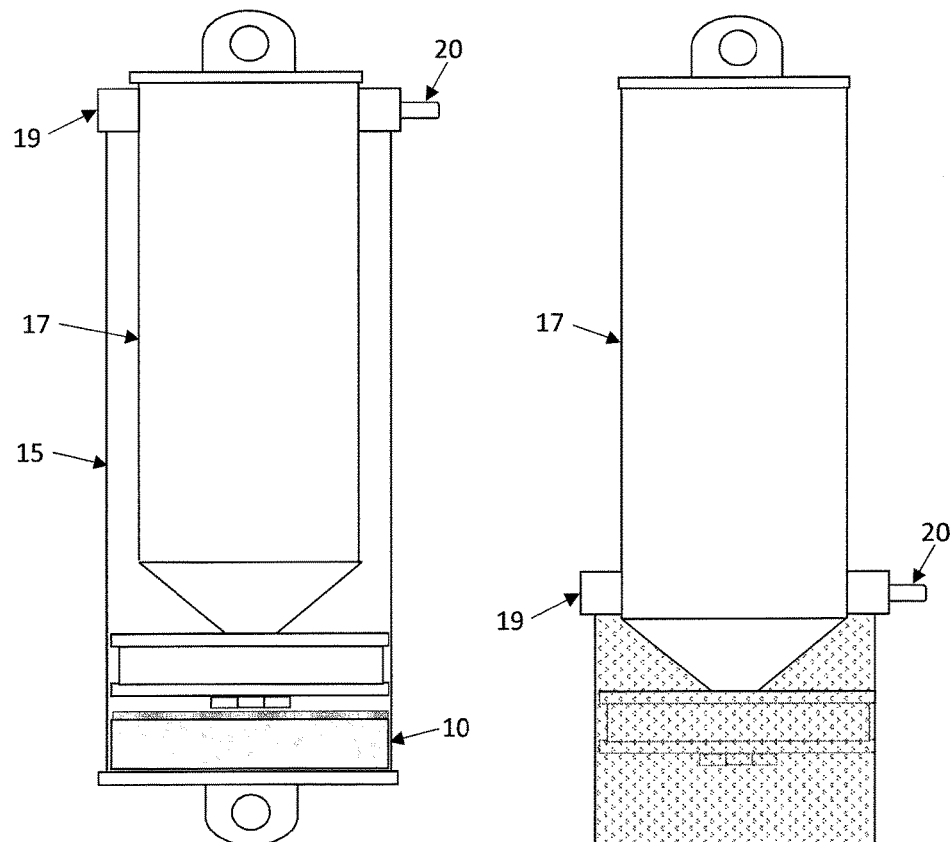
Figure 18:
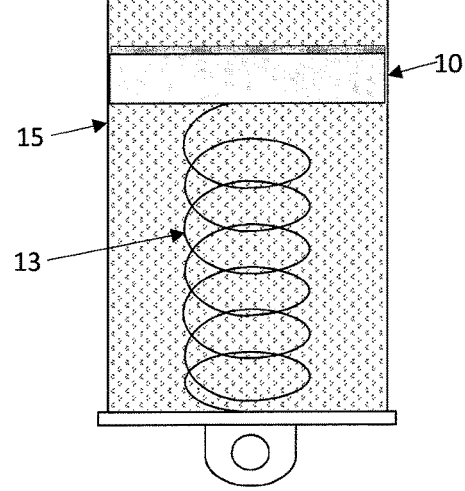
Figures 19, 20:
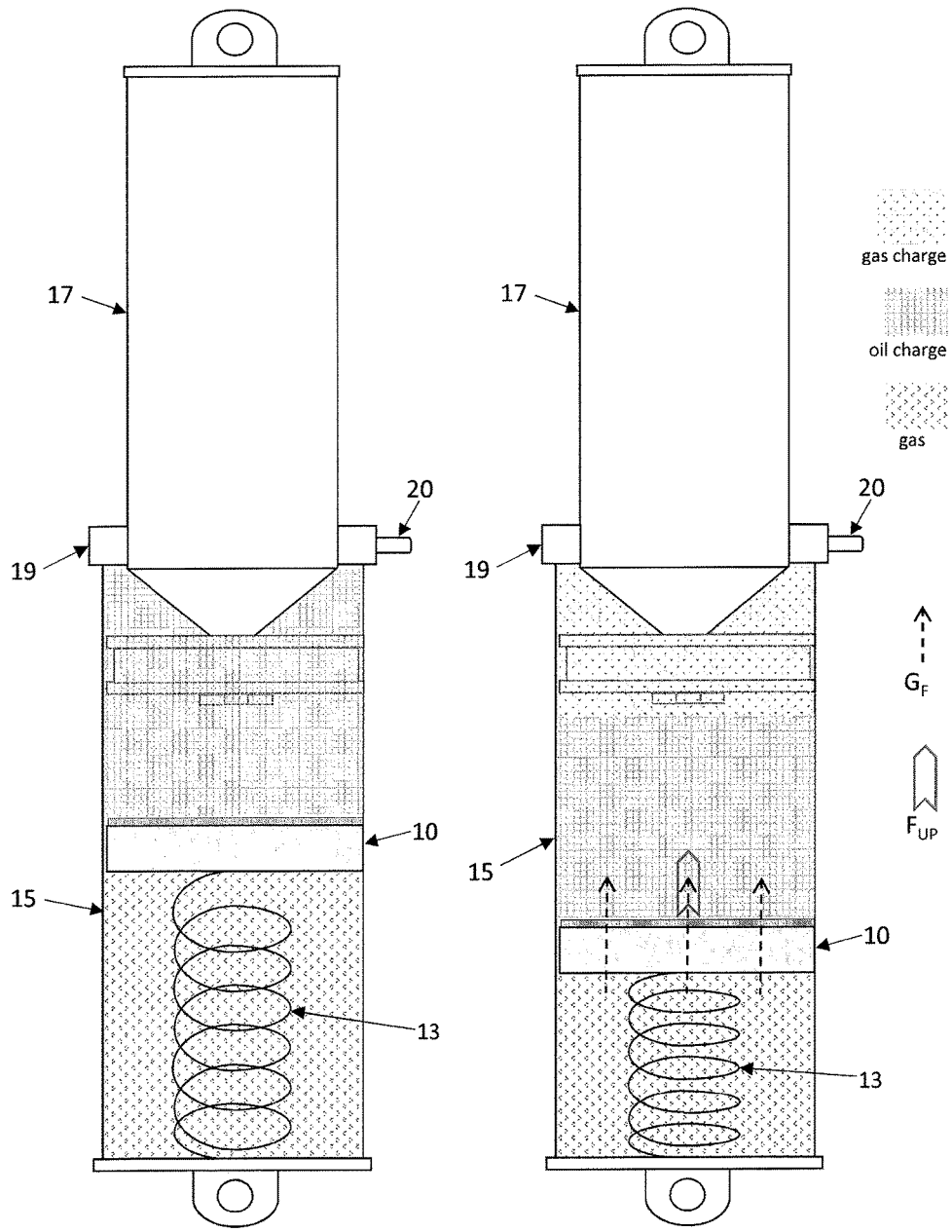
Figures 21, 22:
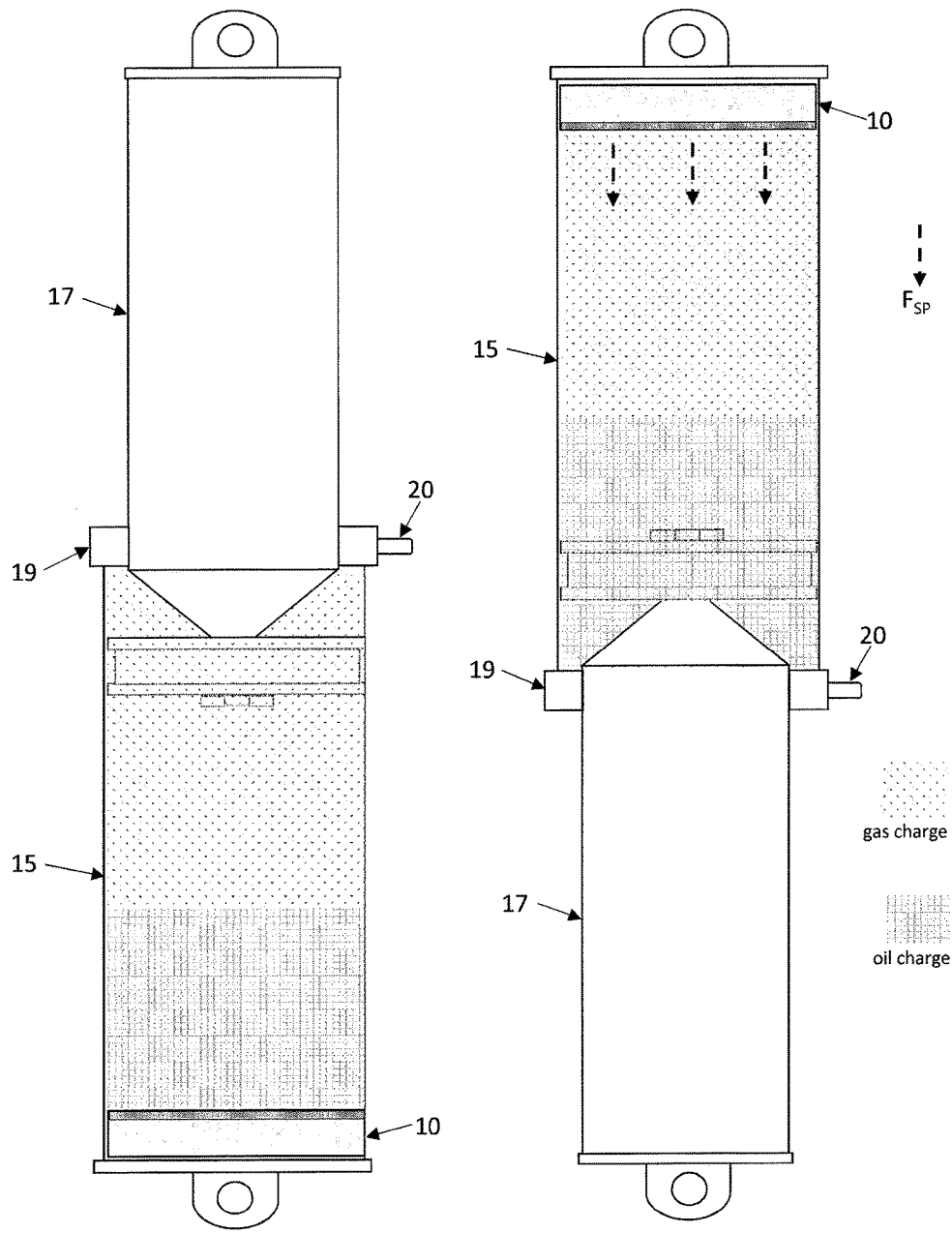
Figures 23, 24:
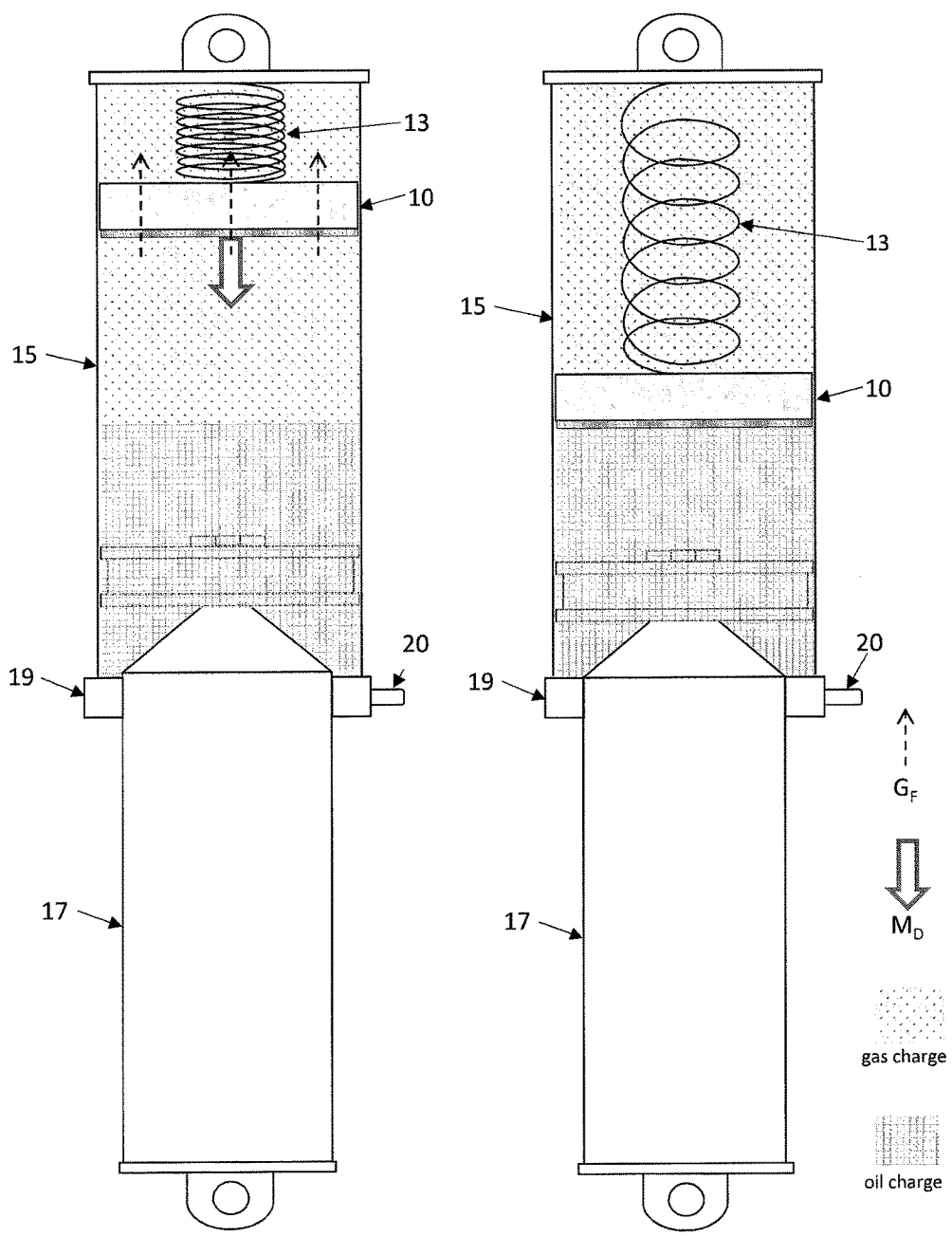
Figure 25:
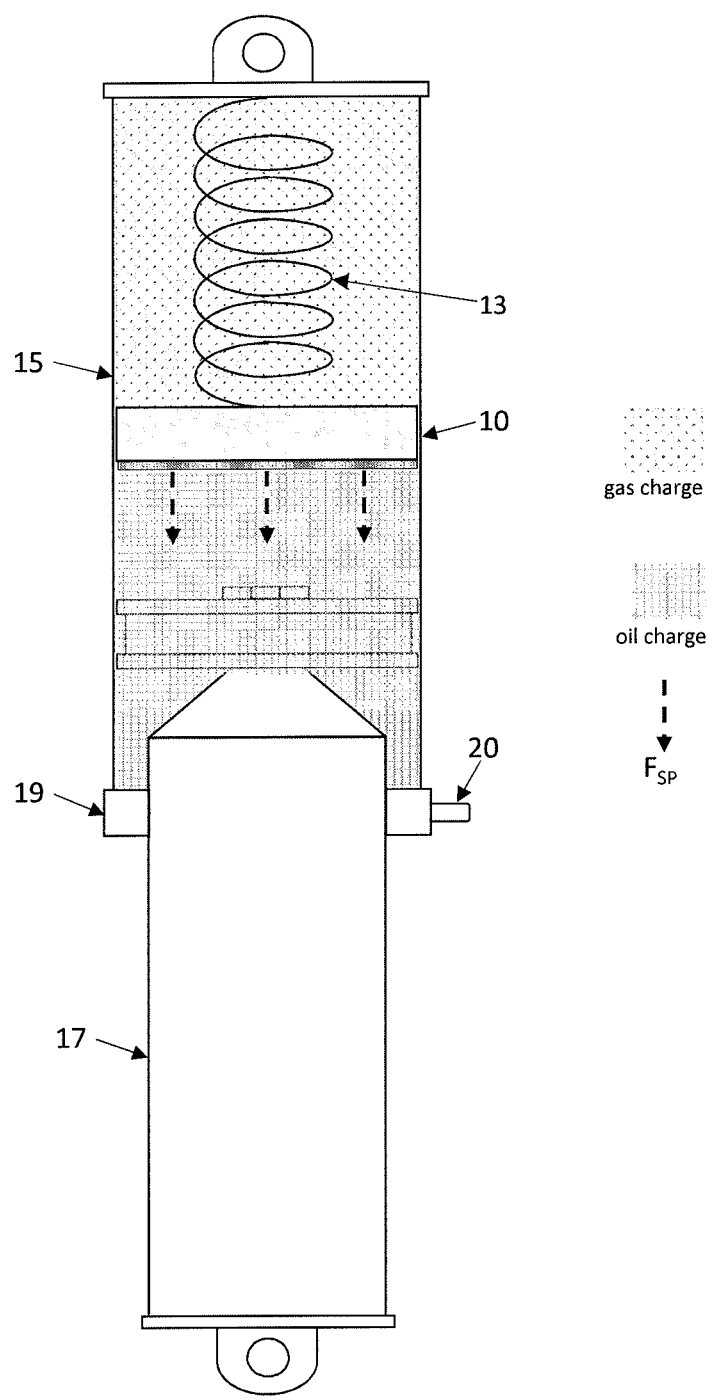
Figures 26, 27:
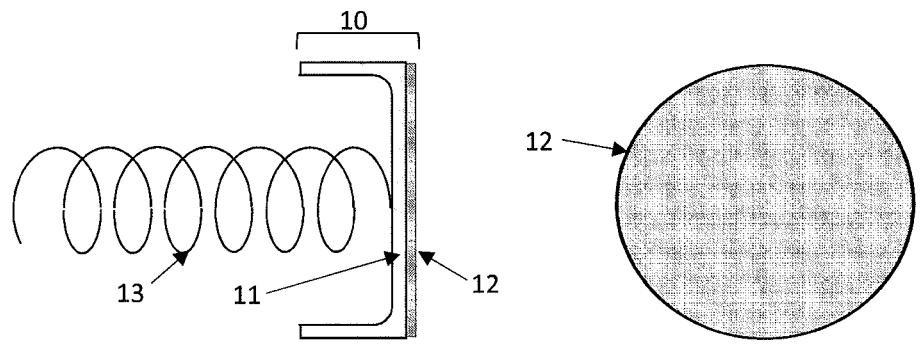
Figure 28:
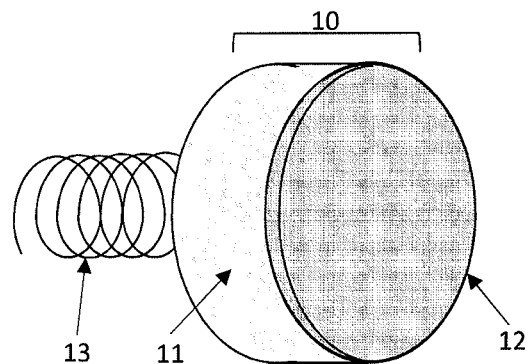
Figure 29:
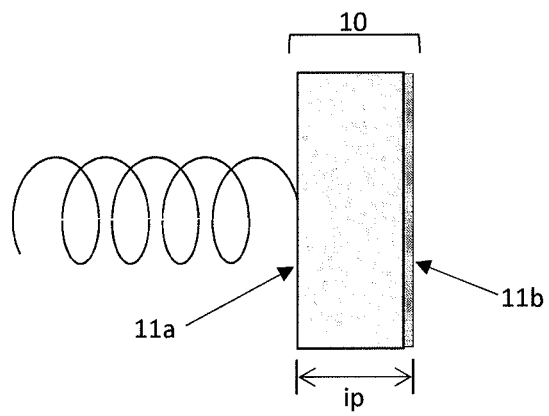
Figure 34:
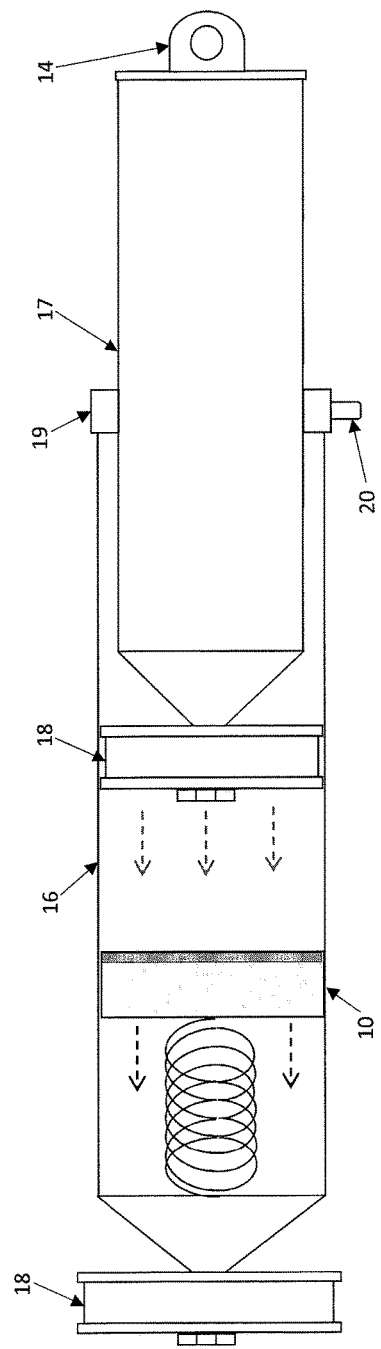
Figure 35:
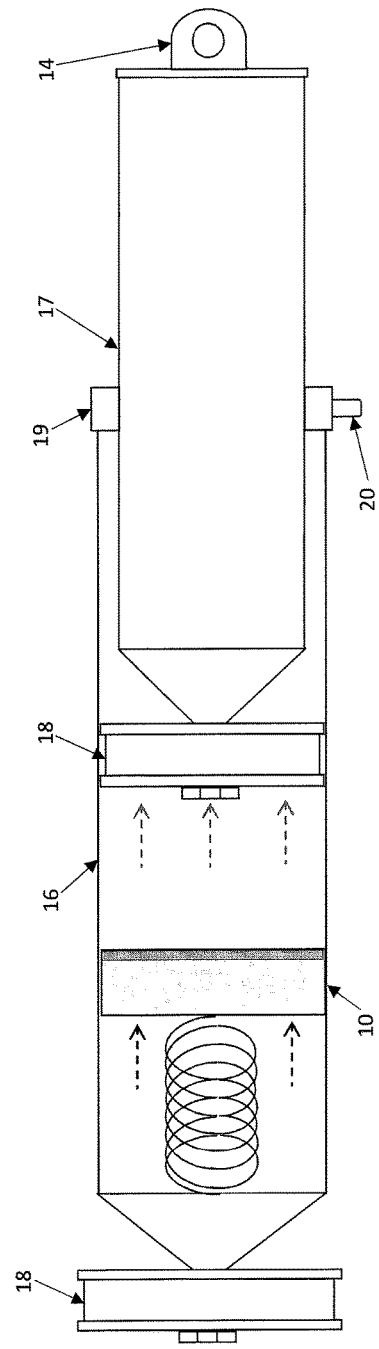
Figure 44:
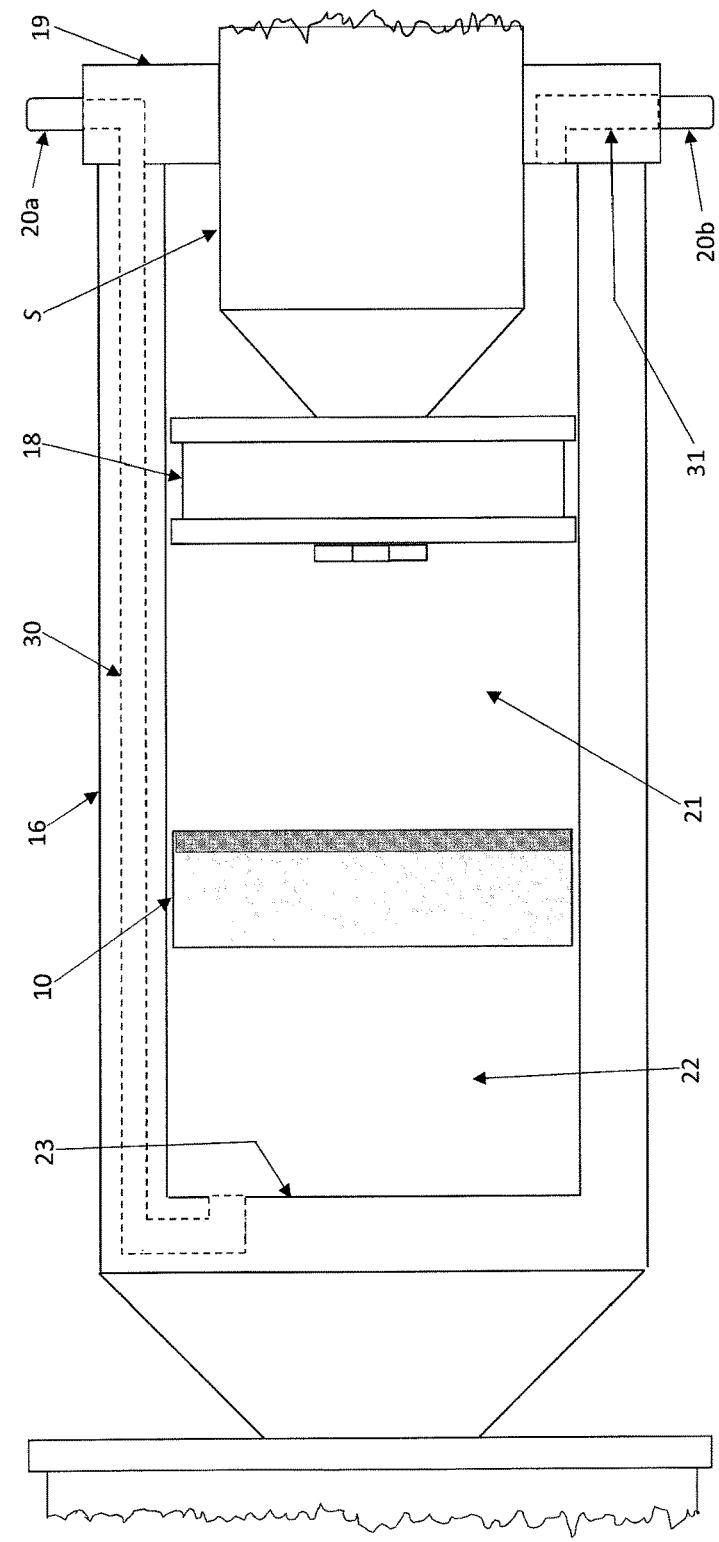
Figures 45, 46:
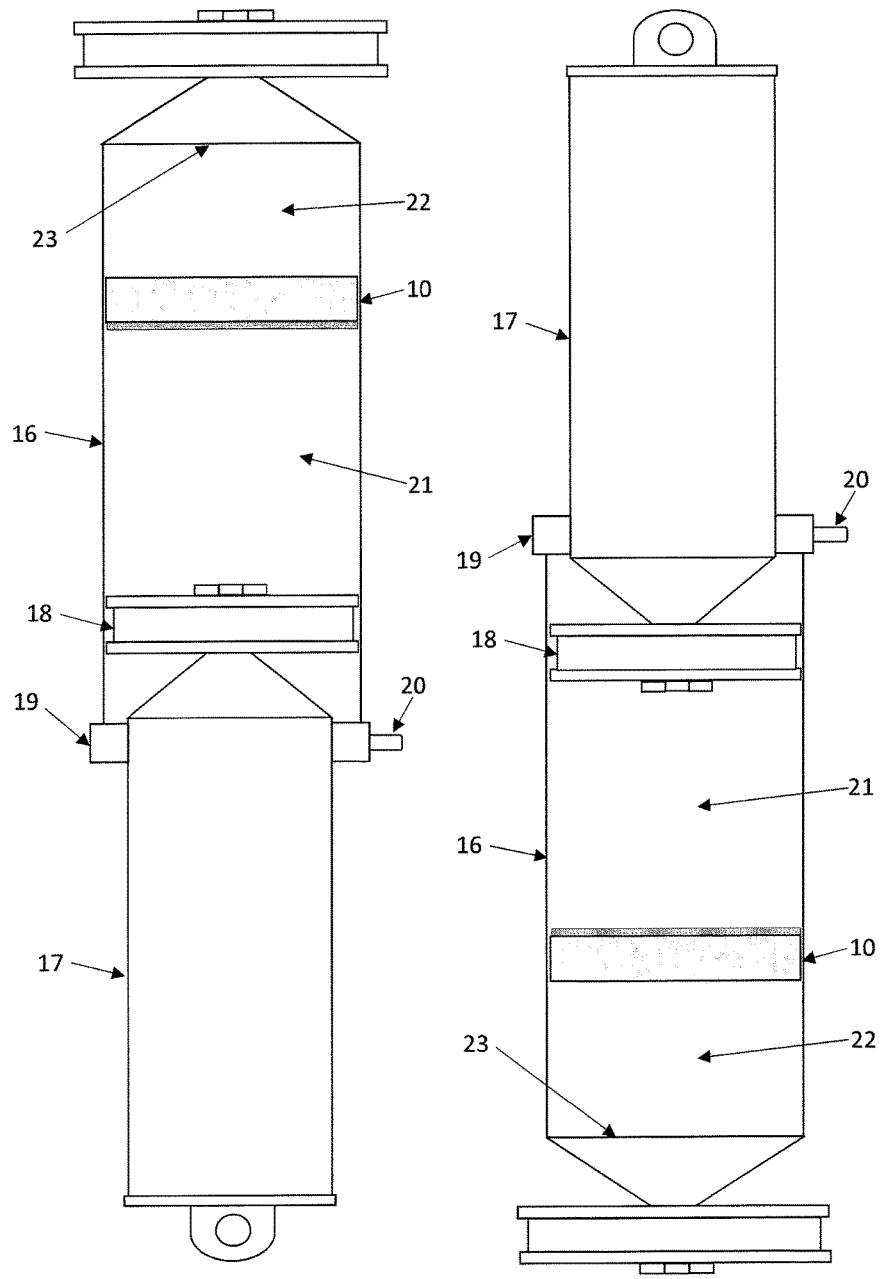
Figures 47, 48:
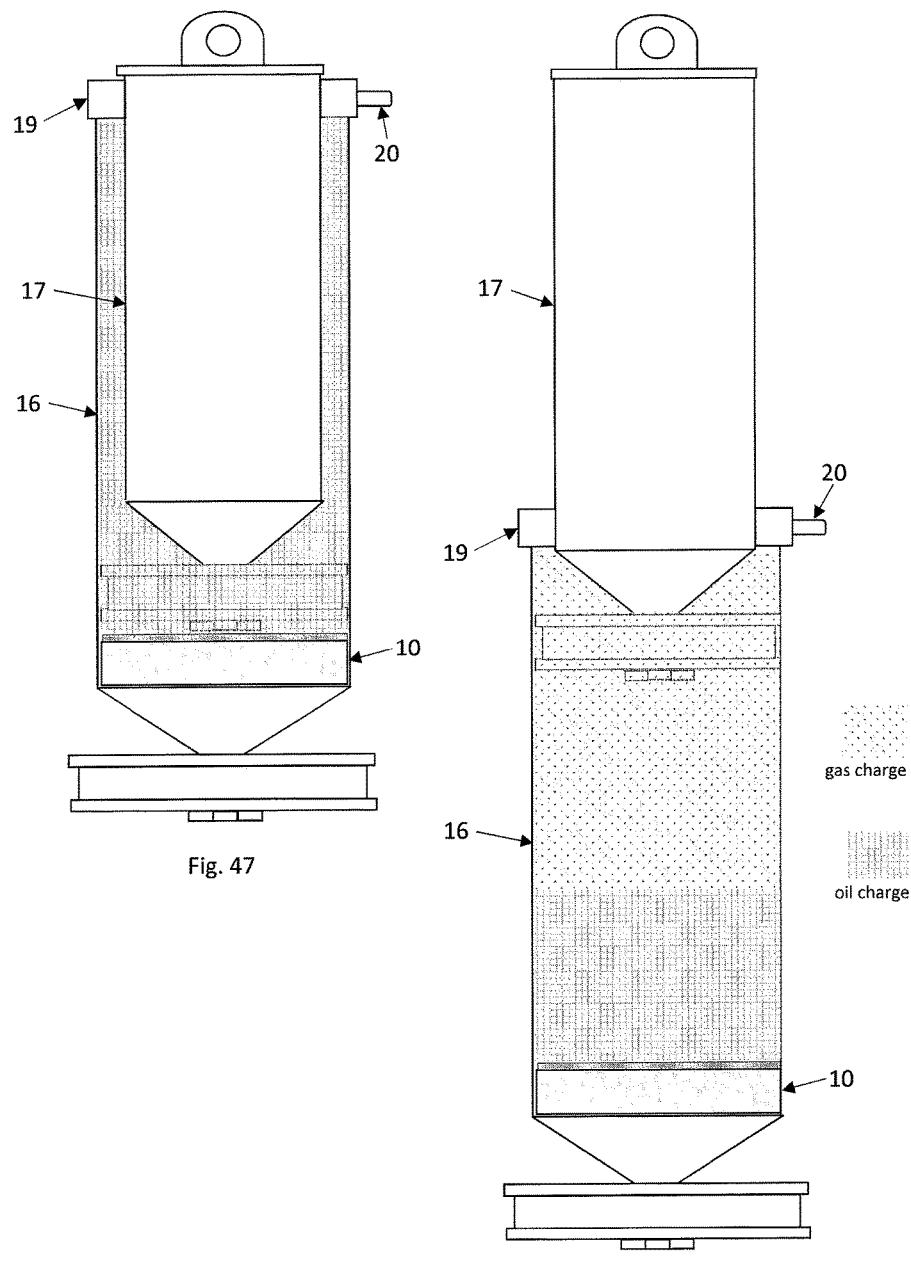
Figures 49, 50:
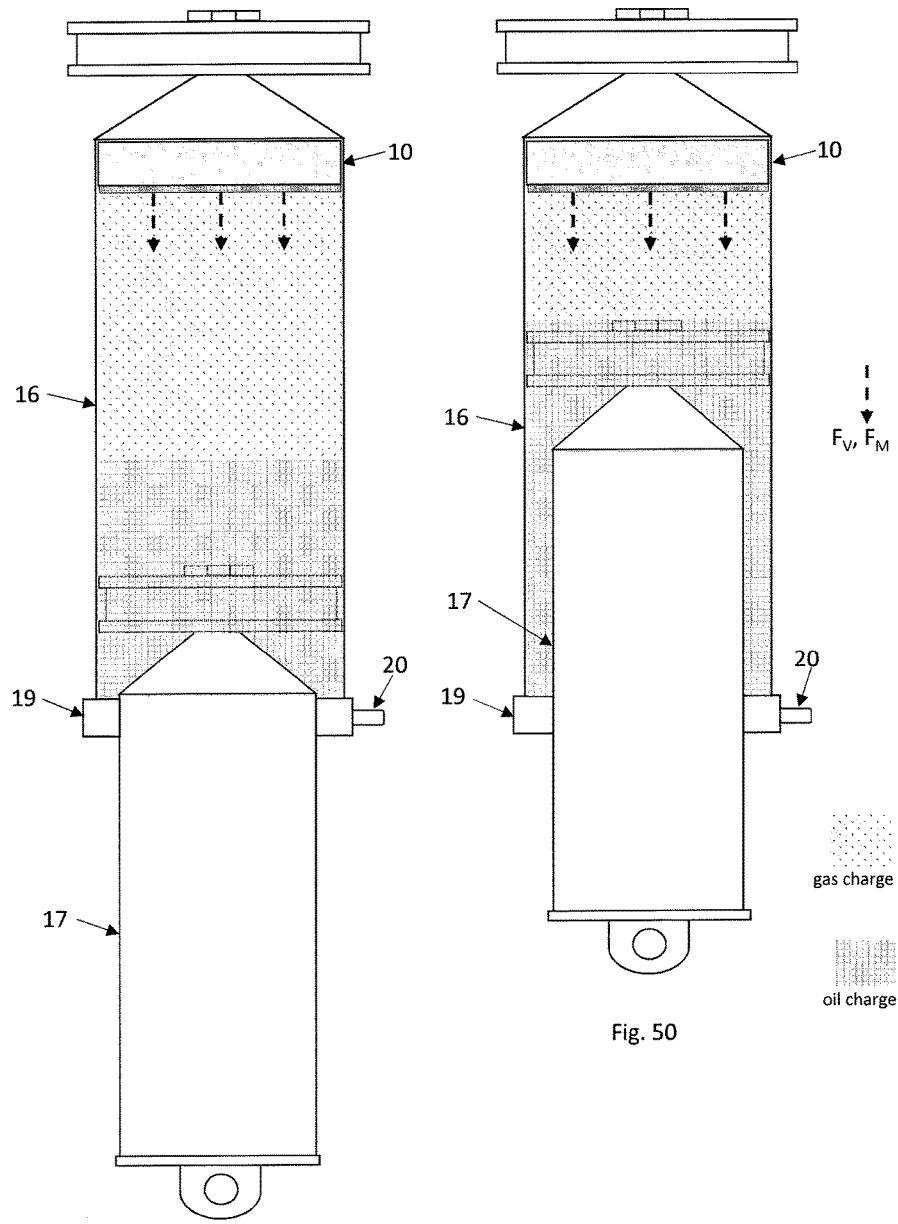
Figures 53, 54:
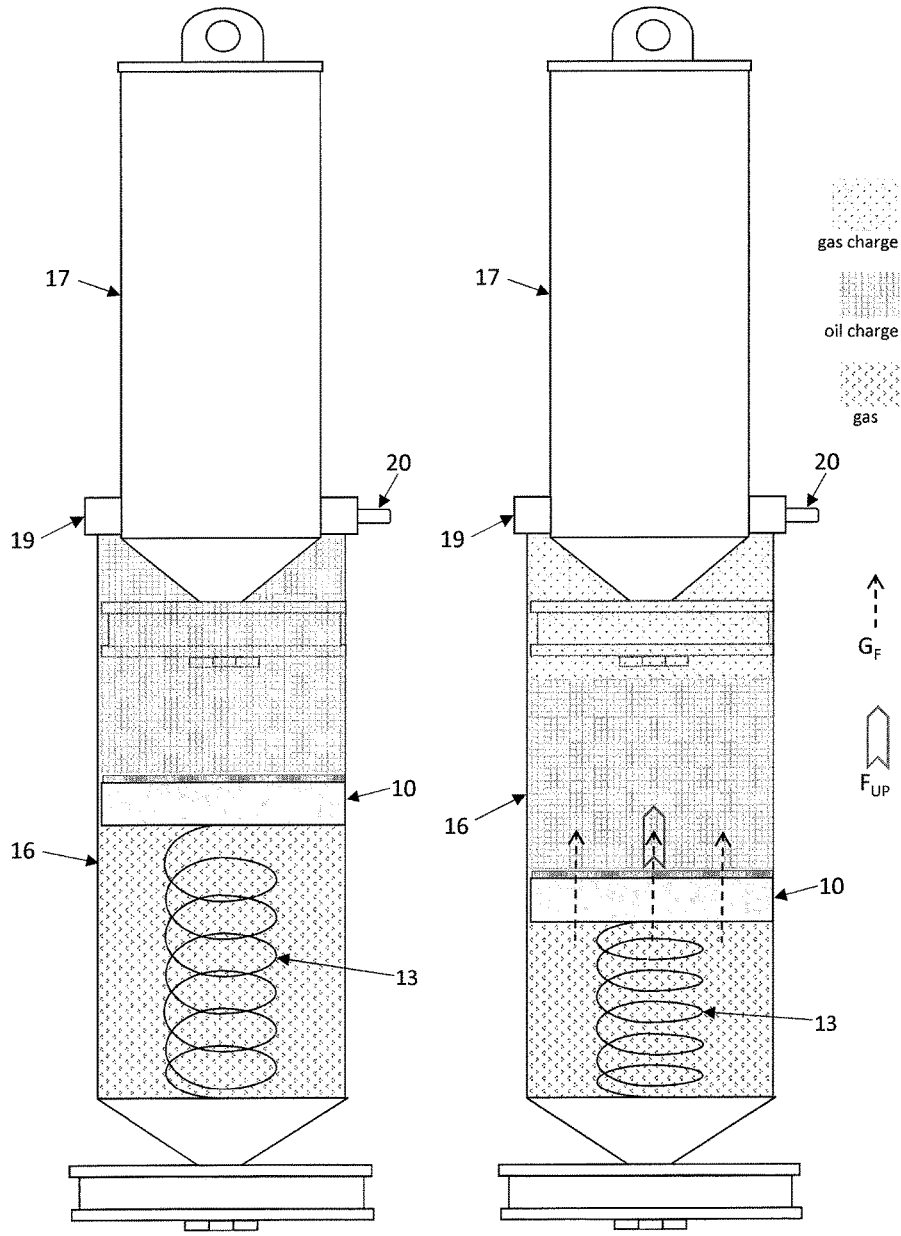
Figures 55, 56:
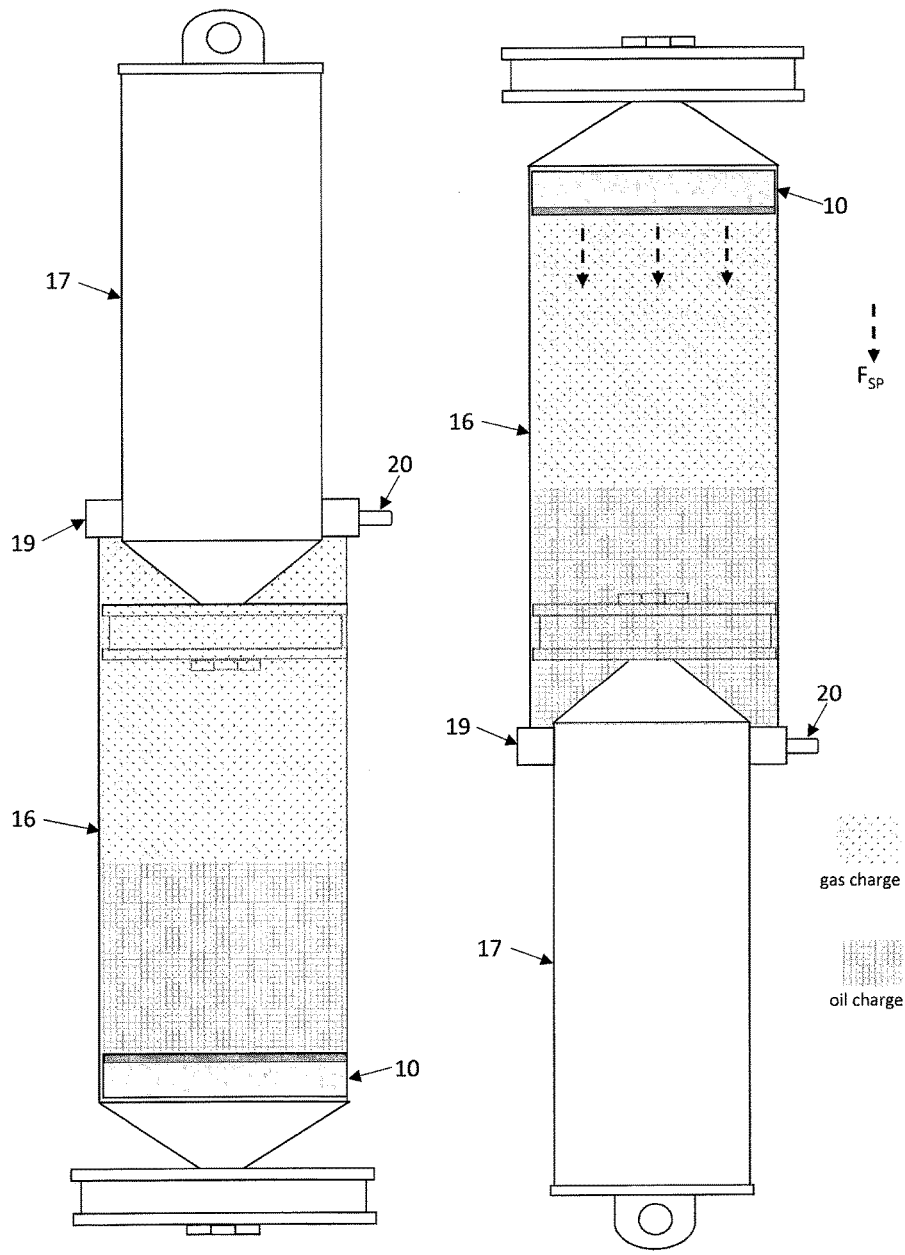
Figures 57, 58:
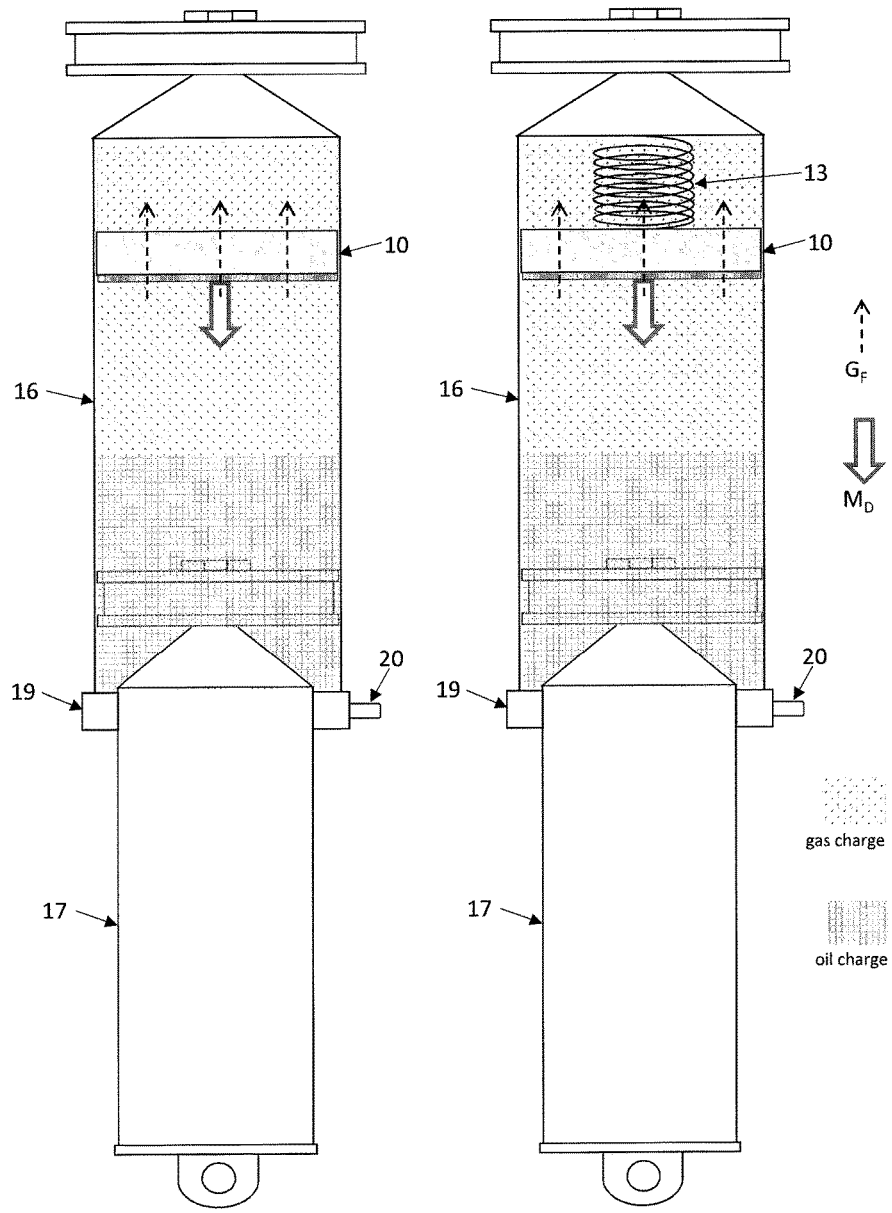
Figures 59, 60:
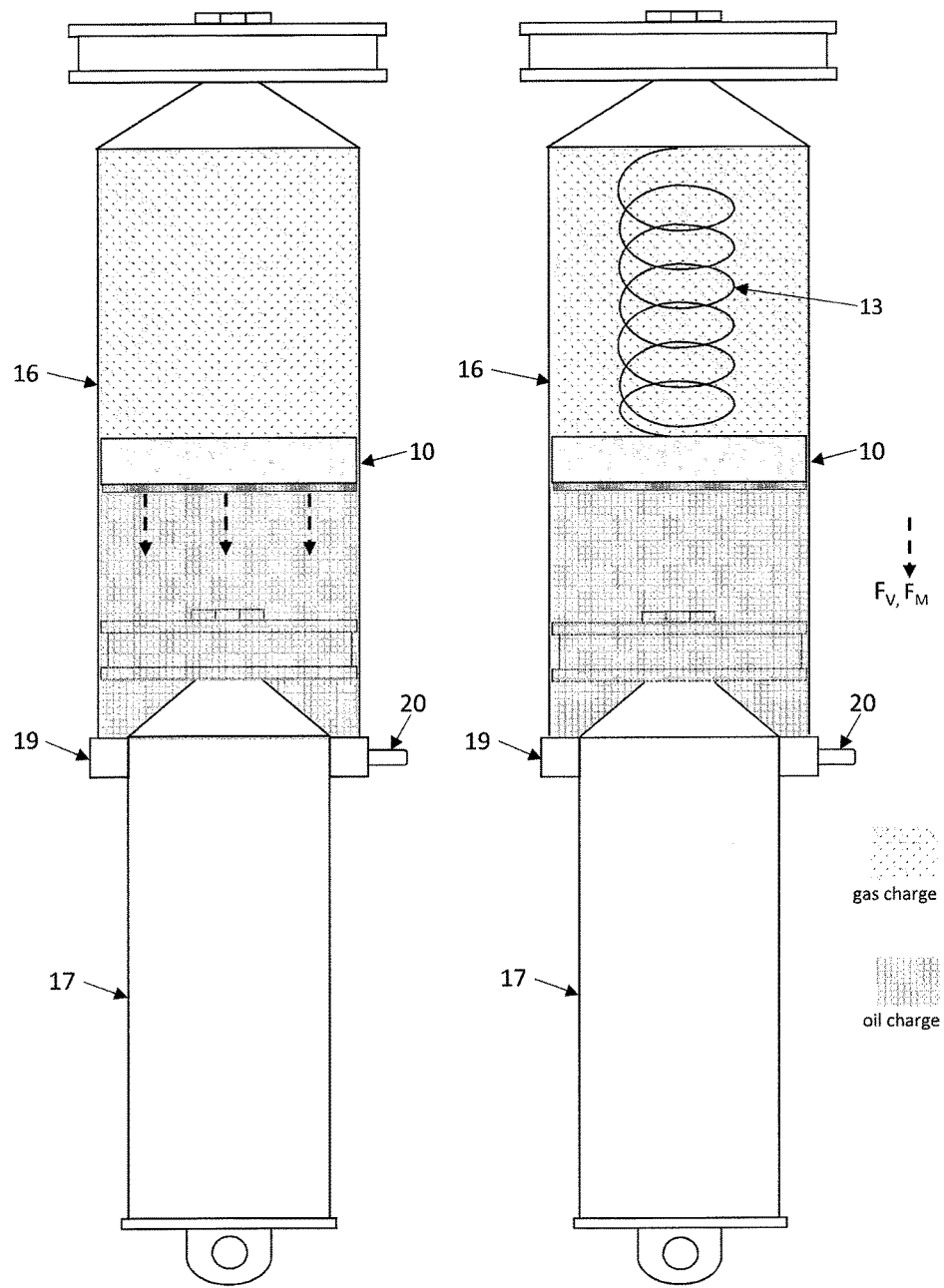
Figure 61:
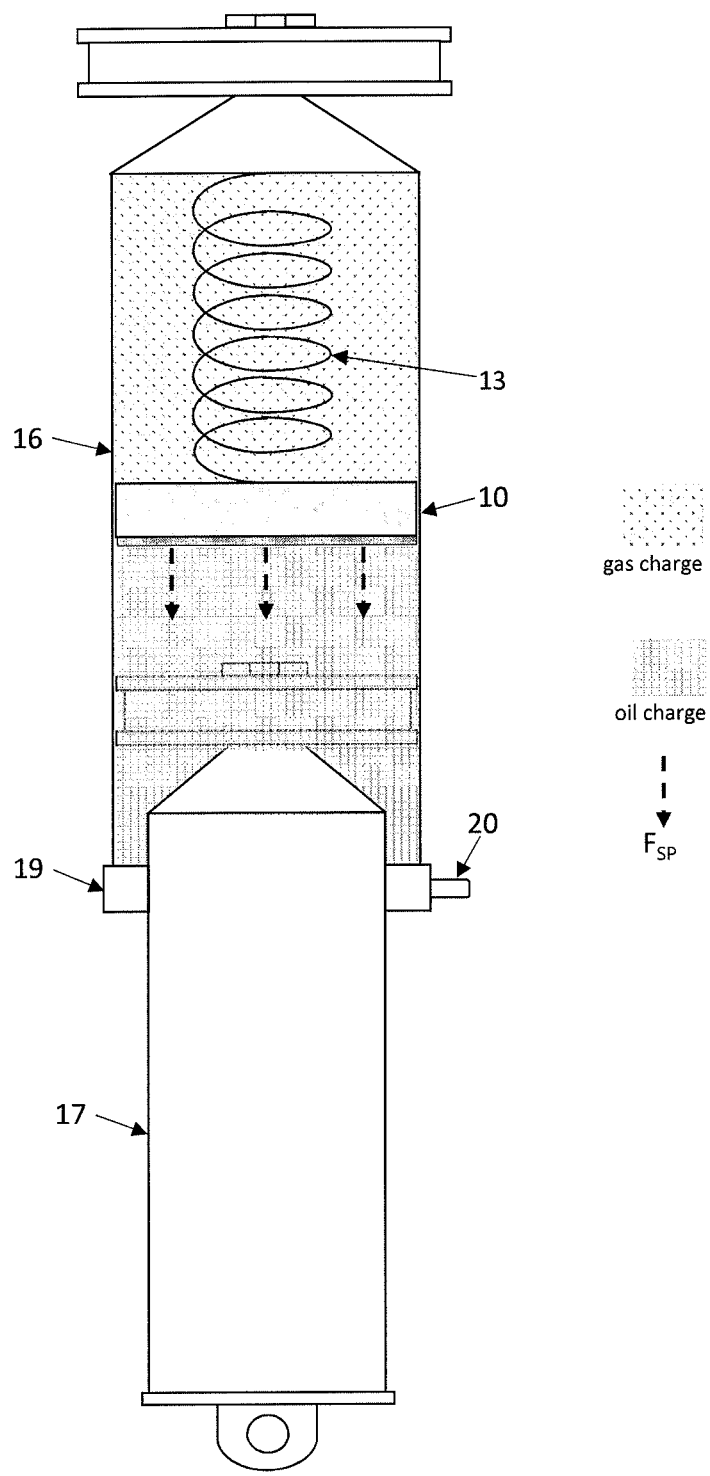
Figure 62:
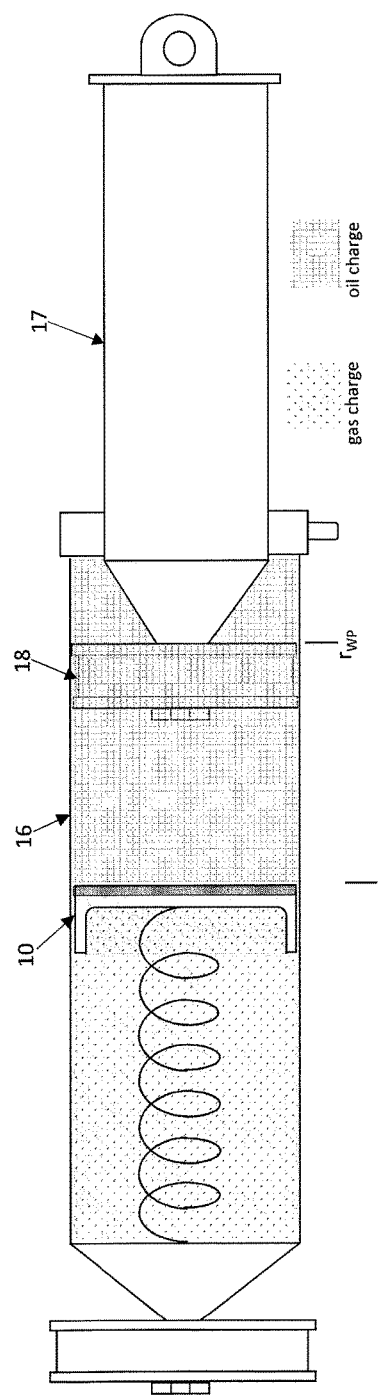
Figure 63:
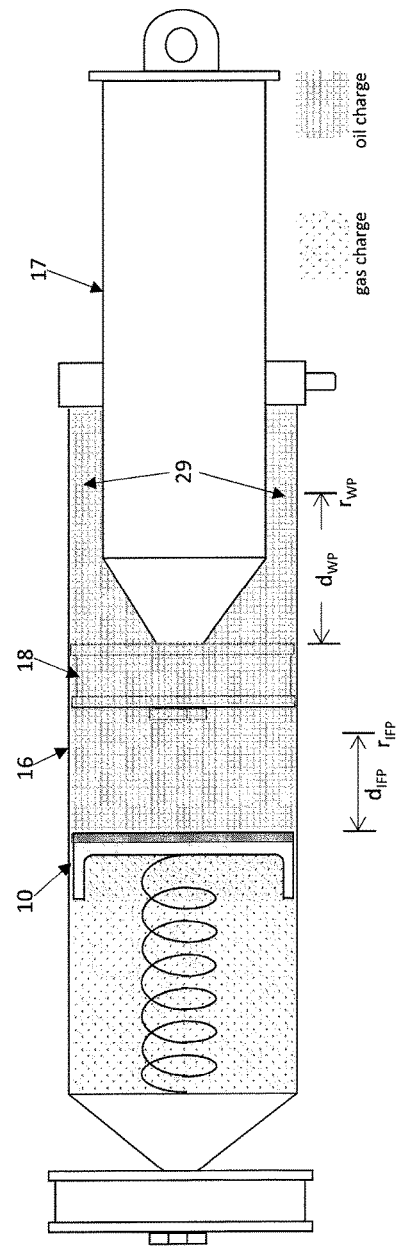
Figure 64:
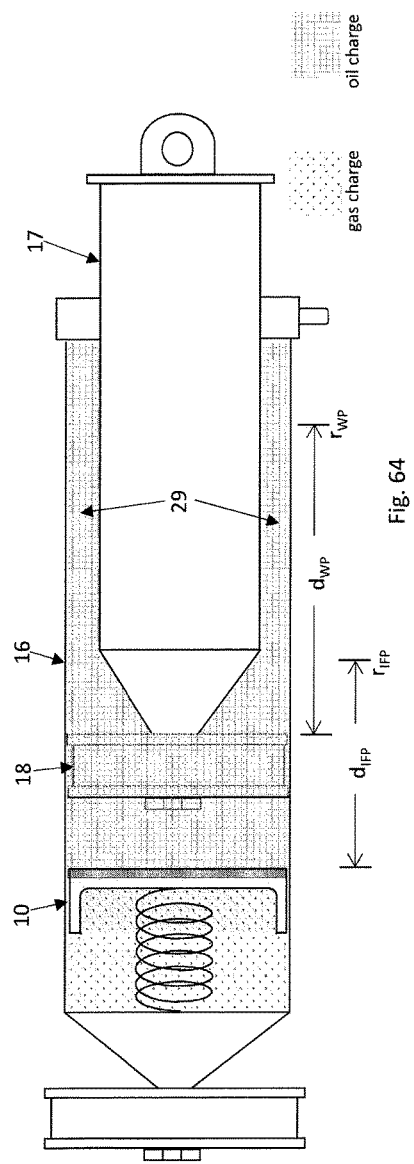
Figure 65:
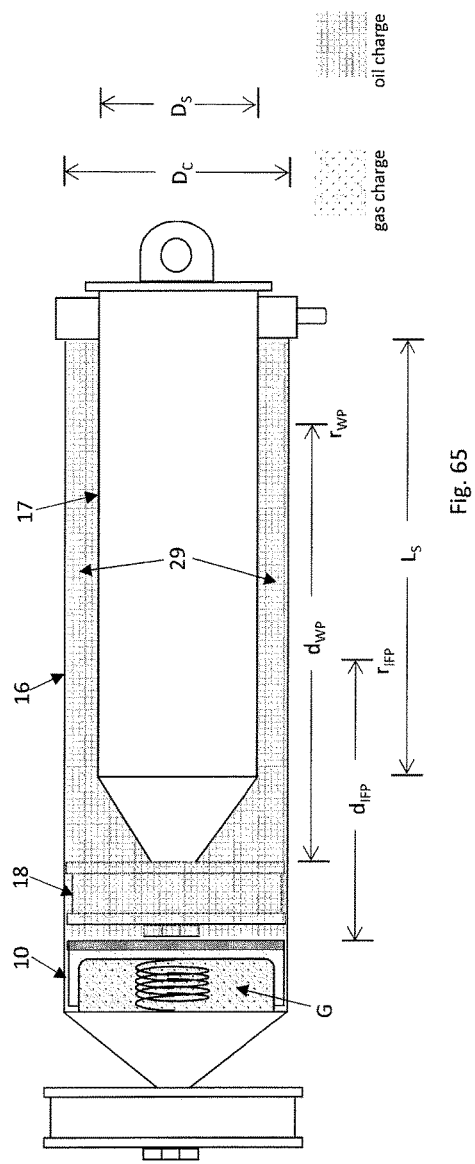
Figure 77:
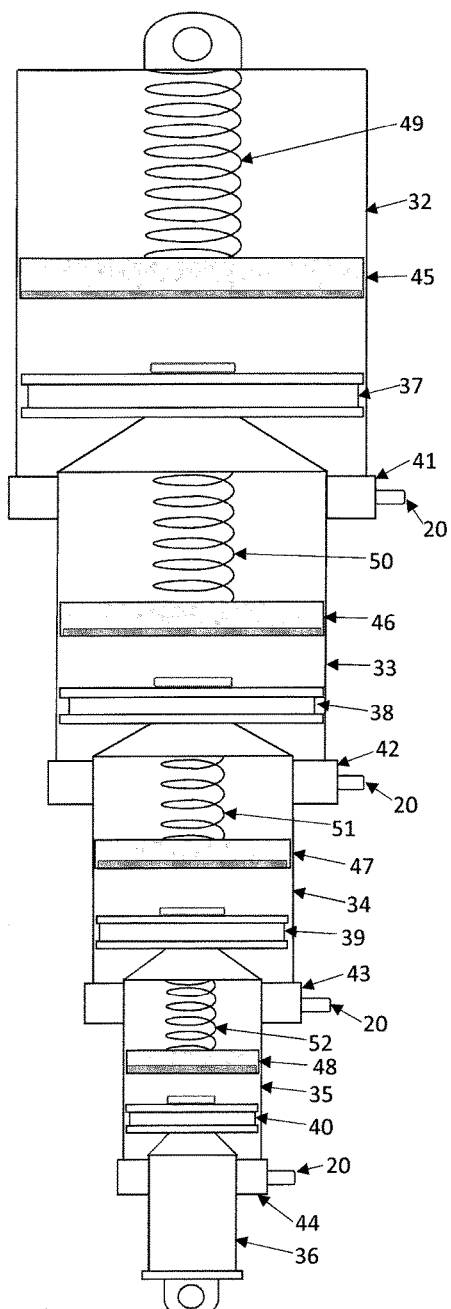
Figure 78:
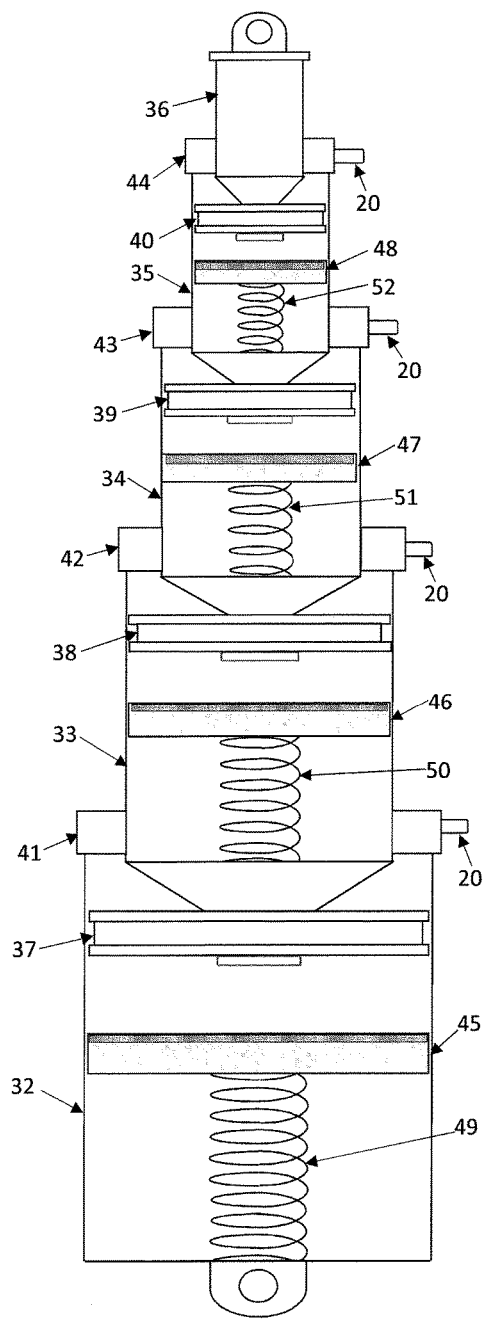
Figure 79:
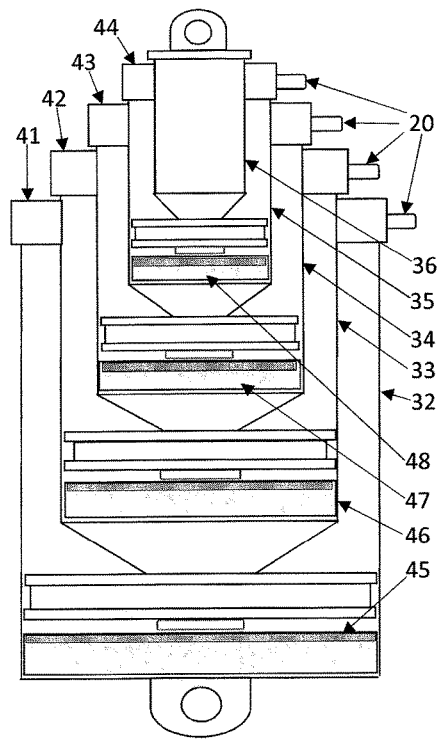
Figure 80:
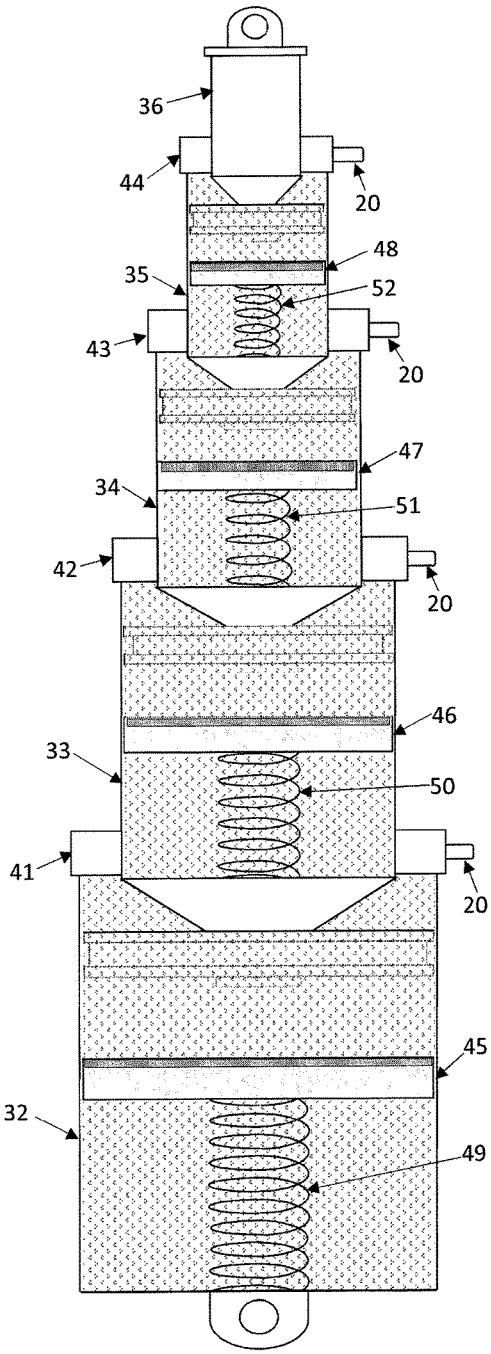
Figures 81, 82:
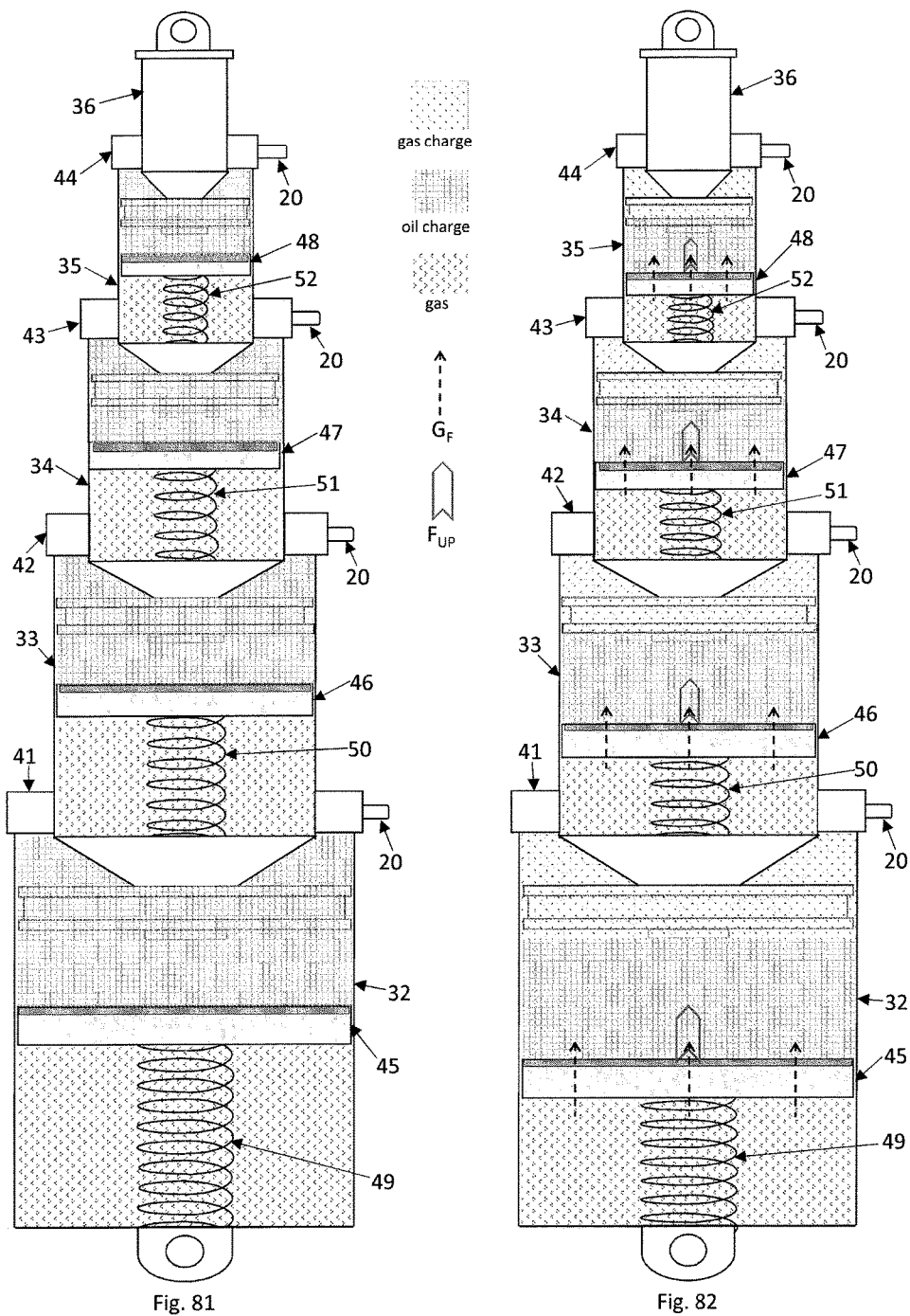
Figures 85, 86:
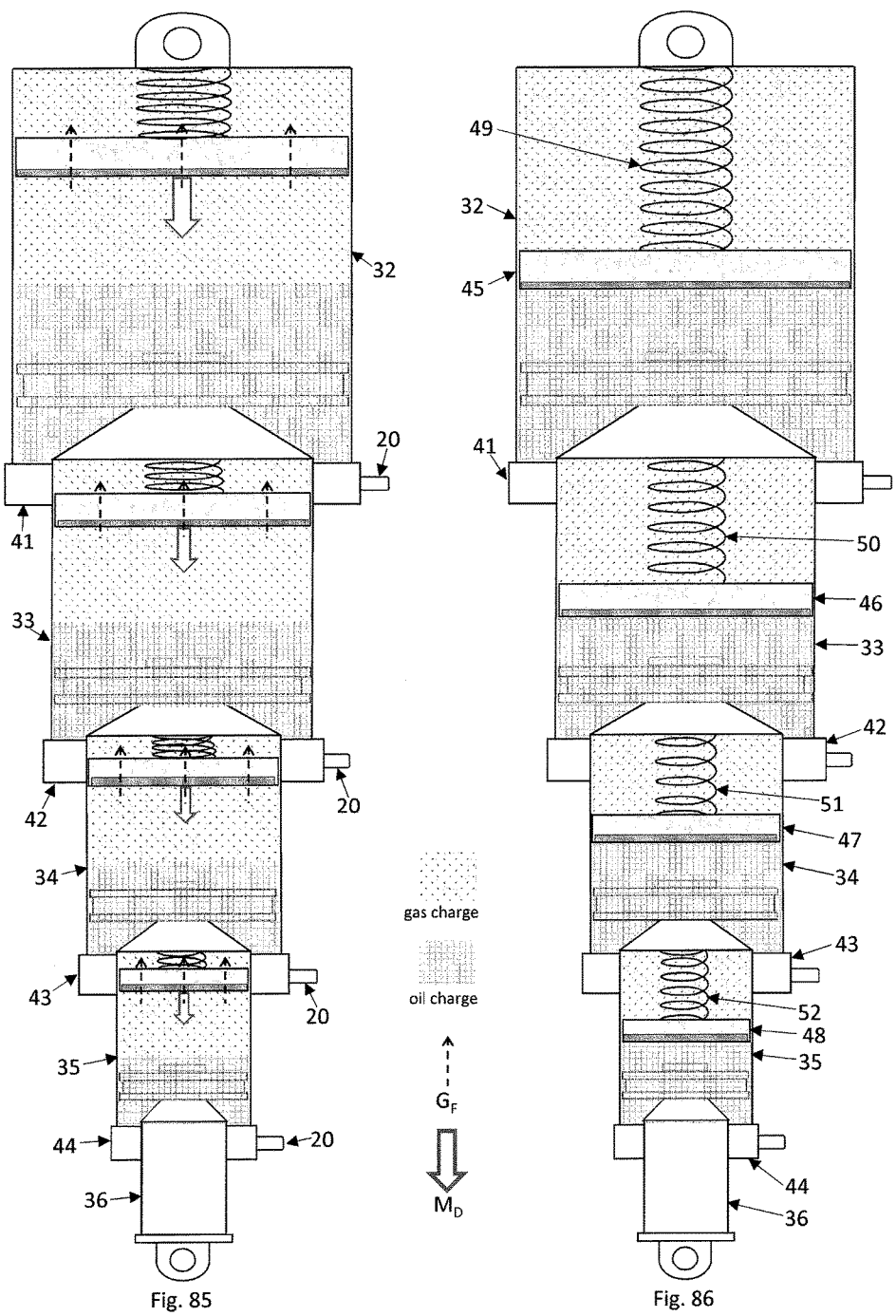

For purposes of discussion, the internal floating piston is abbreviated as IFP. It is appreciated that these drawings depict only illustrated embodiments of the invention and are therefore not limited to the precise arrangements and instrumentalities shown:

FIG. 1 is a side perspective view of the solid wall in the IFP;

FIG. 2 is a side perspective view of the porous bottom in the IFP;

FIG. 3 is a side perspective view of the gas permeable membrane;

FIG. 4 is a side perspective view of inside of the porous cup in the IFP;

FIG. 5 is a side perspective view of outside of the porous cup in the IFP;

FIG. 6 is a side perspective view of the gas permeable IFP;

FIG. 7 is a side plan view of the shock;

FIG. 8 is a side perspective view of the shock;

FIG. 9 is a side plan view of the shock being compressed;

FIG. 10 is a side plan view of the shock being extended;

FIG. 11 is a side plan view of the shock is a fully compressed condition;

FIG. 12 is a side plan view of the shock is a fully extended condition;

FIG. 13 is a side perspective view of FIG. 5;

FIG. 14 is a side perspective view of FIG. 6;

FIG. 15 is a side plan view of the shock in a right-side up orientation;

FIG. 16 is a side plan view of the shock in an up-side down orientation;

FIG. 17 is a side plan view of the up side down oriented fully compressed shock;

FIG. 18 is a side plan view of the up side down oriented fully extended shock, and emphasizes purging the shock with gas;

FIG. 19 is a side plan view of the up side down oriented fully extended shock, and emphasizes the oil charge in the one cell with purge gas in the other cell;

FIG. 20 is a side plan view of the up side down oriented fully extended shock that is charged with oil, and emphasizes the net flow of gas through the internal floating piston from the other cell to the one cell due to the shock being charged with gas;

FIG. 21 is a side plan view of the up side down oriented fully extended shock that is charged with oil and the gas;

FIG. 22 is a side plan view of the right side up oriented fully extended shock that is charged with oil and the gas, and emphasizes the force of the spring pushing the internal floating piston downward;

FIG. 23 is a side plan view of the right side up oriented fully extended shock that is charged with oil and the gas, and emphasizes the net flow of gas through the internal floating piston from the one cell to the other cell due to the downward motion of the IFP;

FIG. 24 is a side plan view of the right side up oriented fully extended shock that is charged with oil and the gas, and emphasizes the location of the oil in the one cell and the gas in the other cell;

FIG. 25 is a side plan view of the right side up oriented partially extended shock that is charged with oil and the gas, and emphasizes the force of the spring constantly pushing the internal floating piston downward;

FIG. 26 is a side plan view of the IFP, and emphasizes the shape of the cup;

FIG. 27 is a plan view of the outer side of the IFP and emphasizes the membrane;

FIG. 28 is a side perspective view of the IFP;

FIG. 29 is a side plan view of the IFP and emphasizes the properties of the IFP;

FIG. 30 is a side plan view of the installation of the IFP in a stage, the one component of the stage is a dual function shaft;

FIG. 31 is a side plan view of the installation of the IFP in a stage, the one component of the stage is a single function shaft;

FIG. 32 is a side perspective view of FIG. 5;

FIG. 33 is a side perspective view of FIG. 6;

FIG. 34 is a side plan view of the IFP equipped stage undergoing compression;

FIG. 35 is a side plan view of the IFP equipped stage undergoing extension;

FIG. 36 is a side plan view of the IFP equipped stage at full compression, and emphasizes the dimensions of the parts of the stage;

FIG. 37 is a side plan view of the IFP equipped stage at full extension, and emphasizes the dimensions of the parts of the stage;

FIG. 38 is a side perspective view of the IFP equipped stage at full compression;

FIG. 39 is a side perspective view of the IFP equipped stage at full extension;

FIG. 40 is a close-up partial plan view of the working piston in the stage and emphasizes the mechanism of dampening during compression;

FIG. 41 is a close-up partial plan view of the working piston in the stage and emphasizes the mechanism of dampening during extension;

FIG. 42 is a side plan view of a monotube shock at full extension, and emphasizes the placement of check valves on each end of the working tube;

FIG. 43 is a side plan view of a four stage air shock at full compression, and emphasizes the placement of a single check valve on each end cap;

FIG. 44 is a close-up partial plan view of the space in the IFP equipped dual function shaft and emphasizes the machining of channels in the wall and end cap of the shaft;

FIG. 45 is a side plan view of the fully extended springless IFP equipped stage, and emphasizes the right side up orientation of the stage;

FIG. 46 is a side plan view of the fully extended springless IFP equipped stage, and emphasizes the up side down orientation of the stage;

FIG. 47 is a side plan view of the up side down oriented fully compressed springless IFP equipped stage, and emphasizes the oil charge in the one cell;

FIG. 48 is a side plan view of the up side down oriented fully extended springless IFP equipped stage, and emphasizes the oil and gas charges in the one cell;

FIG. 49 is a side plan view of the right side up oriented fully extended springless IFP equipped stage that is charged with oil and gas, and emphasizes the force of gravity pulling the IFP downward;

FIG. 50 is a side plan view of the right side up oriented partially extended springless IFP equipped stage that is charged with oil and gas, and emphasizes the force of magnetism pulling the IFP downward;

FIG. 51 is a side plan view of the up side down oriented fully compressed IFP equipped stage;

FIG. 52 is a side plan view of the up side down oriented fully extended IFP equipped stage, and emphasizes purging the stage with gas;

FIG. 53 is a side plan view of the up side down oriented fully extended IFP equipped stage, and emphasizes the oil charge in the one cell with gas in the other cell;

FIG. 54 is a side plan view of the up side down oriented fully extended IFP equipped stage that is charged with oil, and emphasizes the net flow of gas through the IFP from the other cell to the one cell due to the stage being charged with gas;

FIG. 55 is a side plan view of the up side down oriented fully extended IFP equipped stage that is charged with oil and gas;

FIG. 56 is a side plan view of the right side up oriented fully extended IFP equipped stage that is charged with oil and the gas, and emphasizes the force of the spring pushing the IFP downward;

FIG. 57 is a side plan view of the right side up oriented fully extended springless IFP equipped stage that is charged with oil and gas, and emphasizes the net flow of gas through the IFP from the one cell to the other cell due to the downward motion of the IFP;

FIG. 58 is a side plan view of the right side up oriented fully extended IFP equipped stage that is charged with oil and the gas, and emphasizes the net flow of gas through the IFP from the one cell to the other cell due to the downward motion of the IFP;

FIG. 59 is a side plan view of the right side up oriented fully extended springless IFP equipped stage that is charged with oil and gas, and emphasizes the forces of gravity and magnetism constantly pulling the IFP downward;

FIG. 60 is a side plan view of the right side up oriented fully extended IFP equipped stage that is charged with oil and the gas, and emphasizes the location of the IFP due to the fully extended spring;

FIG. 61 is a side plan view of the right side up oriented partially extended IFP equipped stage that is charged with oil and the gas, and emphasizes the force of the spring constantly pushing the IFP downward;

FIG. 62 is a side plan view of the fully extended IFP equipped stage that is charged with oil and gas, and emphasizes the origin of the IFP and working piston prior to displacement;

FIG. 63 is a side plan view of the slightly compressed IFP equipped stage that is charged with oil and gas, and emphasizes the displacement of the IFP and working piston;

FIG. 64 is a side plan view of the mostly compressed IFP equipped stage that is charged with oil and gas, and emphasizes the displacement of the IFP and working piston;

FIG. 65 is a side plan view of the fully compressed IFP equipped stage that is charged with oil and gas, and emphasizes the displacement of the IFP and working piston along with other dimensions of the stage;

FIG. 66 is an equation that computes the areas of the component and shaft;

FIG. 67 is an equation that computes the change in volume of the other cell and shaft in terms of the displacements of the IFP and working piston, respectively;

FIG. 68 is an equation that shows the relationship among the change in volume of the other cell, change in volume of the gas, and change in volume of the shaft;

FIG. 69 is an equation that shows the relationship between the displacement of the working piston and change in shaft stroke;

FIG. 70 is an algorithm that shows the relationship between the displacements of the IFP and working piston, the displacements being due to the compression of the shaft;

FIG. 71 is a side plan view of the fully extended four stage air shock that is equipped with the IFP in each stage;

FIG. 72 is a side plan view of the fully compressed four stage air shock that is equipped with the IFP in each stage;

FIG. 73 is a side perspective view of the fully extended four stage air shock that is equipped with the IFP in each stage;

FIG. 74 is a side perspective view of the fully compressed four stage air shock that is equipped with the IFP in each stage;

FIG. 75 is a side plan view of the four stage air shock that is equipped with the IFP in each stage whereby the stages are in various states of compression/extension;

FIG. 76 is a side perspective view of the four stage air shock that is equipped with the IFP in each stage whereby the stages are in various states of compression/extension;

FIG. 77 is a side plan view of the fully extended IFP equipped four stage air shock, and emphasizes the right side up orientation of the shock;

FIG. 78 is a side plan view of the fully extended IFP equipped four stage air shock, and emphasizes the up side down orientation of the shock;

FIG. 79 is a side plan view of the up side down oriented fully compressed IFP equipped four stage air shock;

FIG. 80 is a side plan view of the up side down oriented fully extended IFP equipped four stage air shock, and emphasizes purging each stage with gas;

FIG. 81 is a side plan view of the up side down oriented fully extended IFP equipped four stage air shock, and emphasizes the oil charge in each stage;

FIG. 82 is a side plan view of the up side down oriented fully extended IFP equipped four stage air shock that is charged with oil, and emphasizes the net flow of gas through the IFP from the other cell to the one cell due to each stage being charged with gas;

FIG. 83 is a side plan view of the up side down oriented fully extended IFP equipped four stage air shock that is charged with oil and gas;

FIG. 84 is a side plan view of the right side up oriented fully extended IFP equipped four stage air shock that is charged with oil and the gas, and emphasizes the force of the spring pushing the IFP downward;

FIG. 85 is a side plan view of the right side up oriented fully extended IFP equipped four stage air shock that is charged with oil and the gas, and emphasizes the net flow of gas through the IFP from the one cell to the other cell due to the downward motion of the IFP;

FIG. 86 is a side plan view of the right side up oriented fully extended IFP equipped four stage air shock that is charged with oil and the gas, and emphasizes the location of the IFP due to the fully extended spring;

FIG. 87 is a side plan view of the fully extended IFP equipped four stage air shock in which each stage is charged with oil and gas and the oil and gas occupy one and the other cells;

FIG. 88 is a side plan view of the fully compressed IFP equipped four stage air shock in which each stage is charged with oil and gas and the oil and gas occupy one and the other cells;

FIG. 89 is a side plan view of the IFP equipped four stage air shock in which each stage is charged with oil and gas and the oil and gas occupy one and the other cells whereby the stages are in various states of compression/extension;

FIG. 90 is a side plan view of the fully extended IFP equipped four stage air shock, and emphasizes the dimensions of the shock and parts for each stage;

FIG. 91 is a side plan view of the fully compressed IFP equipped four stage air shock, and defines the compressed length of the shock;

FIG. 92 is an equation that computes the length of the working tube $L_X$ for the multiple stage air shock comprising X stages whereby X=2-7;

FIG. 93 is an equation that computes the lengths of the nth dual role shafts $L_{Wn}$ for the multiple stage air shock comprising X stages where n=1, 2, . . . , X−1 and X=2-8;

FIG. 94 is an equation used to compute the shaft stroke for the first stage $L_{S1}$ for the multiple stage air shock comprising X stages where X=1-8;

FIG. 95 is an equation that computes the shaft stroke for the nth stage $L_{S2-8}$ for the multiple stage air shock comprising X stages where n=2, 3, . . . , X and X=2-8;

FIG. 96 is an equation that computes the compressed length $CL_X$ for the multiple stage air shock comprising X stages where X=1-8;

FIG. 97 is an equation that computes the extended length $EL_X$ for the multiple stage air shock comprising X stages where X=1-8;

FIG. 98 shows the selected value for the mounting eyelet me;

FIG. 99 is an equation that relates the value for the thickness of the nth IFP to that for the nth working piston where n=1-8;

FIGS. 100-107 are tables of the selected values for $wp_n$, $ss_n$, and $ec_n$ for the nth stage for the multiple stage air shock comprising X stages where n=1, 2, . . . , X and X=1-8;

FIG. 108 is a table of the computed values for $L_X$, $L_{W1-7}$, $L_{S1-8}$, $CL_X$, $EL_X$, and $EL_X/CL_X$ for the multiple stage air shock comprising X stages where X=1-8 and $L_1$ is a selected value;

FIG. 109 is a plan view of the fully compressed IFP equipped stage that comprises a component and shaft;

FIG. 110 is a plan view of the fully compressed IFP equipped stage that comprises a component and shaft and emphasizes the volumes of the oil and gas;

FIG. 111 is an equation that computes the area of the first, second, third, or fourth stage, $A_n$;

FIG. 112 is an equation that computes the volume of the shaft stroke for the first, second, third, or fourth stage, $V_n$;

FIG. 113 is an equation that computes the volume of the gas charge for the first, second, third, or fourth stage, $V_{Gt}$;

FIG. 114 is an equation that computes the constant in Boyle's Law for the first, second, third, or fourth stage, $c_t$;

FIG. 115 is an equation that computes the shaft stroke at ride height for the first, second, third, or fourth stage, $L_t$;

FIG. 116 is an equation that computes the volume of the shaft stroke at ride height for the first, second, third, or fourth stage, $V_t$;

FIG. 117 is an equation that computes the gas charge at ride height for the first, second, third, or fourth stage, $P_{Gt}$;

FIG. 118 is an equation that computes the volume of the stage at the selected incremental shaft stroke for the first, second, third, or fourth stage, $V_Z$;

FIG. 119 is an equation that computes the gas pressure at the selected incremental shaft stroke for the first, second, third, or fourth stage, $P_Z$;

FIG. 120 is an equation that computes the suspension force at the selected incremental shaft stroke for the first, second, third, or fourth stage, $F_Z$;

FIG. 121 is an equation that computes the spring rate at the selected incremental shaft stroke for the first, second, third, or fourth stage, $SR_Z$;

FIG. 122 is an equation that computes the percent change in incremental shaft stroke at the selected incremental shaft stroke for the first, second, third, or fourth stage, % $\Delta L_Z$;

FIG. 123 is a table of the selected values for the diameter, $D_n$, shaft stroke, $L_n$ suspension force at ride height, $F_t$, and percent change in shaft stroke at ride height, % $L_t$, where n refers to the first, second, or third dual function shaft or single function shaft and t refers to the first, second, third, or fourth stage, respectively;

FIGS. 124-127 are tables of the computed values for % $\Delta L_Z$, $F_Z$, $\Delta L_Z$, $SR_Z$ and selected value for $L_Z$ where $\Delta L_Z$, refers to the change in incremental shaft stroke at a selected incremental shaft stroke, and $L_Z$ refers to the selected incremental shaft stroke and where Z=1e, 2f, 3g, or 4h for the first, second, third, or fourth stage, respectively;

FIG. 128 is a graph of the curved lines of suspension force $F_{1-4}$ vs change in incremental shaft stroke $\Delta L_{1-4}$ for the first, second, third, and fourth stages;

FIG. 129 is a graph of the curved lines of suspension force $F_{1-4}$ vs change in incremental shaft stroke $\Delta L_{1-4}$ for the first, second, third, and fourth stages in which a dotted line is traced over a part of each curved line.

DETAILED DESCRIPTION OF THE INVENTION

Detailed herein is the installation of the gas permeable internal floating piston in a single shock body, otherwise called a shock absorber or simply a shock. Emphasis is placed on the novel advantages of the gas permeable internal floating piston over an ordinary internal floating piston. Hereafter, the gas permeable internal floating piston can be called our gas permeable internal floating piston.

Our gas permeable internal floating piston comprises two components, a gas permeable membrane and an internal floating piston. Conversely, an ordinary internal floating piston comprises only one component, an internal floating piston. The ordinary internal floating piston lacks a gas permeable membrane or any other type of membrane. Therefore, the gas permeable membrane enables our gas permeable internal floating piston to separate the oil from the gas within the shock body while the ordinary internal floating piston cannot separate the oil from the gas at any location or time.

Our internal floating piston is made out of the same type of material as is an ordinary internal floating piston including plastic, plastic composite, aluminum, metal alloy, or carbon fiber. However, the construction process for our internal floating piston is different from that for an ordinary internal floating piston.

The structure of the ordinary internal floating piston is constructed as an impenetrable solid disc such that a substance cannot pass through the ordinary internal floating piston's structure. Lack of passage defines the ordinary internal floating piston as a solid barrier that permanently separates the substance (e.g., oil) located on one side of the internal floating piston from the substance (e.g., gas) located on the other side of the internal floating piston.

Referring to FIGS. 1-6, the structure of our internal floating piston is built like a porous cup 11. The porous cup 11 is constructed from two components: a cylinder-like solid wall 11c and a porous bottom 11d. The solid wall has the one and second ends, the one and second ends refer to the inner and outer sides 11a and 11b of the internal floating piston, respectively. The porous bottom 11d has the shape and hard, rigid structure of a fritted disc. The porous bottom 11d is attached to the second end of the solid wall 11c, i.e., attached to the outer side 11b of the internal floating piston. The attachment of the porous bottom 11d to the solid wall 11c gives the internal floating piston the shape of a cup. The structural strength and integrity of the porous cup 11 is far superior to that of the solid wall 11c or porous bottom 11d alone thereby enhancing the structural integrity and durability of the internal floating piston. The gas permeable membrane 12 is attached to one side of the porous bottom 11d, the one side referring to the outer side 11b of the internal floating piston. The hard, rigid structure of the porous bottom 11d supports the gas permeable membrane 12 thereby enhancing the structural integrity and durability of the gas permeable membrane 12. The combinations of the gas permeable membrane 12 being attached to the porous bottom 11d and of the porous bottom 11d being attached to the solid wall 11c define our gas permeable internal floating piston 10.

The cylinder-like solid wall is specifically designed for two purposes: one purpose is the same as that of an ordinary internal floating piston while the second purpose is novel to our internal floating piston. The one purpose is to act as a seal against the inside of the shock body in order to maintain separation of the oil from the gas. The novel second purpose is to enable our internal floating piston to slide into and out of the shock body in conjunction with the sliding motion of the shaft. Conversely, an ordinary internal floating piston is shaped more like a disc than a cylinder and is designed to shift back and forth within the shock body but not to slide into and out of the shock body. The shifting accounts for the slight change in volume within the shock body due to the movement of the shaft. The diameter of the shaft in an ordinary shock is small such that the sliding of the shaft into and out of the shock body causes only a slight change in volume that must be accounted for by the gas. The diameter of the shaft in an air shock is large such that the sliding of the shaft into and out of the shock body causes a large change in volume that must be accounted for by the gas. Since our gas permeable internal floating piston was specifically designed to operate in an air shock, our internal floating piston is able to slide into and out of the shock body in conjunction with the sliding motion of the shaft. Recall that no shock absorber manufacturer currently installs internal floating pistons in air shocks.

The porosity of the bottom is a function of the construction process not the type of material the bottom is made of, the material being metallic, plastic (see Discs, Porous Metal Discs; and, Filtration Catalogue, Porvair Plastic Battery Vents; both citations located in non-patent references), or other material like that used in constructing the solid wall. The porosity defines the "fritting" in a fritted disc whereby the fritting is the sintering together of particles into a solid but porous object such that there are pore spaces located throughout the object like a sponge. Substances are able to pass through the object by passing through the pore spaces. Sintering is the process of compacting and forming a solid mass of material by heat or pressure without melting it to the point of liquefaction. The porous bottom serves the same purpose as does the fritted disc used by Qin in U.S. Pat. No. 8,419,961; namely, a support for the gas permeable membrane that is porous to gases such that gases can pass through the pore spaces.

The gas permeable membrane is able to be attached to the porous bottom with an adhesive, the adhesive is an amorphous polymer selected from the group consisting of an organic solution of TFE/PFD copolymer, an aqueous solution of PTFE or PFEP particulate dispersion, and an organic solution of PTFE or PFEP particulate dispersion with 0.05-5 .mu.m in particle size (see Qin in U.S. Pat. No. 8,419,961). The adhesive forms a coalesced porous network whereby the gas permeable membrane and adhesive cooperate with the porous bottom such that a gas can pass through the porous bottom. The membrane is permeable to gases but impermeable to liquids. The permeability of the membrane and porosities of the adhesive and bottom cooperate such that gases are able to pass from one side of the gas permeable internal floating piston to the other side while liquids are prevented from passing through the gas permeable internal floating piston. The gas permeable internal floating piston is an impenetrable barrier against liquids.

Our gas permeable membrane is a type of semi-permeable membrane. Semi-permeable membranes define the state of the art in separating one substance from another, and are widely used in a diverse array of industries including the medical, petrochemical, water treatment, textile, transportation, agriculture, forestry, defense, and environmental sciences (see Koltuniewicz, The History And State Of Art In Membrane Technologies, non-patent references). In the petrochemical industry, gas-permeable membranes are used to separate dissolved gases from the bulk petroleum crude oil during the refining process. Such membrane separation has proven to be technically and economically superior to other technologies (see Abedini, Application Of Membrane In Gas Separation Processes: Its Suitability And Mechanisms, non-patent references). In the transportation industry, semi-permeable membranes are used in the remediation of waste water during the cleaning process and in the recovery of the pigment-coating during the electrophoretic painting process (see Koltuniewicz, The History And State Of Art In Membrane Technologies, non-patent references). Gas permeable membranes have been utilized in more specialized applications. For example: in U.S. Pat. No. 5,749,942, Mattis discloses a method of making a composite membrane in which a very thin layer of an amorphous perfluoro-2,2-dimethyl-1,3-dioxole polymer is sandwiched between a perforated metal plate or a wire screen or mesh. The method is used to separate fault gases from the oil in electrical transformers; in U.S. Pat. No. 8,419,961, Qin discloses a method in which a gas permeable membrane that is attached to a fritted disc is used to perform the same function as does Mattis' method. Qin's method improves upon Mattis' method by enabling, among other features, the gas to be detected and monitored under harsher temperature and pressure conditions; and, in U.S. Pat. No. 8,197,578, Hruby discloses that a gas permeable membrane is used to separate gases from the liquid propellant in rocket motors. The separation removes gas bubbles that may form in the propellant; and, the gas bubbles can interrupt the flow of fuel, resulting in a stall or loss of control of the motor.

Beyond the uses of semi-permeable membranes in the transportation industry as noted above, there is no known application of a semi-permeable membrane in the automobile industry. Specifically, our application of a gas permeable membrane in a shock absorber is unprecedented. A gas permeable membrane or our gas permeable internal floating piston defines a solid structure with "no moving parts, making them mechanically robust and increasing their suitability for use in remote locations where reliability is critical" (see Freeman, Gas Separation Using Polymers, non-patent references). Our gas permeable membrane and internal floating piston are constructed from materials that can withstand the operating conditions inside the body of a shock absorber, including high temperatures and pressures. Our gas permeable membrane is similar to that used by Qin (see U.S. Pat. No. 8,419,961). Qin discloses that his gas permeable membrane is made from a bulk polymer material that can withstand harsh temperature and pressure conditions. Silicon based gas permeable membranes are known to survive pressures as high as 1300 psi and temperature ranges from −95 to 400 degrees Fahrenheit (see SSP-M823, Polydimethyl Silicone Membrane, non-patent references). During operation of the shock, if temperatures rise noticeably above that suitable for the bulk polymer material, then our gas permeable membrane can be constructed from other materials, e.g., ceramic membranes. Materials that are thermally stable at temperatures above 400° C. (752 degrees Fahrenheit) include ceramic membranes that are used to separate hydrogen from gasified coal (see Abedini, Application Of Membrane In Gas Separation Processes: Its Suitability And Mechanisms, non-patent references). Our internal floating piston is made of the same materials as an ordinary internal floating piston; therefore it can clearly withstand the operating conditions inside the body of a shock absorber.

Gas permeable membranes are very thin; e.g., in U.S. Pat. No. 8,419,961, Qin uses a bulk polymer material with a thickness ranging from 0.01-0.5 mm, which is 0.0004-0.020 inches. The durability of a gas permeable membrane is related to the cross-sectional thickness of the membrane. As thickness increases, the membrane's durability increases and permeability decreases (see Freeman, Gas Separation Using Polymers; Montoya, Membrane Gas Exchange; and, Abedini, Application Of Membrane In Gas Separation Processes: Its Suitability And Mechanisms; all citations located in non-patent references). The capability to maintain separation of the gas and oil during the operation of the shock absorber increases as the rate of gas permeation of the membrane decreases. Therefore, a relatively thick membrane improves both the performance and durability of a gas permeable membrane in a shock absorber, and thereby defines a key design feature of our gas permeable membrane. The durability of a gas permeable membrane in a shock absorber is more a function of temperature than pressure. Pressure becomes an issue only when the pressure on one side of the membrane is different than that on the other side of the membrane, i.e., the creation of a pressure differential across the structure of the membrane. Too great of a pressure differential can rupture the membrane, thereby causing the membrane to fail.

In response to road obstructions, the rapid movement of the shaft can create rapid changes in pressure in the shock body. The pressure change is not significant in an ordinary shock due to the relatively small diameter of the shaft. An insignificant pressure change indicates an insignificant pressure differential across the structure of the membrane, and therefore has no practical impact on the gas permeable membrane. Instead, the pressure change is significant only in an air shock due to the relatively large diameter of the shaft. However, the compliant movement of our internal floating piston in reaction to the movement of the shaft ensures that the change in pressure on one side of the membrane is essentially the same as that on the other side of the membrane. Therefore when equipped with our gas permeable internal floating piston, the operation of the air shock creates insignificant pressure differential across the structure of the membrane, thereby indicating that pressure has no practical impact on the gas permeable membrane. Instead, a spring can be used to create sufficient pressure differential across the structure of our gas permeable internal floating piston in order to invoke separation of the gas from the oil in any shock, be it an ordinary or air shock.

Our gas permeable membrane is a synthetic bulk polymer made of material including poly(tetrafluoroethylene), poly (tetrafluoroethylene-co-hexafluoropropylene), poly(vinylidene fluoride), poly(tetrafluoroethylene-co-perfluoro alkoxy vinyl ether), polydimethylsiloxane derivatives, poly (1-trimethylsilyl-1-propyne) derivatives, polyethylenes, polypropylenes, polysulfones, polyimides, polymethacrylates, or silicic-acid heteropolycondensates (see Qin, U.S. Pat. No. 8,419,961. See also Freeman, Gas Separation Using Polymers; Kossov, Novel fluorine-functionalized 1,2-disubstituted polyacetylene—Poly(1-(3,3,3-trifluoropropyldimethylsilyl)-1-propyne). Synthesis, microstructure and gas transport properties; and, Abedini, Application Of Membrane In Gas Separation Processes: Its Suitability And Mechanisms; all citations located in non-patent references).

The gas permeability of the membrane is a molecular process in which individual gas particles travel through the membrane, a particle being an atom or a molecule comprised of two of more covalently bonded atoms. Permeation can occur at any point on the cross-sectional area of the membrane; meaning that an enormous number (at least trillions) of gas particles can pass through the membrane at any given moment. The process includes at least three distinct steps: adsorption of the gas particles to the outer surface of one side of the membrane, diffusion of the gas particles through the membrane, and desorption of the gas particles from the outer surface of the other side of the membrane. (see Qin, U.S. Pat. No. 8,419,961. See also Freeman, Gas Separation Using Polymers; and, Abedini, Application Of Membrane In Gas Separation Processes: Its Suitability And Mechanisms; both citations located in non-patent references). The permeability to gases and impermeability to liquids defines permeability on the basis of the phase of the substance: the gas permeable membrane is permeable to substances in the gas phase and impermeable to substances in the liquid phase. This means that any substance that is in the gas phase can permeate through the membrane while any substance that is in the liquid phase cannot permeate through the membrane.

Specifically, our gas permeable membrane is permeable to gases and impermeable to liquids at any temperature and pressure that does not compromise the integrity of the material that the membrane is made from, as discussed above. The thermal expansion or contraction of the liquid due to a significant increase or decrease in temperature has no effect on the liquid impermeability of our gas permeable membrane, respectively.

The mechanism of permeation is derived from either a solution/diffusion pathway or size exclusion pathway. If the membrane is made from a dense bulk polymer, then the membrane lacks pores and permeation occurs via the solution/diffusion pathway. The gas dissolves into the membrane, diffuses through the membrane, and then evaporates out of the membrane; adsorption defines dissolution while desorption defines evaporation. If the membrane is made from a porous bulk polymer, then the membrane has pores and permeation occurs via the size exclusion pathway. The gas particles are much smaller than the liquid particles such that the gas particles can pass between the pore spaces in the membrane via the adsorption, diffusion, desorption process.

A shock equipped with the gas permeable internal floating piston can operate with oils derived from petroleum base stocks, synthetic base stocks, or a blend of both stocks (see Hydraulic Fluids, Chemical and Physical Information; Article Archives, Conventional vs Synthetic Oi; Safety Data Sheet, Shock Therapy Suspension Fluid-Amsoil; and Safety Data Sheet, Synthetic Suspension Fluids-Redline Synthetic Oil, all citations located in non-patent references). If the oil is derived from petroleum base stocks, then the oil is a paraffin-based hydrocarbon consisting of at least 20-34 carbon atoms and 40-68 hydrogen atoms; the hydrocarbon includes long-chain alkanes, cycloalkanes, or their unsaturated analogs. If the oil is derived from synthetic base stocks, then the oil can be made from a number of chemical bases and classes of compounds consisting of at least 15-50 carbon atoms and includes alkylated aromatics, olefin polymers, dibasic acid esters, neopentylpoly esters, poly glycols, phosphate esters, silicones, silicate esters, fluoro carbons, and/or poly phenyl ethers.

Substrates are commonly added to the petroleum and synthetic base stocks in order to furnish the oil with specific properties, including: organic sulfur-, phosphorus-, and chlorine-containing compounds, which help prevent surface damage under severe loading; fatty acids and derivatives, and organophosphate esters, which prevent wearing under light loads; fatty acids, sulfonates, and salts of fatty acids, which prevent corrosion by oxygen and water; phenols, amines, and sulfides, which inhibit oxidation of the oil; silicone oils, which prevent foam formation; polyalphaolefins, polymethacrylates, and polyalkylstyrenes, which reduce the dependence of viscosity on temperature; polymethacrylates and condensation products, which lower the pour point temperature; ionogenic and nonionogenic polar compounds, which allow separation of oil and water; and sulfonates and amides, which prevent unwanted deposits (see Hydraulic Fluids, Chemical and Physical Information, non-patent references).

A shock equipped with the gas permeable internal floating piston can operate with gases derived from dry air; second row elements such as nitrogen, oxygen, carbon monoxide, and carbon dioxide; and noble gases such as helium, neon, and argon (see Montoya, Membrane Gas Exchange; and Freeman, Gas Separation Using Polymers; both citations are located in non-patent references). In general, nitrogen is by far the most common gas used in shocks. Specialized gases such as nitric oxide, nitrous oxide, nitrogen dioxide, carbon disulfide, and sulfur dioxide can be used but are toxic or corrosive and not recommended. Other gases such as hydrogen and volatile hydrocarbons (e.g., methane, ethylene, ethane, propane, butane, and pentane) can be used but are flammable and not recommended.

Construction of the shock with an ordinary internal floating piston is complex and includes charging the shock with oil and gas. Charging can be effected either during or after the shock is constructed: (1) during construction, the machine that charges the shock with gas must be housed in an enclosure that is isolated from the atmosphere. To prevent moisture from contaminating the gas, the enclosure must be purged of all gases/atmosphere. Then the machine must charge the working tube with the gas in such a manner that the gas is confined to the working tube under high pressure. Separate and additional steps must be included to insert the internal floating piston into the working tube, followed by charging the working tube with oil. The simplest construction process would involve a multiple step approach in which the internal floating piston is inserted partway into the working tube such that two separate chambers are formed in the working tube. Then one of the chambers must be purged of moisture followed by charging the chamber with the gas at high pressure. Another step would involve charging the other chamber with oil; and (2) after construction, the internal floating piston must be positioned within the working tube such that the working tube comprises two separate chambers, the chambers being on opposite sides of the internal floating piston. The shock must be constructed with two valves such that one of the valves connects to one chamber while the second valve connects to the second chamber. The chamber specified for the gas must first be purged of moisture and then the shock can be charged with the gas via the one valve. Afterwards, the shock can be charged with the oil via the second valve. The charging steps must be performed in a manner such that the gas is able to be added under high pressure.

The process of constructing the shock with two valves and a properly positioned internal floating piston such that the working tube comprises two separate chambers prior to the charging steps significantly increases the complexity and cost of manufacturing a shock with an ordinary internal floating piston.

Far and away, the predominant benefit of a shock equipped with the gas permeable internal floating piston is the simplified manufacturing processes and reduced costs of the shock. The manufacturing processes and steps required to construct the shock with the gas permeable internal floating piston are no different than that for a shock without an internal floating piston other than the additional step of inserting the gas permeable internal floating piston into the working tube prior to the shaft. Following construction, the shock is charged with oil and gas, and then, after giving the membrane a bit of time to separate the oil from the gas, is ready to be installed on the vehicle.

Clearly, an important benefit of equipping the shock with the gas permeable internal floating piston is that it promises dampening characteristics equal to a shock with an ordinary internal floating piston. Since the oil and gas are permanently separated in a shock with the gas permeable internal floating piston, the shock with the gas permeable internal floating piston delivers state-of-the-art dampening performance just like the shock with an ordinary internal floating piston. And the shock with the gas permeable internal floating piston delivers this performance at a cost that is marginally greater than that for a shock without an internal floating piston, and significantly less than that for a shock with an ordinary internal floating piston. In principle, the cost can be as little as the sum of the construction cost of the shock plus the material cost for the gas permeable internal floating piston. Since the gas permeable membrane enables automatic separation of the oil from the gas, there are no additional costs associated with the specialized construction and charging of a shock that is equipped with an ordinary internal floating piston.

Just as important is that the shock with the gas permeable internal floating piston is able to retain this state-of-the-art level of performance throughout the lifetime of the shock. As a shock ages, the gas may be able to leak out of its chamber and into the oil chamber thereby diminishing an ordinary internal floating piston's ability to maintain separation of the oil and gas. The leakage acts to contaminate the oil and converts the oil into an oil/gas emulsion. The emulsion erodes the dampening characteristics of the shock thereby eliminating the purpose of the ordinary internal floating piston—in effect, converting a shock with an ordinary internal floating piston into a shock without an internal floating piston. Since the gas permeable internal floating piston possesses the unique capability of separating the oil from the gas, the problem of leakage becomes a non-problem. Any leaked gas permeates through the gas permeable internal floating piston out of the oil chamber and back into the gas chamber. Quite simply, permeation serves to maintain internal floating piston dampening characteristics throughout the lifetime of the shock.

Referring to FIGS. 7-14, there are shown the shock with the gas permeable internal floating piston. The shock comprises a working tube 15, shaft 17, gas permeable internal floating piston 10, working piston 18, end cap 19, valve 20, and two mounting eyelets 14. The working tube 15 has a closed end 23 and an open end, a mounting eyelet 14 is attached to the closed end 23 while the end cap 19 is attached to the open end. The shaft 17 has two closed ends, a mounting eyelet 14 is attached to one end while the working piston 18 is attached to the other end. The gas permeable internal floating piston 10 is inserted into the working tube 15 followed by the working piston 18. The working tube 15 has two spaces 21 and 22, space 21 is between the end cap 19 and gas permeable internal floating piston 10 while space 22 is between the gas permeable internal floating piston 10 and closed end 23. A spring 13 is able to be attached to the gas permeable internal floating piston 10.

Referring to FIGS. 15-25, there is shown the process of separating the oil from the gas. FIGS. 15 and 16 show the shock when the shock is oriented right-side up and up-side down, respectively. FIG. 17 shows the shock when its oriented up-side down and fully compressed. FIG. 18 shows the shock filled with gas to purge moisture from working tube 15, the gas being at atmospheric pressure. FIG. 19 shows the shock charged with oil. FIG. 20 shows the shock being charged with gas whereby the high pressure of the gas charge forces the gas permeable internal floating piston 10 to move downward thereby compressing the spring 13 and inducing the atmospheric gas to pass through the gas permeable internal floating piston 10, bubble up through the oil, and collect with the gas charge. FIG. 21 shows the shock charged with gas whereby both the oil and gas occupy cell 21 with the gas being located above the oil. FIG. 22 shows the shock oriented right-side up such that the spring 13 begins to extend thereby forcing the gas permeable internal floating piston 10 to move downward. FIG. 23 shows the shock whereby the downward motion of the gas permeable internal floating piston 10 induces the gas to pass through the gas permeable internal floating piston 10 from cell 21 into cell 22. FIG. 24 shows the shock in a fully extended condition whereby the spring 13 is fully extended with all the gas having passed through the gas permeable internal floating piston 10 such that the oil occupies cell 21 while the gas occupies cell 22. FIG. 25 shows the shock slightly compressed such that it's not in the fully extended condition whereby the spring 13 exerts a constant downward force on the gas permeable internal floating piston 10; the constant downward force induces any gas that leaks from cell 22 into cell 21 to pass through the gas permeable internal floating piston 10 such that the leaked gas returns back into cell 22.

Described below is a gas permeable internal floating piston specifically designed for installation in the multiple stage air shock. The multiple stage air shock is disclosed in patent application Ser. No. 13/854,055 whereby a process for constructing the multiple stage air shock is disclosed in patent application Ser. No. 14/935,423. The internal floating piston features a gas permeable membrane that has a slow rate of permeation; the permeability serves to separate the oil from the gas while the slow rate of permeation permits the internal floating piston to move in conjunction with the shaft during the operation of the air shock. To facilitate understanding of the present invention, the multiple stage air shock is described; and then exemplified with the four stage air shock.

Referring to FIGS. 26-29, the internal floating piston 10 is illustrated in detail. The internal floating piston 10 has a composite construction that includes a cup 11 and gas permeable membrane 12. The cup 11 is made from metal alloy or plastic with a solid wall, porous bottom with inner and outer sides 11a and 11b, and is able to be associated with a spring 13. The wall represents a cylindrical surface that facilitates the sliding motion of the internal floating piston 10 within the space of the working tube or dual function shaft in the same manner as does the working piston. The cylindrical surface and porous bottom give the internal floating piston 10 the structure of a porous cup whereby the structure gives the internal floating piston 10 a thickness ip. The inner bottom of the cup 11 refers to the inner side 11a of the internal floating piston 10 while the outer bottom of the cup 11 refers to the outer side 11b of the internal floating piston 10. The membrane 12 is attached to the outer side 11b of the internal floating piston 10 and is permeable to gases but not liquids. The porous bottom of the cup 11 cooperates with the permeable membrane 12 such that the internal floating piston 10 is permeable to the gas but not the oil whereby the internal floating piston 10 being permeable to the gas indicates that the gas is able to pass through the structure of the internal floating piston 10. The permeation mechanism is: adsorption of the gas into the membrane 12, diffusion of the gas across the membrane 12, and desorption of the gas from the membrane 12. The permeation of the gas across the membrane 12 defines the permeation of the gas through the structure of the internal floating piston 10 and is governed by the presence of a pressure differential across the inner and outer sides 11a and 11b of the internal floating piston 10. The spring 13 is constructed from steel wire and has short and long ends whereby the short end is attached to the inner side 11a of the internal floating piston 10 while the long end is able to be butted up against the closed end of the working tube or dual function shaft.

Referring to FIGS. 30-39, there is shown the installation of the internal floating piston 10 in a stage. The stage refers to the fundamental shock unit in the multiple stage air shock. The multiple stage air shock includes a working tube and two or more shafts, working pistons, and end caps. The stage consists of the one and second interconnected components whereby the one component is the dual or single function shaft 16 or 17 while the second component is the working tube 15 or dual function shaft 16.

The working tube 15 has the one and second ends whereby the one end is closed and the second end is open such that the closed end is attached to a mounting eyelet while the open end is attached to the end cap 19. The end cap 19 serves as a seal in a manner like a torus gasket.

The one or second component is able to define a shaft and has the one and second ends whereby the type of the shaft is defined by the type of the ends the shaft has: the one end is closed and the second end is either closed or open. The one end is attached to the working piston 18. When the second end is closed, the second end is attached to the mounting eyelet and the one component is a single function shaft 17; whereas when the second end is open, the second end is attached to the end cap 19 and the one or second component is a dual function shaft 16.

The working piston 18 has a disk and shims whereby the disk contains a large hole in the center and smaller surrounding holes. The center hole permits the working piston 18 to be attached to the one component. The shims have varying holes, diameters, and thicknesses whereby the shims are arranged sequentially on each side of the disk.

The interconnection between the one and second components refers to the one closed end of the one component being slidably inserted into the open end of the second component whereby the one component sliding into or out of the second component refers to the one component being compressed or extended, and thereby refers to the stage being compressed or extended, respectively. The compression or extension of the stage refers to the operation of the stage and is caused by suspension forces acting on the stage. The insertion defines a space within the second component whereby the space is between the closed end and end cap 19, has a volume, and refers to a volume of the stage. The end cap 19 is equipped with a check valve 20 whereby the check valve 20 permits oil and gas to be added to or removed from the stage. The addition of a given amount of oil or gas refers to the oil or gas charge, respectively. The oil and gas occupy the space such that the sealing action of the end cap 19 confines the oil and gas to the space whereby the confinement allows the oil to have a volume and gas to have both a volume and pressure. The gas pressure is related to the gas charge and defines a force whereby the force is able to be a suspension spring force. The suspension spring force provides the stage with a suspension spring capability thereby enabling the stage both to support part of the weight of the vehicle and to react to suspension movements.

Assembling the stage involves: first, the internal floating piston 10 is slidably inserted into the open end of the second component thereby the internal floating piston 10 is enabled to slide within the second component under guidance by the solid wall of the internal floating piston 10 whereby the long end of the spring 13 is butted up against the closed end of the second component; and second, the one component is slidably inserted into the open end of the second component whereby the one and second components are able to belong to one and another stages, respectively. The internal floating piston 10 divides the space within the second component into the one and second cells 21 and 22, respectively, such that the one cell 21 is between the outer side 11*b* of the internal floating piston 10 and end cap 19 while the second cell 22 is between the inner side 11*a* of the internal floating piston 10 and closed end 23 of the second component whereby the spring 13 is located in the second cell 22. The space has a volume such that the volume defines the volumes of the one and second cells 21 and 22, the volumes of the one and second cells 21 and 22 refers to the volume of the stage.

Referring to FIGS. 34 and 35, during the operation of the stage both the internal floating piston 10 and one component move in the same direction such that during compression, the internal floating piston 10 slides towards the closed end of the second component while the one component slides into the second component; whereas during extension the internal floating piston 10 slides away from the closed end of the second component while the one component slides out of the second component. Referring to FIGS. 36 and 37, the dimensions of the stage are shown including: diameter and length of the second component $D_W$ and $L_W$, diameter and length of the one component $D_S$ and $L_{WS}$, shaft stroke $L_S$, and thicknesses of the internal floating piston ip, working piston wp, shaft shoulder ss, end cap ec, and mounting eyelet me, respectively.

Referring to FIGS. 40 and 41, there is shown the mechanism of dampening by the working piston 18, in this case emphasizing the process of charging a stage with oil and gas. For purposes of discussion: (1) the stage comprises the shaft S and component C whereby the shaft S refers to the dual or single function shaft 16 or 17 while the component C refers to the working tube 15 or dual function shaft 16; and (2) the working piston 18 has a disk 24 and shims 25 and 26, and is located between the fastener 27 and shaft shoulder 28 whereby the fastener 27 attaches the working piston 18 to the shaft S. The shims 25 and 26 are arranged sequentially on each side of the disk 24 such that the shims 25 are located next to the fastener 27 while the shims 26 are located next to the shaft shoulder 28.

Since the working piston 18 is attached to the shaft S, the working piston 18 moves in concert with the shaft S as the shaft S slides into or out of the component C: referring to FIG. 40, the dashed arrows show that the working piston 18 is sliding into the component C thereby indicating that the stage is undergoing compression; while referring to FIG. 41, the dashed arrows show that the working piston 18 is sliding out of the component C thereby indicating that the stage is undergoing extension. The motion of the working piston 18 causes the oil to flow through the holes in the disk 24 and shims 25 and 26: referring to FIGS. 40 and 41, the shaded dotted line boxes define the holes in the disk 24 and shims 25 and 26. The solid arrows show that: during compression, the oil flows into the holes in the shims 25, through the holes in the disk 24, and out of the holes in the shims 26, and then into the passageway 29 between the shaft S and cylinder wall of the component C; while during extension, the oil flows out of the passageway 29 between the shaft S and cylinder wall of the component C and into the holes in the shims 26, through the holes in the disk 24, and out of the holes in the shims 25.

The flow of the oil through the holes causes the working piston 18 to resist the sliding of the shaft S whereby the resistance acts to dampen the suspension spring motion of the stage. The suspension spring motion of the stage refers to the suspension spring capability of the stage whereby the suspension spring capability of the stage is provided by the gas pressure. The emulsion that results from the mixing of the oil and gas is known to cause the dampening ability of the working piston to vary unpredictably whereby the unpredictable dampening results in unpredictable handling for the vehicle. The installation of the internal floating piston 10 into the component C offers the ability to separate the oil from the gas in the component C whereby this separation prevents the mixing of the oil and gas and leads to predictable dampening. Predictable dampening leads to predictable reactions by the shock to suspension forces which in turn results in predictable handling for the vehicle.

Referring to FIG. 42, there is shown a representation of a common monotube shock that is comprised of one working tube 15, single function shaft 17, and internal floating piston 10. The oil can be easily separated from the gas by utilizing one and a second check valves 20a and 20b—the one check valve 20a is mounted to the closed end 23 of the working tube 15 while the second check valve 20b is mounted to end cap 19. The one check valve 20a is used only for adding the oil while the second check valve 20b is used only for adding the gas. Since the internal floating piston 10 is located within the space between the closed end 23 of the working tube 15 and end cap 19, this method of addition naturally leads to the oil occupying the one cell 21 between the end cap 19 and internal floating piston 10 while the gas occupies the second cell 22 between the closed end of the working tube 15 and internal floating piston 10.

Referring to FIG. 43, there is shown a four stage air shock in which each stage is fully compressed; each stage is equipped with the internal floating piston 10. The closed end 23 of each dual function shaft 16 is inserted into the interconnecting component and therefore is not available for receiving a check valve 20. Since each end cap 19 remains outside the interconnecting component at all times during the operation of each stage, then only the end cap 19 is able to receive a check valve 20. Both the oil and gas must be added to each stage via the check valve 20 that is mounted to each end cap 19. A logical alternative would require some type of channel to be machined within the cylinder wall of each dual function shaft 16 from each end cap 19 to the closed end 23 of each dual function shaft 16. The interconnecting component refers to the working tube 15 or dual function shaft 16.

Referring to FIG. 44, there is shown a close-up view of a stage that comprises a dual function shaft 16 and shaft S, in this case emphasizing both a shaded channel 30 that is machined into the cylinder wall of the dual function shaft 16 and a shaded channel 31 that is machined into the end cap 19. One and a second check valves 20a and 20b are mounted to the end cap 19. The channel 30 connects a hole in the closed end 23 of the dual function shaft 16 to the one check value 20a while the channel 31 connects a hole in the end cap 19 to the second check value 20b. The one check valve 20a vents to the second cell 22 because the one check valve 20a is connected to the second cell 22 via the channel 30 that is machined into the cylinder wall of the dual function shaft 16; while the second check valve 20b vents to the one cell 21 because the second check valve 20b is connected to the one cell 21 via the channel 31 that is machined into the end cap 19.

Cooperation between the channel 31 and second check valve 20b represents the normal means by which oil and gas are added to or removed from the space within a stage in the multiple stage air shock. The oil would be added via the second check valve 20b in the normal manner into the one cell 21 thereby locating the oil between the end cap 19 and internal floating piston 10. Meanwhile the gas could be added via the one check valve 20a and channel 30 into the second cell 22 thereby locating the gas between the closed end 23 of the dual function shaft 16 and internal floating piston 10. The additions serve to locate the oil and gas on opposite side of the internal floating piston 10 and thereby separate the oil from the gas. However, the process of machining a channel 30 within the wall of a thin-walled cylinder is not realistic. As a practical matter, both the oil and gas must be added via the second check valve 20b.

Following the addition of the oil and gas, the oil must be separated from the gas autonomously within the space of the stage. The present invention suggests three different methods of effecting this autonomous separation whereby this autonomous separation refers to the operation of the internal floating piston 10.

Note: referring to FIG. 43, in the four stage air shock the working tube 15 could be equipped with another check valve at the closed end 23 in addition to the check valve 20 that is attached to the end cap 19; and therefore, oil and gas can be separated as discussed for the common monotube shock. For purposes of discussion, the working tube 15 is treated in the same manner as each dual function shaft 16.

Referring to FIGS. 45-61, there is shown the stage that is equipped with the internal floating piston 10, in this case emphasizing the process of the internal floating piston 10 separating the oil and gas into the one and second cells, respectively. For purposes of discussion: (1) the dual function shaft 16 and single function shaft 17 and are referred to as the component 16 and shaft 17, respectively, whereby the component 16 refers to the working tube 15 or dual function shaft 16 while the shaft 17 refers to the dual function shaft 16 or single function shaft 17, (2) referring to FIG. 45, the stage is oriented right side up whereby the stage is in a vertical position such that the closed end 23 of the component 16 is at the top of the space while the end cap 19 of the component 16 is at the bottom of the space whereby the one cell 21 is below the internal floating piston 10 while the second cell 22 is above the internal floating piston 10; and, referring to FIG. 46, the stage is oriented upside down whereby upside down is the opposite of right side up, and (3) the internal floating piston 10 is not attached to the spring 13 except as noted in method 3 below. The space within the component 16 contains the internal floating piston 10 whereby the internal floating piston 10 divides the space into the one and second cells 21 and 22. The oil and gas are able to occupy opposite sides of the internal floating piston 10 such that the oil occupies the one cell 21 while the gas occupies the second cell 22. The process of separating the oil and gas into the one and second cells 21 and 22 involves two steps: in step one, the stage is charged with oil and gas such that both the oil and gas occupy the one cell 21; and in step two, the gas permeable membrane 12 is utilized in conjunction with a pressure differential. The membrane 12 allows the gas but not oil to pass through the structure of the internal floating piston 10 while the creation of a pressure differential across the sides of the internal floating piston 10 serves as the force that induces a net flow of gas through the structure of the internal floating piston 10 from the one cell 21 into the second cell 22.

The pressure differential can be created with at least three methods: the process of charging the stage with oil and gas in methods 1 and 2 is different than that for method 3, therefore step one for methods 1 and 2 is discussed separately from that for method 3.

Step One for methods 1 and 2: Referring to FIG. 47, the stage is oriented upside down such that the end cap 19 of the component 16 is at the top of the space while the closed end 23 of the component 16 is at the bottom of the space. The shaft 17 is fully compressed such that the working piston 18 pushes the internal floating piston 10 against the closed end 23 whereby the space within the component 16 consists of the one cell 21 only. The stage is charged with oil and gas through the check valve 20 that is located on the end cap 19: first the oil charge is added thereby filling up the one cell 21 whereby a small amount of air occupies the cup 11 in the structure of the internal floating piston 10 and is ignored;

second referring to FIG. 48, the gas charge is added whereby the shaft 17 fully extends to accommodate the gas, and the space within the component 16 consists of the one cell 21 only whereby the one cell 21 is positioned above the internal floating piston 10 while the internal floating piston 10 is still bottomed out against the closed end 23 of the component 16. Since the oil and gas are immiscible, the oil does not mix with the gas and since the oil and gas occupy the one cell 21, the oil locates next to the gas such that the surface of the oil contacts that of the gas whereby the contacting surfaces are defined as the interface. The locations of the oil and gas at the interface are defined by density such that the more dense oil will locate below the interface next to the internal floating piston 10 while the less dense gas will locate above the interface next to the end cap 19. After addition of the gas charge, the stage is rotated 180 degrees to the right side up orientation such that the closed end 23 of the component 16 is at the top of the space while the end cap 19 of the component 16 is at the bottom of the space; the one cell 21 is below the internal floating piston 10 such that the oil will locate below the interface next to the end cap 19 while the gas will locate above the interface next to the internal floating piston 10. For method 1; referring to FIG. 49, the internal floating piston 10 is heavy enough that it slides downward in the space within the component 16, the force of gravity $F_V$ acting to pull the internal floating piston 10 downward against the gas. For method 2; referring to FIG. 50, the working piston 18 and internal floating piston 10 are constructed in a manner such that they possess strong permanent magnetic properties. Upon insertion into the space within the component 16, the internal floating piston 10 is positioned such that it is magnetically attracted to the working piston 18. Slow compression of the shaft 17 either by mechanical means or by installing the shock on a vehicle and cycling the suspension through its range of travel will act locate the working piston 18 close to the internal floating piston 10, the close proximity between the working piston 18 and internal floating piston 10 serves to create a strong attractive magnetic interaction between the working piston 18 and internal floating piston 10, the interaction between the working piston 18 and internal floating piston 10 causes a magnetic force $F_M$ that acts to pull the internal floating piston 10 downward against the gas.

Step One for method 3: the short end of the spring 13 is attached to the inner side 11a of the internal floating piston 10 and then the internal floating piston 10 is inserted into the component 16 such that the long end of the spring 13 is butted against the closed end 23 of the component 16. Referring to FIG. 51, the stage is oriented upside down such that the end cap 19 of the component 16 is at the top of the space while the closed end 23 of the component 16 is at the bottom of the space, and the shaft 17 is fully compressed such that the internal floating piston 10 bottoms out against the closed end 23 of the component 16, the location of the internal floating piston 10 serves to fully compress the spring 13. Referring to FIG. 52, gas is added such that the shaft 17 fully extends whereby fully compressing the stage and then adding gas serves to purge the space within the component 16 of the moisture that is in the air; the small amount of air occupying the cup 11 of the internal floating piston 10 is not purged and is ignored. The process of fully extending the shaft 17 allows the spring 13 that is attached to the internal floating piston 10 to also fully extend whereby the gas, at atmospheric pressure, occupies both the one and second cells 21 and 22, respectively. Referring to FIG. 53, the component 16 is charged with oil whereby the fully extended spring 13 positions the internal floating piston 10 in a manner such that the addition of the oil charge acts to fill up the one cell 21 whereby the gas in the second cell 22 is at atmospheric pressure.

Referring to FIGS. 54 and 55, the component 16 is charged with gas whereby the more dense oil will locate below the interface next to the internal floating piston 10 while the less dense gas charge will locate above the interface next to the end cap 19, the one cell 21 now contains both the oil and gas charges. The pressure of the gas charge exerts a force on the oil whereby the oil is non-compressible while the internal floating piston 10 is impermeable to the oil thereby enabling the oil to transfer the force against the internal floating piston 10. The pressure of the gas charge is greater than atmospheric pressure while the force of the gas pressure is greater than that of the spring thereby enabling the force of the gas pressure to cause the internal floating piston 10 to slide downward, the downward motion of the internal floating piston 10 compresses the spring 13, decreases the volume of the second cell 22, and increases the pressure of the gas in the second cell 22; the downward motion continues until the pressure of the gas in the second cell 22 is the same as that of the gas charge. Since the density of the gas is less than that of the oil, the gas in the second cell 22 will exert a force $F_{UP}$ that acts upward against the internal floating piston 10. Since the internal floating piston 10 is permeable to the gas, the upward force $F_{UP}$ defines an increase in pressure next to the inner side 11a of the internal floating piston 10 while there is no change in pressure next to the outer side 11b of the internal floating piston 10. The pressure imbalance defines a pressure differential across the structure of the internal floating piston 10 whereby the pressure differential induces a net flow of gas $G_F$ through the structure of the internal floating piston 10 from the second cell 22 and into the one cell 21. As soon as the gas from the second cell 22 passes through the internal floating piston 10 into the one cell 21, the gas is able to bubble upward through the oil and accumulate with the gas charge that is next to the end cap 19 whereby the gas from the second cell 22 and gas charge are hereafter referred to as the gas. The combination of the flow of the gas $G_F$ through the structure and the force of the gas pressure being greater than that of the spring 13 causes the internal floating piston 10 to continue sliding downward until the internal floating piston 10 bottoms out against the closed end 23 of the component 16. The force of the gas pressure holds the internal floating piston 10 against the closed end 23 of the component 16 whereby the location of the internal floating piston 10 fully compresses the spring 13. The space within the component 16 consists of the one cell 21 only.

Note: After the oil charge is added but before the gas charge is added, the oil is heavier than the gas that is in the second cell 22 thereby resulting in a difference in density between the oil and gas. This difference in density will allow the gas to exert a force that acts upward against the internal floating piston 10. Since the internal floating piston 10 is permeable to the gas, the upward force will serve to create a pressure differential across the sides of the internal floating piston 10 such that the gas is induced to flow through the structure of the internal floating piston 10 from the second cell 22 and into the one cell 21. However, this flow of gas is ignored because the force associated with the difference in density is insufficient to compress the spring 13. The spring 13 would necessarily have to be compressed in order to account for the increase in volume of the one cell 21 and equivalent decrease in volume of the second cell 22 that would result from the flow of gas through the structure of the internal floating piston 10. In particular, the downward motion of the internal floating piston 10 only compresses the spring 13 and does not create a pressure differential that induces the flow of gas $G_F$ through the structure of the internal floating piston 10 from the second cell 22 and into the one cell 21. The force of the gas pressure that causes the downward motion of the internal floating piston 10 is due to the gas pressure next to the outer side 11$b$ being greater than that next to the inner side 11$a$ which is opposite the increase in pressure next to the inner side 11$a$ with no change in pressure next to the outer side 11$b$. The increase in pressure next to the inner side 11$a$ with no change in pressure next to the outer side 11$b$ defines the pressure differential that serves to induce the flow of gas $G_F$ through the structure of the internal floating piston 10 from the second cell 22 and into the one cell 21.

Referring to FIG. 56, the stage is rotated 180 degrees to the right side up orientation such that the closed end 23 of the component 16 is at the top of the space while the end cap 19 of the component 16 is at the bottom of the space whereby the more dense oil is below the interface next to the end cap 19 while the less dense gas is above the interface next to the internal floating piston 10. Since the internal floating piston 10 is permeable to the gas, the gas is able to flow through the internal floating piston 10. The ability to flow indicates that the force of the gas pressure is able to have no effect on the internal floating piston 10, and instead acts against the closed end of the component 16. The absence of the effect cancels the force of the gas pressure against the internal floating piston 10; therefore the internal floating piston 10 is no longer held against the closed end 23 of the component 16. Since the internal floating piston 10 is no longer held against the closed end 23 of the component 16, the spring 13 that is attached to the internal floating piston 10 begins to extend exerting the force $F_{SP}$ against the internal floating piston 10 such that the internal floating piston 10 pushes downward against the gas.

Step Two: Referring to FIG. 57 for methods 1 and 2, and FIG. 58 for method 3, the downward motion $M_D$ of the internal floating piston 10 creates a greater pressure zone next to the outer side 11$b$ of the internal floating piston 10 while an equivalent lower pressure zone is created next to the inner side 11$a$ of the internal floating piston 10. Again the pressure imbalance defines the pressure differential across the structure of the internal floating piston 10, the pressure differential induces the net flow of gas $G_F$ through the structure of the internal floating piston 10 from the one cell 21 and into the second cell 22 such that the oil occupies the one cell 21 and the gas occupies the second cell 22.

Referring to FIGS. 59 and 60, the forces $F_V$ and $F_M$ created by gravity and magnetism in methods 1 and 2 and the fully extended spring 13 in method 3 will serve to constantly hold the internal floating piston 10 at the interface; in particular the forces $F_V$ and $F_M$ created in methods 1 and 2 are constantly exerted on the internal floating piston 10 and in turn the internal floating piston 10 transfers the forces $F_V$ and $F_M$ against the oil, respectively. Referring to FIG. 61, since both the shaft 17 and spring 13 that is attached to the internal floating piston 10 are fully extended when the one cell 21 is filled up with oil and since the oil is non-compressible, then any force that acts to compress the shaft 17 from full extension will also serve to compress the spring 13; in effect anytime the shaft 17 is not in the fully extended position, the spring 13 will be compressed, and therefore, will exert a force $F_{SP}$ against the internal floating piston 10 and in turn the internal floating piston 10 transfers the force $F_{SP}$ against the oil. Since the downward forces $F_V$, $F_M$, and $F_{SP}$ are constantly acting against the oil, then so long as the stage is oriented right side up the more dense oil will remain below the interface in the one cell 21 and the less dense gas will remain above the interface in the second cell 22 while the internal floating piston 10 remains at the interface and maintains separation of the oil and gas, regardless of the stroke of the shaft 17 or pressure of the gas.

While the methods 1-3 are each capable of maintaining separation of the oil and gas during the operation of the stage, the present invention focuses on the method 3. Henceforth, all subject matter is based on the principles discussed in method 3.

Referring to FIGS. 62-70, there are shown the stage that is equipped with the internal floating piston 10, in this case emphasizing the motion of the internal floating piston 10 during the operation of the stage. For purposes of discussion, (1) the single function shaft 17 is called a shaft 17 and refers to the dual or single function shaft while the dual function shaft 16 is called a component 16 and refers to the working tube or dual function shaft, (2) road obstructions define suspension forces that are exerted on the stage while the gas pressure defines a force that counteracts the suspension force, and (3) the volume of the gas G occupying the cup of the internal floating piston 10 is ignored:

Referring to FIGS. 62-65, there is shown the stage undergoing compression. During the operation of the stage, suspension forces are exerted on the stage thereby causing the stage to compress; whereas when the suspension forces are reduced, the force of the gas pressure counteracts the suspension force and causes the stage to extend: (1) during compression, suspension forces are exerted on the stage thereby causing the shaft 17 to slide into the component 16. The suspension forces that are exerted on the shaft 17 are transferred to the oil. Since the internal floating piston 10 is not permeable to the oil, then the suspension forces that are exerted on the oil are transferred to the internal floating piston 10 thereby causing the internal floating piston 10 to slide towards the closed end of the component 16. The motion of the internal floating piston 10 decreases the volume of the second cell whereby the decrease in the volume serves to increase the gas pressure; (2) during extension, the suspension forces exerted on the stage are reduced, in turn, the suspension forces exerted on the shaft 17 are reduced, in turn, the suspension forces that are transferred to the oil are reduced, in turn, the suspension forces that are transferred to the internal floating piston 10 are reduced. Since the internal floating piston 10 is permeable to the gas but not the oil, then in principle the gas is able to flow through the internal floating piston 10. The ability to flow indicates that the force of the gas pressure is able to have no effect on the internal floating piston 10. The absence of the effect indicates that the force of the gas pressure does not act on the internal floating piston 10, and instead the gas pressure exerts a force directly on the oil; this way when the suspension forces that are transferred to the internal floating piston 10 are reduced, the force of the gas pressure that is exerted on the oil is transferred to the shaft 17 thereby causing the shaft 17 to slide out of the component 16.

During extension, the shaft 17 slides out of the component 16 and away from the internal floating piston 10. In principle, the motion of the shaft 17 serves to create a low pressure zone next to the outer side 11$b$ of the internal floating piston 10 while the gas pressure serves to create a high pressure zone next to the inner side 11$a$ of the internal floating piston 10. The resulting pressure differential induces a net flow of gas through the structure of the internal floating piston 10 from the second cell and into the one cell. Since the motion of the shaft 17 is able to be very rapid, then the internal floating piston 10 must also be able to move very rapidly in conjunction with the shaft 17 in order for the internal floating piston 10 to remain at the interface and maintain separation of the oil and gas. Such rapid motion by the internal floating piston 10 can be realized by utilizing a membrane 12 that possesses a slow permeation rate. During the rapid extension of the shaft 17, the slow permeation rate indicates that the gas is able to remain in the second cell such that the pressure of that gas is able to exert a force against the internal floating piston 10 thereby causing the internal floating piston 10 to move while very little, if any, of the gas will permeate across the internal floating piston 10. In reaction to suspension forces, the movement of the shaft 17 can occur on the order of fractions of a second while the slow permeation rate of the gas occurs on the order of minutes. During the operation of the stage, the shaft 17 can undergo numerous of cycles of compression and extension within a minute. For example, assume one cycle occurs every second while the gas permeates across the internal floating piston 10 in 5 minutes, then: (a) in one minute, the shaft 17 will have cycled 60 times while only 20% of the gas will be able to permeate across the internal floating piston 10, (b) in three seconds, the shaft 17 will have cycled 3 times while only 1% of the gas will be able to permeate across the internal floating piston 10, and (c) in one second during any given cycle, at least 99% of the gas will remain in the second cell such that the pressure of that gas will exert a force against the internal floating piston 10 thereby causing the internal floating piston 10 to move while at most 1% of the gas will be able to permeate across the internal floating piston 10. Moreover only 50% of those cycles, i.e., the extension movements, require the slow permeation rate of the membrane 12 to keep the gas in the second cell because the remaining 50% of those cycles, i.e., the compression movements, will serve to push the internal floating piston 10 against the spring 13, in turn, the spring 13 compresses thereby creating the pressure differential that serves to induce the net flow of gas through the internal floating piston 10 from the one cell and into the second cell. In effect, once the internal floating piston 10 separates the oil and gas such that they occupy the one and second cells, then the oil and gas will remain separated by the internal floating piston 10 during the operation of the stage.

As a practical matter, during extension the force of the gas pressure is exerted on the internal floating piston 10 rather than directly on the oil. Therefore the force of the gas pressure that is exerted on the internal floating piston 10 is transferred to the oil, in turn, the force of the gas pressure that is exerted on the oil is transferred to the shaft 17 thereby causing the shaft 17 to slide out of the component 16. The slow permeation rate of the membrane 12 ensures that the oil and gas remain separated and occupy the one and second cells, respectively, thereby ensuring that the force of the gas pressure is exerted on the internal floating piston 10 such that the internal floating piston 10 rapidly slides away from the closed end of the component 16 and moves in conjunction with the shaft 17.

The motion of the shaft 17 causes a change in the volume of the space within the component 16, the volume of the space define the volumes of the one and second cells while the one and second cells define the volume of the stage. Since the oil occupies the one cell and is non-compressible, then the volume of the one cell remains constant; and, results in the change in the volume of the space within the component 16 referring to the change in the volume of the second cell $\Delta V_{IFP}$, i.e., the change in the volume of the space within the component 16 is the same as the change in the volume of the second cell $\Delta V_{IFP}$. Therefore, the change in the volume of the second cell $\Delta V_{IFP}$ defines the change in the volume of the stage. Since the gas occupies the second cell, then the change in the volume of the space within the component 16 refers to the change in the volume of the gas $\Delta V_G$ whereby the change in the volume of the gas $\Delta V_G$ is the same as the change in the volume of the second cell $\Delta V_{IFP}$. Since the motion of the shaft 17 causes the change in the volume of the space within the component 16, then the change in the volume of the shaft stroke $\Delta V_S$ refers to the change in the volume of the space within the component 16. In summary, the change in the volume of the shaft stroke $\Delta V_S$ defines the change in the volume of the space within the component 16, the change in the volume within the component 16 refers to the change in the volume of the second cell $\Delta V_{IFP}$, the change in the volume of the second cell $\Delta V_{IFP}$ refers to the change in the volume of the gas $\Delta V_G$—in short, the change in the volume of the shaft stroke $\Delta V_S$ defines the change in the volume of the gas $\Delta V_G$. Since the change in the volume of the second cell $\Delta V_{IFP}$ defines the change in the volume of the stage, then the change in the volume of the gas $\Delta V_G$ defines the change in the volume of the stage.

During the motion of the shaft 17, the working piston 18 and internal floating piston 10 are displaced. Referring to FIG. 62; starting with the stage at full extension, then the origins of the displacements are shown as the right-hand side $r_{WP}$ and $d_{IFP}$ of the working piston 18 and internal floating piston 10, respectively. The displacements $d_{WP}$ and $d_{IFP}$ of the working piston 18 and internal floating piston 10 are different, respectively: since the working piston 18 is attached to the shaft 17, then the displacement $d_{WP}$ of the working piston 18 is the same as the change in the shaft stroke $\Delta L_S$. In contrast, the displacement $d_{IFP}$ of the internal floating piston 10 is less than the displacement $d_{WP}$ of the working piston 18; the difference being due to part of the oil flowing into or out of the passageway 29 between the shaft 17 and cylinder wall of the component 16. Referring to FIGS. 62-65, as the stage undergoes compression, part of the oil flows into the passageway 29 between the shaft 17 and cylinder wall of the component 16 whereby this flow reduces the amount of oil between the working piston 18 and internal floating piston 10—in effect the working piston 18 gets closer to the internal floating piston 10. Since the working piston 18 gets closer to the internal floating piston 10, then the internal floating piston 10 is moving slower than the working piston 18 and thereby the displacement $d_{IFP}$ of the internal floating piston 10 is less than the displacement $d_{WP}$ of the working piston 18.

Referring to FIGS. 66-70, there is shown a set of equations used to find the relative displacements $d_{WP}$ and $d_{IFP}$ of the working piston 18 and internal floating piston 10, respectively. Since the change in the volume of the second cell $\Delta V_{IFP}$ refers to the change in the volume of the shaft stroke $\Delta V_S$, then the relationship between the change in the volume of the second cell $V_{IFP}$ and that of the shaft stroke $V_S$ can be used to describe the relationship between the displacement $d_{IFP}$ of the internal floating piston 10 and displacement $d_{WP}$ of the working piston 18. Referring to FIG. 45, the set of equations is used to derive an algorithm that shows that the displacement $d_{IFP}$ of the internal floating piston 10 is less than the displacement $d_{WP}$ of the working piston 18.

In principle, the volume of the gas $V_G$ is the sum of the volume of the shaft stroke $V_S$ plus the volume of the gas G occupying the cup of the internal floating piston 10. For purposes of discussion, the volume of the gas G occupying the cup is ignored; therefore, the volume of the gas $V_G$ is the same as the volume of the shaft stroke $V_S$. As a practical matter, the difference between the volume of the shaft stroke $V_S$ and that of the gas $V_G$ that is caused by the volume of the gas G occupying the cup has negligible effect on computations regarding gas pressure particularly those involving spring rate and therefore this difference is ignored.

Referring to FIGS. 71-76, there is shown the four stage air shock in various states of operation, in this case emphasizing the installation of the internal floating piston into each stage of the four stage air shock:

The first stage includes the working tube 32, first dual function shaft 33, and first internal floating piston 45. The working tube 32 has a closed end and an open end whereby the closed end is affixed to a mounting eyelet while the open end is attached to a first end cap 41. The first dual function shaft 33 has a closed end and an open end whereby the closed end is attached to a first working piston 37 while the open end is attached to a second end cap 42. The first internal floating piston 45 has the structure of a porous cup whereby the structure comprises a solid wall, inner and outer sides, and a first spring 49; and, the first spring 49 has a short and long ends whereby the short end is attached to the inner side. The first internal floating piston 45 is slidably inserted into the open end of the working tube 32 thereby the first internal floating piston 45 is enabled to slide within the working tube 32 under guidance by the solid wall whereby the long end of the first spring 49 is butted up against the closed end of the working tube 32; then, the first dual function shaft 33 is slidably inserted into the open end of the working tube 32. The process of the first dual function shaft 33 being inserted into the working tube 32 defines a space within the working tube 32 between the closed end of the working tube 32 and first end cap 41; whereas, the first internal floating piston 45 divides the space into the one and second cells whereby the one cell is between the outer side of the first internal floating piston 45 and first end cap 41 while the second cell is between the inner side of the first internal floating piston 45 and closed end of the working tube 32. The space has a volume $V_W$ which defines the volumes of the one and second cells whereby the volumes of the one and second cells define the volume $V_W$ of the first stage. The first end cap 41 is equipped with a check valve 20, the check valve 20 serves as a means to add oil and gas to or remove oil and gas from the first stage. The first internal floating piston 45 has a gas permeable membrane whereby the membrane is attached to the outer side of the first internal floating piston 45 and is permeable to gases but not liquids. The permeability allows the gas but not the oil to pass through the structure thereby the first internal floating piston 45 is able to separate the oil and gas such that the oil is able to occupy the one cell while the gas is able to occupy the second cell. The first end cap 41 acts as a seal such that the oil and gas are confined to the one and second cells; and the confinement allows the oil to have a volume and gas to have both a volume and pressure whereby the gas pressure defines a force.

The second stage includes the first dual function shaft 33, second dual function shaft 34, and second internal floating piston 46. The second dual function shaft 34 has a closed end and an open end whereby the closed end is attached to a second working piston 38 while the open end is attached to a third end cap 43. The second internal floating piston 46 has the structure of a porous cup whereby the structure comprises a solid wall, inner and outer sides, and a second spring 50; and, the second spring 50 has a short and long ends whereby the short end is attached to the inner side. The second internal floating piston 46 is slidably inserted into the first dual function shaft 33 thereby the second internal floating piston 46 is enabled to slide within the first dual function shaft 33 under guidance by the solid wall whereby the long end of the second spring 50 is butted up against the closed end of the first dual function shaft 33; then the second dual function shaft 34 is slidably inserted into the first dual function shaft 33. The process of the second dual function shaft 34 being inserted into the first dual function shaft 33 defines a space within the first dual function shaft 33 between the closed end of the first dual function shaft 33 and second end cap 42; whereas, the second internal floating piston 46 divides the space into the one and second cells whereby the one cell is between the outer side of the second internal floating piston 46 and second end cap 42 while the second cell is between the inner side of the second internal floating piston 46 and closed end of the first dual function shaft 33. The space has a volume $V_{W1}$ which defines the volumes of the one and second cells whereby the volumes of the one and second cells define the volume $V_{W1}$ of the second stage. The second end cap 42 is equipped with a check valve 20, the check valve 20 serves as a means to add oil and gas to or remove oil and gas from the second stage.

The second internal floating piston 46 has a gas permeable membrane whereby the membrane is attached to the outer side of the second internal floating piston 46 and is permeable to gases but not liquids. The permeability allows the gas but not the oil to pass through the structure thereby the second internal floating piston 46 is able to separate the oil and gas such that the oil is able to occupy the one cell while the gas is able to occupy the second cell. The second end cap 42 acts as a seal such that the oil and gas are confined to the one and second cells; and the confinement allows the oil to have a volume and gas to have both a volume and pressure whereby the gas pressure defines a force.

The third stage includes the second dual function shaft 34, third dual function shaft 35, and third internal floating piston 47. The third dual function shaft 35 has a closed end and an open end whereby the closed end is attached to a third working piston 39 while the open end is attached to a fourth end cap 44. The third internal floating piston 47 has the structure of a porous cup whereby the structure comprises a solid wall, inner and outer sides, and a third spring 51; and, the third spring 51 has a short and long ends whereby the short end is attached to the inner side. The third internal floating piston 47 is slidably inserted into the second dual function shaft 34 thereby the third internal floating piston 47 is enabled to slide within the second dual function shaft 34 under guidance by the solid wall whereby the long end of the third spring 51 is butted up against the closed end of the second dual function shaft 34; then the closed end of the third dual function shaft 35 is slidably inserted into the second dual function shaft 34. The process of the third dual function shaft 35 being inserted into the second dual function shaft 34 defines a space within the second dual function shaft 34 between the closed end of the second dual function shaft 34 and third end cap 43; whereas, the third internal floating piston 47 divides the space into the one and second cells whereby the one cell is between the outer side of the third internal floating piston 47 and third end cap 43 while the second cell is between the inner side of the third internal floating piston 47 and closed end of the second dual function shaft 34. The space has a volume $V_{W2}$ which defines the volumes of the one and second cells whereby the volumes of the one and second cells define the volume $V_{W2}$ of the third stage. The third end cap 43 is equipped with a check valve 20, the check valve 20 serves as a means to add oil and gas to or remove oil and gas from the third stage. The third internal floating piston 47 has a gas permeable membrane whereby the membrane is attached to the outer side of the third internal floating piston 47 and is permeable to gases but not liquids. The permeability allows the gas but not the oil to pass through the structure thereby the third internal floating piston 47 is able to separate the oil and gas such that the oil is able to occupy the one cell while the gas is able to occupy the second cell. The third end cap 43 acts as a seal such that the oil and gas are confined to the one and second cells; and the confinement allows the oil to have a volume and gas to have both a volume and pressure whereby the gas pressure defines a force.

The fourth stage includes the third dual function shaft 35, single function shaft 36, and fourth internal floating piston 48. The single function shaft 36 has the one and second closed ends whereby the one closed end is attached to a fourth working piston 40 while the second closed end is affixed to a mounting eyelet. The fourth internal floating piston 48 has the structure of a porous cup whereby the structure comprises a solid wall, inner and outer sides, and a fourth spring 52; and, the fourth spring 52 has a short and long ends whereby the short end is attached to the inner side. The fourth internal floating piston 48 is slidably inserted into the third dual function shaft 35 thereby the fourth internal floating piston 48 is enabled to slide within the third dual function shaft 35 under guidance by the solid wall whereby the long end of the fourth spring 52 is butted up against the closed end of the third dual function shaft 35; then the single function shaft 36 is slidably inserted into the third dual function shaft 35. The process of the single function shaft 36 being inserted into the third dual function shaft 35 defines a space within the third dual function shaft 35 between the closed end of the third dual function shaft 35 and fourth end cap 44; whereas, the fourth internal floating piston 48 divides the space into the one and second cells whereby the one cell is between the outer side of the fourth internal floating piston 48 and fourth end cap 44 while the second cell is between the inner side of the fourth internal floating piston 48 and closed end of the third dual function shaft 35. The space has a volume $V_{W3}$ which defines the volumes of the one and second cells whereby the volumes of the one and second cells define the volume $V_{W3}$ of the fourth stage. The fourth end cap 44 is equipped with a check valve 20, the check valve 20 serves as a means to add oil and gas to or remove oil and gas from the fourth stage. The fourth internal floating piston 48 has a gas permeable membrane whereby the membrane is attached to the outer side of the fourth internal floating piston 48 and is permeable to gases but not liquids. The permeability allows the gas but not the oil to pass through the structure thereby the fourth internal floating piston 48 is able to separate the oil and gas such that the oil is able to occupy the one cell while the gas is able to occupy the second cell. The fourth end cap 44 acts as a seal such that the oil and gas are confined to the one and second cells; and the confinement allows the oil to have a volume and gas to have both a volume and pressure whereby the gas pressure defines a force.

Referring to FIGS. 77-78, there is shown the four stage air shock whereby each stage is equipped with the internal floating piston, in this case emphasizing the orientation of the four stage air shock:

The four stage air shock is able to be oriented right side up or upside down: referring to FIG. 77, right side up defines the four stage air shock being in a vertical position such that the four stages are arranged in the descending order: first, second, third, and fourth stage whereby the closed end of the working tube 32, first dual function shaft 33, second dual function shaft 34, or third dual function shaft 35 is at the top of the space within the working tube 32, first dual function shaft 33, second dual function shaft 34, or third dual function 35 shaft while the first, second, third, or fourth end cap 41, 42, 43 or 44 is at the bottom of the space within the working tube 32, first dual function shaft 33, second dual function shaft 34, or third dual function shaft 35 whereby the one cell is below the first, second, third, or fourth internal floating piston 45, 46, 47, or 48 while the second cell is above the first, second, third, or fourth internal floating piston 45, 46, 47, or 48, respectively; referring to FIG. 78, upside down is opposite right side up; the opposite defines the four stage air shock being in a vertical position such that the four stages are arranged in the descending order: fourth, third, second, and first stage whereby the closed end of the working tube 32, first dual function shaft 33, second dual function shaft 34, or third dual function shaft 35 is at the bottom of the space within the working tube 32, first dual function shaft 33, second dual function shaft 34, or third dual function 35 shaft while the first, second, third, or fourth end cap 41, 42, 43 or 44 is at the top of the space within the working tube 32, first dual function shaft 33, second dual function shaft 34, or third dual function shaft 35 whereby the one cell is above the first, second, third, or fourth internal floating piston 45, 46, 47, or 48 while the second cell is below the first, second, third, or fourth internal floating piston 45, 46, 47, or 48, respectively.

Referring to FIGS. 79-81, there is shown the four stage air shock whereby each stage is equipped with the internal floating piston, in this case emphasizing the process of charging each stage with oil. Referring to FIG. 79, the four stage air shock is oriented upside down and each stage is fully compressed:

Referring to FIG. 80, the first stage is filled with gas such that the first stage fully extends whereby the filling is performed through the check valve 20, the check valve 20 is attached to the first end cap 41. The process of compressing and then filling the first stage is done in order to purge the first stage of moisture. When the first stage fully extends, the first spring 49 also fully extends whereby the gas, at atmospheric pressure, occupies both the one and second cells of the working tube 32. Referring to FIG. 81, the oil charge is added through the check valve 20 and into the one cell of the working tube 32. The fully extended first spring 49 positions the first internal floating piston 45 in a manner such that the addition of the oil charge acts to fill up the one cell whereby the gas in the second cell is at atmospheric pressure.

Referring to FIG. 80, the second stage is filled with gas such that the second stage fully extends whereby the filling is performed through the check valve 20, the check valve 20 is attached to the second end cap 42. The process of compressing and then filling the second stage is done in order to purge the second stage of moisture. When the second stage fully extends, the second spring 50 also fully extends whereby the gas, at atmospheric pressure, occupies both the one and second cells of the first dual function shaft 33. Referring to FIG. 81, the oil charge is added through the check valve 20 and into the one cell of the first dual function shaft 33. The fully extended second spring 50 positions the second internal floating piston 46 in a manner such that the addition of the oil charge acts to fill up the one cell whereby the gas in the second cell is at atmospheric pressure.

Referring to FIG. 80, the third stage is filled with gas such that the third stage fully extends whereby the filling is performed through the check valve 20, the check valve 20 is attached to the third end cap 43. The process of compressing and then filling the third stage is done in order to purge the third stage of moisture. When the third stage fully extends, the third spring 51 also fully extends whereby the gas, at atmospheric pressure, occupies both the one and second cells of the second dual function shaft 34. Referring to FIG. 81, the oil charge is added through the check valve 20 and into the one cell of the second dual function shaft 34. The fully extended third spring 51 positions the third internal floating piston 47 in a manner such that the addition of the oil charge acts to fill up the one cell whereby the gas in the second cell is at atmospheric pressure.

Referring to FIG. 80, the fourth stage is filled with gas such that the fourth stage fully extends whereby the filling is performed through the check valve 20, the check valve 20 is attached to the fourth end cap 44. The process of compressing and then filling the fourth stage is done in order to purge the fourth stage of moisture. When the fourth stage fully extends, the fourth spring 52 also fully extends whereby the gas, at atmospheric pressure, occupies both the one and second cells of the third dual function shaft 35. Referring to FIG. 81, the oil charge is added through the check valve 20 and into the one cell of the third dual function shaft 35. The fully extended fourth spring 52 positions the fourth internal floating piston 48 in a manner such that the addition of the oil charge acts to fill up the one cell whereby the gas in the second cell is at atmospheric pressure.

Referring to FIGS. 82-83, there is shown the four stage air shock whereby each stage is equipped with the internal floating piston and has been charged with oil, in this case emphasizing the process of charging each stage with gas. The four stage air shock is oriented upside down with each stage fully extended:

The first stage is charged with gas by adding the gas charge through the check valve 20 and into the one cell of the working tube 32. Since the oil and gas are immiscible, the oil does not mix with the gas and since the oil and gas occupy the one cell, the oil locates next to the gas such that the surface of the oil contacts that of the gas whereby the contacting surfaces are defined as the interface. The locations of the oil and gas at the interface are defined by density such that the more dense oil will locate below the interface next to the first internal floating piston 45 while the less dense gas will locate above the interface next to the first end cap 41 whereby the one cell now contains both the oil and gas charges. The pressure of the gas charge exerts a force on the oil; the oil is non-compressible while the first internal floating piston 45 is impermeable to the oil thereby enabling the oil to transfer the force against the first internal floating piston 45. The pressure of the gas charge is greater than atmospheric pressure while the force of the gas pressure is greater than that of the first spring 49 thereby enabling the force of the gas pressure to cause the first internal floating piston 45 to slide downward. The downward motion of the first internal floating piston 45 compresses the first spring 49, decreases the volume of the second cell, and increases the pressure of the gas in the second cell; the downward motion continues until the pressure of the gas in the second cell is the same as that of the gas charge. Since the density of the gas is less than that of the oil, the gas in the second cell will exert a force $F_{UP}$ that acts upward against the first internal floating piston 45. Since the first internal floating piston 45 is permeable to the gas, the upward force $F_{UP}$ defines an increase in pressure next to the inner side of the first internal floating piston 45 while there is no change in pressure next to the outer side of the first internal floating piston 45. The pressure imbalance defines a pressure differential across the structure of the first internal floating piston 45, the pressure differential induces a net flow of gas $G_F$ through the structure of the first internal floating piston 45 from the second cell and into the one cell. As soon as the gas from the second cell passes through the first internal floating piston 45 into the one cell, the gas is able to bubble upward through the oil and accumulate with the gas charge that is next to the first end cap 41 whereby the gas from the second cell and gas charge are hereafter referred to as the gas. The oil and gas do not mix together such that their surfaces contact one another at the interface whereby the more dense oil is positioned below the interface next to the first internal floating piston 45 while the less dense gas is positioned above the interface next to the first end cap 41. The combination of the flow of the gas $G_F$ through the structure and the force of the gas pressure being greater than that of the first spring 49 causes the first internal floating piston 45 to continue sliding downward until the first internal floating piston 45 bottoms out against the closed end of the working tube 32. The force of the gas pressure serves to hold the first internal floating piston 45 against the closed end of the working tube 32 whereby the location of the first internal floating piston 45 serves to fully compress the first spring 49. The space within the working tube 32 consists of the one cell only.

The second stage is charged with gas by adding the gas charge through the check valve 20 and into the one cell of the first dual function shaft 33. Since the oil and gas are immiscible, the oil does not mix with the gas and since the oil and gas occupy the one cell, the oil locates next to the gas such that the surface of the oil contacts that of the gas whereby the contacting surfaces are defined as the interface. The locations of the oil and gas at the interface are defined by density such that the more dense oil will locate below the interface next to the second internal floating piston 46 while the less dense gas will locate above the interface next to the second end cap 42 whereby the one cell now contains both the oil and gas charges. The pressure of the gas charge exerts a force on the oil; the oil is non-compressible while the second internal floating piston 46 is impermeable to the oil thereby enabling the oil to transfer the force against the second internal floating piston 46. The pressure of the gas charge is greater than atmospheric pressure while the force of the gas pressure is greater than that of the second spring 50 thereby enabling the force of the gas pressure to cause the second internal floating piston 46 to slide downward whereby the downward motion of the second internal floating piston 46 compresses the second spring 50, decreases the volume of the second cell, and increases the pressure of the gas in the second cell; the downward motion continues until the pressure of the gas in the second cell is the same as that of the gas charge. Since the density of the gas is less than that of the oil, the gas in the second cell will exert a force $F_{UP}$ that acts upward against the second internal floating piston 46. Since the second internal floating piston 46 is permeable to the gas, the upward force $F_{UP}$ defines an increase in pressure next to the inner side of the second internal floating piston 46 while there is no change in pressure next to the outer side of the second internal floating piston 46. The pressure imbalance defines a pressure differential across the structure of the second internal floating piston 46 whereby the pressure differential induces a net flow of gas $G_F$ through the structure of the second internal floating piston 46 from the second cell and into the one cell. As soon as the gas from the second cell passes through the second internal floating piston 46 into the one cell, the gas is able to bubble upward through the oil and accumulate with the gas charge that is next to the second end cap 42 whereby the gas from the second cell and gas charge are hereafter referred to as the gas. The oil and gas do not mix together such that their surfaces contact one another at the interface whereby the more dense oil is positioned below the interface next to the second internal floating piston 46 while the less dense gas is positioned above the interface next to the second end cap 42. The combination of the flow of the gas $G_F$ through the structure and the force of the gas pressure being greater than that of the second spring 50 causes the second internal floating piston 46 to continue sliding downward until the second internal floating piston 46 bottoms out against the closed end of the first dual function shaft 33. The force of the gas pressure serves to hold the second internal floating piston 46 against the closed end of the first dual function shaft 33 whereby the location of the second internal floating piston 46 serves to fully compress the second spring 50. The space within the first dual function shaft 33 consists of the one cell only.

The third stage is charged with gas by adding the gas charge through the check valve 20 and into the one cell of the second dual function shaft 34. Since the oil and gas are immiscible, the oil does not mix with the gas and since the oil and gas occupy the one cell, the oil locates next to the gas such that the surface of the oil contacts that of the gas whereby the contacting surfaces are defined as the interface. The locations of the oil and gas at the interface are defined by density such that the more dense oil will locate below the interface next to the third internal floating piston 47 while the less dense gas will locate above the interface next to the third end cap 43 whereby the one cell now contains both the oil and gas charges. The pressure of the gas charge exerts a force on the oil; the oil is non-compressible while the third internal floating piston 47 is impermeable to the oil thereby enabling the oil to transfer the force against the third internal floating piston 47. The pressure of the gas charge is greater than atmospheric pressure while the force of the gas pressure is greater than that of the third spring 51 thereby enabling the force of the gas pressure to cause the third internal floating piston 47 to slide downward whereby the downward motion of the third internal floating piston 47 compresses the third spring 51, decreases the volume of the second cell, and increases the pressure of the gas in the second cell; the downward motion continues until the pressure of the gas in the second cell is the same as that of the gas charge. Since the density of the gas is less than that of the oil, the gas in the second cell will exert a force $F_{UP}$ that acts upward against the third internal floating piston 47. Since the third internal floating piston 47 is permeable to the gas, the upward force $F_{UP}$ defines an increase in pressure next to the inner side of the third internal floating piston 47 while there is no change in pressure next to the outer side of the third internal floating piston 47. The pressure imbalance defines a pressure differential across the structure of the third internal floating piston 47 whereby the pressure differential induces a net flow of gas $G_F$ through the structure of the third internal floating piston 47 from the second cell and into the one cell. As soon as the gas from the second cell passes through the third internal floating piston 47 into the one cell, the gas is able to bubble upward through the oil and accumulate with the gas charge that is next to the third end cap 43 whereby the gas from the second cell and gas charge are hereafter referred to as the gas. The oil and gas do not mix together such that their surfaces contact one another at the interface whereby the more dense oil is positioned below the interface next to the third internal floating piston 47 while the less dense gas is positioned above the interface next to the third end cap 43. The combination of the flow of the gas $G_F$ through the structure and the force of the gas pressure being greater than that of the third spring 51 causes the third internal floating piston 47 to continue sliding downward until the third internal floating piston 47 bottoms out against the closed end of the second dual function shaft 34. The force of the gas pressure serves to hold the third internal floating piston 47 against the closed end of the second dual function shaft 34 whereby the location of the third internal floating piston 47 serves to fully compress the third spring 51. The space within the second dual function shaft 34 consists of the one cell only.

The fourth stage is charged with gas by adding the gas charge through the check valve 20 and into the one cell of the third dual function shaft 35. Since the oil and gas are immiscible, the oil does not mix with the gas and since the oil and gas occupy the one cell, the oil locates next to the gas such that the surface of the oil contacts that of the gas whereby the contacting surfaces are defined as the interface. The locations of the oil and gas at the interface are defined by density such that the more dense oil will locate below the interface next to the fourth internal floating piston 48 while the less dense gas will locate above the interface next to the fourth end cap 44 whereby the one cell now contains both the oil and gas charges. The pressure of the gas charge exerts a force on the oil; the oil is non-compressible while the fourth internal floating piston 48 is impermeable to the oil thereby enabling the oil to transfer the force against the fourth internal floating piston 48. The pressure of the gas charge is greater than atmospheric pressure while the force of the gas pressure is greater than that of the fourth spring 52 thereby enabling the force of the gas pressure to cause the fourth internal floating piston 48 to slide downward whereby the downward motion of the fourth internal floating piston 48 compresses the fourth spring 52, decreases the volume of the second cell, and increases the pressure of the gas in the second cell; the downward motion continues until the pressure of the gas in the second cell is the same as that of the gas charge. Since the density of the gas is less than that of the oil, the gas in the second cell will exert a force $F_{UP}$ that acts upward against the fourth internal floating piston 48. Since the fourth internal floating piston 48 is permeable to the gas, the upward force $F_{UP}$ defines an increase in pressure next to the inner side of the fourth internal floating piston 48 while there is no change in pressure next to the outer side of the fourth internal floating piston 48. The pressure imbalance defines a pressure differential across the structure of the fourth internal floating piston 48 whereby the pressure differential induces a net flow of gas $G_F$ through the structure of the fourth internal floating piston 48 from the second cell and into the one cell. As soon as the gas from the second cell passes through the fourth internal floating piston 48 into the one cell, the gas is able to bubble upward through the oil and accumulate with the gas charge that is next to the fourth end cap 44 whereby the gas from the second cell and gas charge are hereafter referred to as the gas. The oil and gas do not mix together such that their surfaces contact one another at the interface whereby the more dense oil is positioned below the interface next to the fourth internal floating piston 48 while the less dense gas is positioned above the interface next to the fourth end cap 44. The combination of the flow of the gas $G_F$ through the structure and the force of the gas pressure being greater than that of the fourth spring 52 causes the fourth internal floating piston 48 to continue sliding downward until the fourth internal floating piston 48 bottoms out against the closed end of the third dual function shaft 35. The force of the gas pressure serves to hold the fourth internal floating piston 48 against the closed end of the third dual function shaft 35 whereby the location of the fourth internal floating piston 48 serves to fully compress the fourth spring 52. The space within the third dual function shaft 35 consists of the one cell only.

Referring to FIGS. 84-86, there is shown the four stage air shock whereby each stage is equipped with the internal floating piston and has been charged with oil and gas, in this case emphasizing the process of the internal floating piston separating the oil and gas into one and the other cells, respectively. The four stage air shock is rotated 180 degrees from being upside down to right side up:

For the first stage, the rotation causes the oil and gas to reverse positions in the one cell of the working tube 32 such that the oil is positioned below the interface next to the first end cap 41 while the gas is positioned above the interface next to the first internal floating piston 45. Since the first internal floating piston 45 is permeable to the gas, the gas is able to flow through the first internal floating piston 45. The ability to flow indicates that the force of the gas pressure is able to have no effect on the first internal floating piston 45, and instead acts against the closed end of the working tube 32. The absence of the effect cancels the force of the gas pressure that holds the first internal floating piston 45 against the closed end of the working tube 32. The lack of the first internal floating piston 45 being held against the closed end of the working tube 32 allows the first spring 49 to extend. The extension of the first spring 49 exerts the force $F_{SP}$ against the first internal floating piston 45 thereby causing the first internal floating piston 45 to slide downward $M_D$ against the gas whereby the downward motion $M_D$ creates a greater pressure zone next to the outer side of the first internal floating piston 45 while an equivalent lower pressure zone is created next to the inner side of the first internal floating piston 45. The pressure imbalance defines the pressure differential across the structure of the first internal floating piston 45. The pressure differential induces the net flow of gas $G_F$ through the structure of the first internal floating piston 45 from the one cell and into the second cell such that the oil occupies the one cell and the gas occupies the second cell.

For the second stage, the rotation causes the oil and gas to reverse positions in the one cell of the first dual function shaft 33 such that the oil is positioned below the interface next to the second end cap 42 while the gas is positioned above the interface next to the second internal floating piston 46. Since the second internal floating piston 46 is permeable to the gas, the gas is able to flow through the second internal floating piston 46. The ability to flow indicates that the force of the gas pressure is able to have no effect on the second internal floating piston 46, and instead acts against the closed end of the first dual function shaft 33. The absence of the effect cancels the force of the gas pressure that holds the second internal floating piston 46 against the closed end of the first dual function shaft 33. The lack of the second internal floating piston 46 being held against the closed end of the first dual function shaft 33 allows the second spring 50 to extend. The extension of the second spring 50 exerts the force $F_{SP}$ against the second internal floating piston 46 thereby causing the second internal floating piston 46 to slide downward $M_D$ against the gas whereby the downward motion $M_D$ creates a greater pressure zone next to the outer side of the second internal floating piston 46 while an equivalent lower pressure zone is created next to the inner side of the second internal floating piston 46. The pressure imbalance defines the pressure differential across the structure of the second internal floating piston 46. The pressure differential induces the net flow of gas $G_F$ through the structure of the second internal floating piston 46 from the one cell and into the second cell such that the oil occupies the one cell and the gas occupies the second cell.

For the third stage, the rotation causes the oil and gas to reverse positions in the one cell of the second dual function 34 shaft such that the oil is positioned below the interface next to the third end cap 43 while the gas is positioned above the interface next to the third internal floating piston 47. Since the third internal floating piston 47 is permeable to the gas, the gas is able to flow through the third internal floating piston 47. The ability to flow indicates that the force of the gas pressure is able to have no effect on the third internal floating piston 47, and instead acts against the closed end of the second dual function 34. The absence of the effect cancels the force of the gas pressure that holds the third internal floating piston 47 against the closed end of the second dual function shaft 34. The lack of the third internal floating piston 47 being held against the closed end of the second dual function shaft 34 allows the third spring 51 to extend. The extension of the third spring 51 exerts the force $F_{SP}$ against the third internal floating piston 47 thereby causing the third internal floating piston 47 to slide downward $M_D$ against the gas whereby the downward motion $M_D$ creates a greater pressure zone next to the outer side of the third internal floating piston 47 while an equivalent lower pressure zone is created next to the inner side of the third internal floating piston 47. The pressure imbalance defines the pressure differential across the structure of the third internal floating piston 47. The pressure differential induces the net flow of gas $G_F$ through the structure of the third internal floating piston 47 from the one cell and into the second cell such that the oil occupies the one cell and the gas occupies the second cell.

For the fourth stage, the rotation causes the oil and gas to reverse positions in the one cell of the third dual function shaft 35 such that the oil is positioned below the interface next to the fourth end cap 44 while the gas is positioned above the interface next to the fourth internal floating piston 48. Since the fourth internal floating piston 48 is permeable to the gas, the gas is able to flow through the fourth internal floating piston 48. The ability to flow indicates that the force of the gas pressure is able to have no effect on the fourth internal floating piston 48, and instead acts against the closed end of the third dual function shaft 35. The absence of the effect cancels the force of the gas pressure that holds the fourth internal floating piston 48 against the closed end of the third dual function shaft 35. The lack of the fourth internal floating piston 48 being held against the closed end of the third dual function shaft 35 allows the fourth spring 52 to extend. The extension of the fourth spring 52 exerts the force $F_{SP}$ against the fourth internal floating piston 48 thereby causing the fourth internal floating piston 48 to slide downward $M_D$ against the gas whereby the downward motion $M_D$ creates a greater pressure zone next to the outer side of the fourth internal floating piston 48 while an equivalent lower pressure zone is created next to the inner side of the fourth internal floating piston 48. The pressure imbalance defines the pressure differential across the structure of the fourth internal floating piston 48. The pressure differential induces the net flow of gas $G_F$ through the structure of the fourth internal floating piston 48 from the one cell and into the second cell such that the oil occupies the one cell and the gas occupies the second cell.

Referring to FIGS. 87-89, there is shown the four stage air shock whereby each stage is equipped with the internal floating piston and charged with oil and gas. The oil and gas occupy the one and second cells, respectively, and each internal floating piston utilizes a membrane that possesses a slow permeation rate. In this case emphasis is placed on the motion of each internal floating piston during the operation of each stage, the operation of each stage being caused by suspension forces acting on each stage: referring to: FIG. 87, the first, second, third, and fourth stages are all fully extended; FIG. 88, the first, second, third, and fourth stages are all fully compressed; and FIG. 89, the first and second stages are fully extended while the third stage is compressed to 70% of shaft stroke and fourth stage is compressed to 40% of shaft stroke:

Regarding operation of the first stage: (a) during compression the suspension forces are exerted on the first dual function shaft 33 thereby causing the first dual function shaft 33 to slide into the working tube 32 whereby the sliding motion of the first dual function shaft 33 pushes the first working piston 37 through the oil. The suspension forces that are exerted on the first dual function shaft 33 are transferred to the oil, in turn, the suspension forces that are exerted on the oil are transferred to the first internal floating piston 45, in turn, the suspension forces that are exerted on the first internal floating piston 45 cause the first internal floating piston 45 to slide towards the closed end of the working tube 32. The motion of the first internal floating piston 45 decreases the volume of the second cell whereby the decrease in the volume of the second cell refers to a decrease in the volume of the first stage and causes an increase in the gas pressure; (b) during extension the force of the gas pressure is transferred to the first internal floating piston 45, in turn, the force of the gas pressure that is exerted on the first internal floating piston 45 is transferred to the oil, in turn, the force of the gas pressure that is exerted on the oil is transferred to the first dual function shaft 33 thereby causing the first dual function shaft 33 to slide out of the working tube 32 whereby the sliding motion of the first dual function shaft 33 pulls the first working piston 37 through the oil. The slow permeation rate of the membrane ensures that the oil and gas remain separated and occupy the one and second cells, respectively, thereby ensuring that the force of the gas pressure is exerted on the first internal floating piston 45 and then transferred from the first internal floating piston 45 to the oil such that the first internal floating piston 45 is able to slide away from the closed end of the working tube 32 and move in conjunction with the first dual function shaft 33. The motion of the first internal floating piston 45 increases the volume of the second cell whereby the increase in the volume refers to an increase in the volume of the first stage and causes a decrease in the pressure of the gas. The change in pressure of the gas in the first stage causes the suspension spring movement of the first stage whereby the suspension spring movement of the first stage is dampened by the movement of the first working piston 37 through the oil. The length of the first dual function shaft 33 from full extension to full compression or vice versa refers to the first dual function shaft stroke $L_{D1}$ or shaft stroke of the first stage $L_{D1}$.

Regarding operation of the second stage: (a) during compression the suspension forces are exerted on the second dual function shaft 34 thereby causing the second dual function shaft 34 to slide into the first dual function shaft 33 whereby the sliding motion of the second dual function shaft 34 pushes the second working piston 38 through the oil. The suspension forces that are exerted on the second dual function shaft 34 are transferred to the oil, in turn, the suspension forces that are exerted on the oil are transferred to the second internal floating piston 46, in turn, the suspension forces that are exerted on the second internal floating piston 46 cause the second internal floating piston 46 to slide towards the closed end of the first dual function shaft 33. The motion of the second internal floating piston 46 decreases the volume of the second cell whereby the decrease in the volume of the second cell refers to a decrease in the volume of the second stage and causes an increase in the gas pressure; (b) during extension the force of the gas pressure is transferred to the second internal floating piston 46, in turn, the force of the gas pressure that is exerted on the second internal floating piston 46 is transferred to the oil, in turn, the force of the gas pressure that is exerted on the oil is transferred to the second dual function shaft 34 thereby causing the second dual function shaft 34 to slide out of the first dual function shaft 33 whereby the sliding motion of the second dual function shaft 34 pulls the second working piston 38 through the oil. The slow permeation rate of the membrane ensures that the oil and gas remain separated and occupy the one and second cells, respectively, thereby ensuring that the force of the gas pressure is exerted on the second internal floating piston 46 and then transferred from the second internal floating piston 46 to the oil such that the second internal floating piston 46 is able to slide away from the closed end of the first dual function shaft 33 and move in conjunction with the second dual function shaft 34. The motion of the second internal floating piston 46 increases the volume of the second cell whereby the increase in the volume refers to an increase in the volume of the second stage and causes a decrease in the pressure of the gas. The change in pressure of the gas in the second stage causes the suspension spring movement of the second stage whereby the suspension spring movement of the second stage is dampened by the movement of the second working piston 38 through the oil. The length of the second dual function shaft 34 from full extension to full compression or vice versa refers to the second dual function shaft stroke $L_{D2}$ or shaft stroke of the second stage $L_{D2}$.

Regarding operation of the third stage: (a) during compression the suspension forces are exerted on the third dual function shaft 35 thereby causing the third dual function shaft 35 to slide into the second dual function shaft 34 whereby the sliding motion of the third dual function shaft 35 pushes the third working piston 39 through the oil. The suspension forces that are exerted on the third dual function shaft 35 are transferred to the oil, in turn, the suspension forces that are exerted on the oil are transferred to the third internal floating piston 47, in turn, the suspension forces that are exerted on the third internal floating piston 47 cause the third internal floating piston 47 to slide towards the closed end of the second dual function shaft 34. The motion of the third internal floating piston 47 decreases the volume of the second cell whereby the decrease in the volume of the second cell refers to a decrease in the volume of the third stage and causes an increase in the gas pressure; (b) during extension the force of the gas pressure is transferred to the third internal floating piston 47, in turn, the force of the gas pressure that is exerted on the third internal floating piston 47 is transferred to the oil, in turn, the force of the gas pressure that is exerted on the oil is transferred to the third dual function shaft 35 thereby causing the third dual function shaft 35 to slide out of the second dual function shaft 34 whereby the sliding motion of the third dual function shaft 35 pulls the third working piston 39 through the oil. The slow permeation rate of the membrane ensures that that oil and gas remain separated and occupy the one and second cells, respectively, thereby ensuring that the force of the gas pressure is exerted on the third internal floating piston 47 and then transferred from the third internal floating piston 47 to the oil such that the third internal floating piston 47 is able to slide away from the closed end of the second dual function shaft 34 and move in conjunction with the third dual function shaft 35. The motion of the third internal floating piston 47 increases the volume of the second cell whereby the increase in the volume refers to an increase in the volume of the third stage and causes a decrease in the pressure of the gas. The change in pressure of the gas in the third stage causes the suspension spring movement of the third stage whereby the suspension spring movement of the third stage is dampened by the movement of the third working piston 39 through the oil. The length of the third dual function shaft 35 from full extension to full compression or vice versa refers to the third dual function shaft stroke $L_{D3}$ or shaft stroke of the third stage $L_{D3}$.

Regarding operation of the fourth stage: (a) during compression the suspension forces are exerted on the single function shaft 36 thereby causing the single function shaft 36 to slide into the third dual function shaft 35 whereby the sliding motion of the single function shaft 36 pushes the fourth working piston 40 through the oil. The suspension forces that are exerted on the single function shaft 36 are transferred to the oil, in turn, the suspension forces that are exerted on the oil are transferred to the fourth internal floating piston 48, in turn, the suspension forces that are exerted on the fourth internal floating piston 48 cause the fourth internal floating piston 48 to slide towards the closed end of the third dual function shaft 35. The motion of the fourth internal floating piston 48 decreases the volume of the second cell whereby the decrease in the volume of the second cell refers to a decrease in the volume of the fourth stage and causes an increase in the gas pressure; (b) during extension the force of the gas pressure is transferred to the fourth internal floating piston 48, in turn, the force of the gas pressure that is exerted on the fourth internal floating piston 48 is transferred to the oil, in turn, the force of the gas pressure that is exerted on the oil is transferred to the single function shaft 36 thereby causing the single function shaft 36 to slide out of the third dual function shaft 35 whereby the sliding motion of the single function shaft 36 pulls the fourth working piston 40 through the oil. The slow permeation rate of the membrane ensures that that oil and gas remain separated and occupy the one and second cells, respectively, thereby ensuring that the force of the gas pressure is exerted on the fourth internal floating piston 48 and then transferred from the fourth internal floating piston 48 to the oil such that the fourth internal floating piston 48 is able to slide away from the closed end of the third dual function shaft 35 and move in conjunction with the single function shaft 36. The motion of the fourth internal floating piston 48 increases the volume of the second cell whereby the increase in the volume refers to an increase in the volume of the fourth stage and causes a decrease in the pressure of the gas. The change in pressure of the gas in the fourth stage causes the suspension spring movement of the fourth stage whereby the suspension spring movement of the fourth stage is dampened by the movement of the fourth working piston 40 through the oil. The length of the single function shaft 36 from full extension to full compression or vice versa refers to the single function shaft stroke $L_{D4}$ or shaft stroke of the fourth stage $L_{D4}$.

Referring to FIGS. 90-108, there is shown the effect of the internal floating piston on the compressed and extended lengths of the four stage air shock whereby each stage is equipped with the internal floating piston. For purposes of discussion, (1) the shaft refers to the first, second, or third dual function shaft or single function shaft while the component refers to the working tube or first, second, or third dual function shaft, (2) the four stage air shock that has an internal floating piston in each stage is referred to as the internal floating piston equipped four stage air shock:

The compressed and extended lengths are determined using a modified form of the one methodology that was disclosed in patent application Ser. No. 14/935,423. Referring to FIGS. 90 and 91, the modification refers to the incorporation of the thickness $ip_n$ of the internal floating piston into the set of equations used in the computations where n=1-8. Referring to FIGS. 92-97, there are shown the set of equations that are used to compute the compressed and extended lengths of the internal floating piston equipped four stage air shock. The following dimensions are used in the equations: extended length, $EL_X$, compressed length, $CL_X$, length of the working tube, $L_X$, length of the nth dual or single function shaft, $L_{Wn}$, shaft stroke of the nth stage, $L_{Sn}$, thickness of the nth working piston, $wp_n$, shaft shoulder, $ss_n$, end cap, $ec_n$, or internal floating piston, $ip_n$, and thickness of the mounting eyelet, me where X or n=1-8. Values are selected for the length of the working tube, $L_1$, thicknesses of the nth working piston, $wp_n$, shaft shoulder, $ss_n$, end cap, $ec_n$, and internal floating piston, $ip_n$, and thickness of the mounting eyelet, me. Referring to FIG. 108, there is shown the selected value for the length of the working tube, $L_1$; referring to FIGS. 100-107, there are shown the selected values for the thicknesses of the nth working piston $wp_n$, shaft shoulder $ss_n$, and end cap $ec_n$; referring to FIG. 98, there is shown the selected value for the mounting eyelet, me; and referring to FIG. 99, there is shown the relationship between the thickness of the nth internal floating piston, $ip_n$, and that of the nth working piston, $wp_n$.

Since the internal floating piston is inserted into the space within the component and since the working piston and shaft shoulder are also in the space within the component whereby the shaft is shorter than the component in order to account for the thicknesses of the working piston and shaft shoulder such that the shaft is able to slide fully into the component, then the thickness of the internal floating piston must also be accounted for when determining the length of the shaft; in particular, the shaft must be shorter than the component in order to account for the thicknesses of the working piston, shaft shoulder and internal floating piston such that the shaft is able to slide fully into the component. Specifically, the length of the shaft is the sum of the length of the component less the thicknesses of the working piston, shaft shoulder, and internal floating piston plus the end cap; while, the shaft stroke of each stage is the sum of the length of each component less the thicknesses of each working piston, shaft shoulder, and internal floating piston. This way, the thickness of the internal floating piston serves to decrease the length of the shaft or shaft stroke of each stage.

Since the extended length is computed as the sum of the compressed length plus the shaft stroke of each stage and since the thickness of the internal floating piston serves to decrease the shaft stroke of each stage, then the extended length of the internal floating piston equipped four stage air shock is less than that of the four stage air shock. Referring to FIG. 108, there is shown the data table with values for the compressed and extended lengths of the internal floating piston equipped four stage air shock: for example given a compressed length of 13.50 inches and that other dimensions have the same values for both the internal floating piston equipped four stage air shock and four stage air shock, then the extended length for the internal floating piston equipped four stage air shock is 30.50 inches while that for the four stage air shock is 38.00 inches.

This analysis emphasizes that the incorporation of the internal floating piston into each stage leads to a decrease in the extended length of the multiple stage air shock. Even though the selected values for the thicknesses of each working piston, shaft shoulder, end cap, and mounting eyelet are the same, the shaft stroke of each stage must be shortened in order to account for the thickness of each internal floating piston. Since the extended length of the multiple stage air shock is directly related to the shaft stroke of each stage, then the extended length is decreased for each internal floating piston that is incorporated into each stage of the multiple stage air shock.

Note: referring to FIGS. 98-107 and $L_1$ in FIG. 108, the dimensions and values listed therein are selected for purposes of discussion only and are not meant to imply proper values for any stage in the multiple stage air shock.

Referring to FIGS. 109-129, there is shown the effect of the internal floating piston on the spring rate for the four stage air shock whereby each stage is equipped with the internal floating piston. For purposes of discussion, (1) the shaft refers to the first, second, or third dual function shaft or single function shaft while the component refers to the working tube or first, second, or third dual function shaft, (2) the four stage air shock that has an internal floating piston in each stage is referred to as the internal floating piston equipped four stage air shock, and (3) in principle, the force of the spring serves to push the shaft out of the component and indirectly increase the force of the gas pressure. However, this spring force is ignored regarding spring rates because the spring is designed to create a pressure differential across the structure of the internal floating piston and is not nearly strong enough to serve as a suspension spring:

The spring rate is estimated using the same second methodology that was used for the four stage air shock disclosed in patent application Ser. No. 14/935,423; however, the selected data for the shaft strokes for each stage in the internal floating piston equipped four stage air shock are different than those selected for each stage in the four stage air shock. Referring to FIGS. 109 and 110, the difference refers to the internal floating piston being inserted into the space within the component. When compared to the shaft stroke for each stage in the four stage air shock, the shaft stroke for each stage in the internal floating piston equipped four stage air shock must be shortened in order to account for the thickness of the internal floating piston. Since the shaft stroke directly relates to the volume of the shaft stroke or volume of the gas, then when compared to the volume of the shaft stroke for each stage in the four stage air shock the volume of the shaft stroke for each stage in the internal floating piston equipped four stage air shock is decreased in proportion to the decrease in shaft stroke for each stage, and in turn, the volume of the gas is decreased in proportion to the decrease in shaft stroke for each stage.

Referring to FIGS. 111-122, there is shown a set of equations used to compute various dimensions of the internal floating piston equipped four stage air shock. The set of equations are excerpted from patent application Ser. No. 14/935,423 thereby representing part of the same equations defined in the second methodology while the dimensions and the symbols depicting the dimensions are the same as those defined in the second methodology.

Referring to FIG. 123, there are shown the selected values for the diameter of each stage, $D_{D1}$, $D_{D2}$, $D_{D3}$, $D_{S1}$, shaft stroke of each stage, $L_{D1}$, $L_{D2}$, $L_{D3}$, $F_{S1}$, suspension force exerted on each stage at ride height, $F_{1-4}$, and percent of the shaft stroke not compressed at ride height for each stage, % $L_{1-4}$. The values selected for $D_{D1}$, $D_{D2}$, $D_{D3}$, $D_{S1}$, $F_{1-4}$, and % $L_{1-4}$ are the same as those selected for the four stage air shock disclosed in patent application Ser. No. 14/935,423; whereas the values selected for $L_{D1}$, $L_{D2}$, $L_{D3}$, $L_{S1}$ are different from those selected for the four stage air shock disclosed in patent application Ser. No. 14/935,423, the values being the same as those for $L_{S1-4}$ that are computed with the modified form of the one methodology described above, respectively.

Referring to FIGS. 124-129, there are shown data tables and graphs. In FIGS. 124-127, the data tables comprise the following dimensions for each stage in the internal floating piston equipped four stage air shock: the selected incremental shaft stroke, $L_Z$, percent change in incremental shaft stroke, % $\Delta L_Z$, suspension force, $F_Z$, change in incremental shaft stroke, $\Delta L_Z$, and spring rate, $SR_Z$ where Z≡1e, 2f, 3g, and 4h for the first, second, third, and fourth stage, respectively. In FIGS. 128 and 129, the graphs show the estimate of the spring rate for the internal floating piston equipped four stage air shock whereby the values for the suspension force $F_Z$ and change in incremental shaft stroke $\Delta L_Z$ are used to derive the graphs. In particular, the values for $F_Z$ for the internal floating piston equipped four stage air shock are the same or nearly the same as those for the four stage air shock while the values for $\Delta L_Z$ for the internal floating piston equipped four stage air shock are different from those for the four stage air shock, the difference being due to the difference in the shaft stroke $L_n$.

The shortened shaft stroke $L_n$ in the internal floating piston equipped four stage air shock produces a change in incremental shaft stroke $\Delta L_Z$ that is less than that for the four stage air shock. For example referring to FIGS. 124-127, the change in incremental shaft strokes $\Delta L_Z$ for the first, second, third, and fourth stages in the internal floating piston equipped four stage air shock are 0.63, 0.48, 0.35, and 0.25 while those for the first, second, third, and fourth stages in the four stage air shock are 0.71, 0.63, 0.58, and 0.53, respectively. Referring to FIGS. 128 and 129, there are shown the curved lines 53, 54, 55, and 56 for the first, second, third, and fourth stages in the internal floating piston equipped four stage air shock plotted on graphs whereby the curved lines and graphs are derived with the second methodology. Since the change in incremental shaft stroke $\Delta L_Z$ is used to determine the spacing between adjacent data points that are plotted for each curved line, then the spacing between adjacent data points that are plotted for each curved line for the internal floating piston equipped four stage air shock are less than those for the four stage air shock. In principle this decreased spacing results in a gradually sloping curved line part for each stage in the internal floating piston equipped four stage air shock being slightly steeper than that for the four stage air shock. Yet, a comparison of the dotted line trace 57 for the internal floating piston equipped four stage air with that for the four stage air shock reveals that the slope of the dotted line trace 57 for the internal floating piston equipped four stage air looks the same as that for the four stage air shock. More importantly, the dotted line trace 57 for the internal floating piston equipped four stage air is relatively straight thereby suggesting that the spring rate for the internal floating piston equipped four stage air shock is relatively linear. Indeed, the shape of the dotted line trace 57 for the internal floating piston equipped four stage air shock looks virtually the same as for the four stage air shock.

This analysis emphasizes that given similar selected values for the dimensions of each stage in the multiple stage air shock, then the estimate of the spring rate for the internal floating piston equipped four stage air shock is virtually the same as that for the four stage air shock. Since the selected values for the dimensions of each stage in the internal floating piston equipped four stage air shock are the same as that for the four stage air shock, except for shaft stroke, then the estimate is not affected by changes in the selected values of the shaft stroke. The estimate is not affected by changes in the selected values of the shaft stroke because the estimate is based on the computed values of the suspension force, $F_Z$, and the computed values of $F_Z$ are not affected by changes in the selected values of the shaft strokes. The computed values of $F_Z$ are not affected by changes in the selected values of the shaft strokes because the changes in the selected values of the shaft strokes cause a proportional decrease in other dimensions, or the shaft strokes are factored or canceled out in the computations of other dimensions.

Note: referring to FIGS. 123-127, the properties and values listed therein are selected for purposes of discussion only and are not meant to imply proper values for any stage in a multiple stage air shock.

While the invention has been illustrated and described as a shock absorbing device with capability to separate the oil from the gas, it is not intended to be limited to the details shown, since it will be understood that various omissions, modifications, substitutions and changes in the forms and details of the device illustrated and in its operation can be made by those skilled in the art without departing in any way from the scope and spirit of the present invention.

What is claimed is:

1. A gas permeable internal floating piston shock comprising:
   a shaft having a cylinder-like structure with a first end and a second end;
   a working tube having a hollow cylinder-like structure with a closed end and an open end, the open end is attached with an end cap configured to slidably receive the shaft;
   a gas permeable internal floating piston slidably disposed within the working tube configured to permeate gases through the gas permeable internal floating piston but not liquids, wherein the gas permeable internal floating piston is an impenetrable barrier for liquids;
   a working piston attached to the first end of the shaft, the working piston slidably disposed within the working tube between the gas permeable internal floating piston and the open end of the working tube;
   a first cell between the gas permeable internal floating piston and the open end of the working tube configured to contain liquids and gases;
   a second cell between the closed end of the working tube and the gas permeable internal floating piston configured to contain only gases; and
   wherein the gas permeable internal floating piston enables gas to permeate from the first cell to the second cell and from the second cell to the first cell, while providing an impenetrable barrier between the first cell and the second cell for liquids and the gas permeable internal floating piston is moveable longitudinally in relation to the working tube in response to a change in volume of the first cell and a corresponding change in volume of the second cell.

2. The gas permeable internal floating piston shock of claim 1, wherein the gas permeable internal floating piston comprises:
   a solid wall configured to form a seal with the working tube and moveable longitudinally in relation to the working tube;
   a porous bottom attached to the solid wall; and
   a gas permeable membrane attached to the porous bottom.

3. The gas permeable internal floating piston shock of claim 2, wherein the first cell is filled with a liquid.

4. The gas permeable internal floating piston shock of claim 3, wherein the second cell is filled with a gas.

5. The gas permeable internal floating piston shock of claim 4, wherein the liquid is an oil.

6. A gas permeable internal floating piston shock comprising:
   a shaft having a cylinder-like structure with a first end and a second end;
   a working tube having a hollow cylinder-like structure with a closed end and an open end, the open end is attached with an end cap configured to slidably receive the shaft;
   a gas permeable internal floating piston slidably disposed within the working tube comprising
      a gas permeable membrane configured to permeate gases but not oils, wherein the gas permeable membrane is an impenetrable barrier for oils,
      a solid wall configured to create a seal between the solid wall and the working tube and configured to slide within the working tube, and
      a porous bottom configured to pass gas attached to the solid wall, wherein the gas permeable membrane is attached to the porous bottom;
   a working piston attached to the first end of the shaft, the working piston slidably disposed within the working tube between the gas permeable internal floating piston and the open end of the working tube;
   a first cell between the gas permeable internal floating piston and the open end of the working tube containing an oil;
   a second cell between the closed end of the working tube and the gas permeable internal floating piston containing a gas; and
   wherein the gas permeable internal floating piston enables the gas to permeate from the first cell to the second cell and from the second cell to the first cell, while providing an impenetrable barrier between the first cell and the second cell for the oil and the gas permeable internal floating piston is moveable longitudinally in relation to the working tube in response to a change in volume of the first cell and a corresponding change in volume of the second cell.

7. The gas permeable internal floating piston shock of claim 6 further comprises a spring attached to the gas permeable internal floating piston.

8. The gas permeable internal floating piston shock of claim 7, wherein the solid wall comprises an inner side and an outer side.

9. The gas permeable internal floating piston shock of claim 8, wherein the porous bottom is attached to the outer side of the solid wall creating a cup.

10. The gas permeable internal floating piston shock of claim 9, wherein the gas permeable membrane is attached to the porous bottom opposite the solid wall.

11. The gas permeable internal floating piston shock of claim 10, wherein the porous bottom is a fritted disc.

12. The gas permeable internal floating piston shock of claim 6, wherein the gas permeable membrane is constructed of a synthetic polymer material.

13. The gas permeable internal floating piston shock of claim 6, wherein the gas permeable membrane is constructed of a silicon based material.

14. The gas permeable internal floating piston shock of claim 6, wherein the gas permeable membrane is constructed of a ceramic based material.

15. A method for constructing a gas permeable internal floating piston shock comprising the steps of:
providing a gas permeable internal floating piston shock, the gas permeable internal floating piston shock comprising
a shaft having a cylinder-like structure with a first end and a second end,
a working tube having a hollow cylinder-like structure with a closed end and an open end, the open end is attached with an end cap configured to slidably receive the shaft,
a gas permeable internal floating piston slidably disposed within the working tube configured to permeate gases through the gas permeable internal floating piston but not liquids, wherein the gas permeable internal floating piston is an impenetrable barrier for liquids,
a working piston attached to the first end of the shaft, the working piston slidably disposed within the working tube between the gas permeable internal floating piston and the open end of the working tube,
a first cell between the gas permeable internal floating piston and the open end of the working tube configured to contain liquids and gases,
a second cell between the closed end of the working tube and the gas permeable internal floating piston configured to contain only gases, and
wherein the gas permeable internal floating piston enables gas to permeate from the first cell to the second cell and from the second cell to the first cell, while providing an impenetrable barrier between the first cell and the second cell for liquids and the gas permeable internal floating piston is moveable longitudinally in relation to the working tube in response to a change in volume of the first cell and a corresponding change in volume of the second cell;
filling the first cell with a liquid;
filling the first cell with a gas;
permeating the gas through the gas permeable internal floating piston from the first cell to the second cell, while preventing the liquid from permeating from the first cell to the second cell; and
wherein the gas permeable internal floating piston moves longitudinally in relation to the working tube in response to a change in volume of the first cell and a corresponding change in volume of the second cell due to the permeation of the gas through the gas permeable internal floating piston from the first cell to the second cell.

16. The method for constructing the gas permeable internal floating piston shock of claim 15, wherein the gas permeable internal floating piston shock further comprises a spring attached to the gas permeable internal floating piston.

17. The method for constructing the gas permeable internal floating piston shock of claim 16, wherein the gas permeable internal floating piston comprises:
a solid wall configured to form a seal with the working tube and moveable longitudinally in relation to the working tube;
a porous bottom attached to the solid wall; and
a gas permeable membrane attached to the porous bottom.

18. The method for constructing the gas permeable internal floating piston shock of claim 17, wherein the solid wall comprises an inner side and an outer side.

19. The method for constructing the gas permeable internal floating piston shock of claim 18, wherein the porous bottom is attached to the outer side of the solid wall creating a cup.

20. The method for constructing the gas permeable internal floating piston shock of claim 19, wherein the gas permeable membrane is attached to the porous bottom opposite the solid wall.

* * * * *